(12) United States Patent
Choi et al.

(10) Patent No.: US 12,599,233 B2
(45) Date of Patent: Apr. 14, 2026

(54) RAIL SYSTEM FOR WORKSPACE WITH MODULAR COMPONENTS

(71) Applicant: FELLOWES, INC., Itasca, IL (US)

(72) Inventors: Taiwon Choi, Glenview, IL (US); Dominick Padovano, Chicago, IL (US); Michael Franklin Egan, Chicago, IL (US); Tai Hoon K. Matlin, Round Lake Beach, IL (US); Shawn M. Applegate, Streamwood, IL (US); James Edward Losser, St. Charles, IL (US); John Fellowes, Wheaton, IL (US)

(73) Assignee: FELLOWES, INC., Itasca, IL (US)

( * ) Notice: Subject to any disclaimer, the term of this patent is extended or adjusted under 35 U.S.C. 154(b) by 171 days.

(21) Appl. No.: 18/382,359

(22) Filed: Oct. 20, 2023

(65) Prior Publication Data

US 2024/0130529 A1 Apr. 25, 2024
US 2024/0225283 A9 Jul. 11, 2024

Related U.S. Application Data

(60) Provisional application No. 63/418,285, filed on Oct. 21, 2022.

(51) Int. Cl.
*A47B 97/00* (2006.01)
*F16B 2/06* (2006.01)

(52) U.S. Cl.
CPC ........ *A47B 97/00* (2013.01); *A47B 2097/003* (2013.01); *A47B 2097/005* (2013.01); *F16B 2/065* (2013.01)

(58) Field of Classification Search
CPC ............ A47B 21/06; A47B 2200/0085; A47B 2021/066; A47B 2021/064; A47B 96/067; A47B 97/00; F16M 11/041
See application file for complete search history.

(56) References Cited

U.S. PATENT DOCUMENTS

| | | | |
|---|---|---|---|
| 4,443,046 A | 4/1984 | Hannah | |
| 4,974,913 A | 12/1990 | Vogt et al. | |

(Continued)

FOREIGN PATENT DOCUMENTS

| | | |
|---|---|---|
| AU | 2019 248 537 A1 | 10/2020 |
| CH | 680414 A5 | 8/1992 |

(Continued)

OTHER PUBLICATIONS

International Search Report and Written Opinion issued in International Patent Application No. PCT/US2023/035612, dated Jan. 30, 2024.

(Continued)

*Primary Examiner* — Bradley Duckworth
(74) *Attorney, Agent, or Firm* — CUSHMAN PARTNERS, LLC

(57) ABSTRACT

A rail system for a workspace. The system may include at least one mounting mechanism and an elongated rail. Each mounting mechanism is configured for attachment to the rail and configured for attachment to an edge of, or a surface of, a table or desk, so that the mounting mechanism(s) support the rail relative to said surface. The elongated rail is configured to extend horizontally relative to and above the surface of the table or desk. The elongated rail has at least a front surface, a bottom surface/edge, and a back surface, as well as mounting slots. In some instances, a channel (or trough) is defined between the front and back surfaces, which extends between first and second ends of the elongated rail. The rail accommodates placement of electrical cords to/from a power source, for mounting components (e.g., clamps, brackets, release mechanisms) and/or for connecting accessories thereto.

37 Claims, 59 Drawing Sheets

(56) References Cited

U.S. PATENT DOCUMENTS

| | | | |
|---|---|---|---|
| 5,052,565 | A | 10/1991 | Zachrei |
| 5,537,290 | A | 7/1996 | Brown et al. |
| 5,553,820 | A | 9/1996 | Karten et al. |
| 5,568,773 | A | 10/1996 | Hung |
| 5,938,158 | A | 8/1999 | Tisbo |
| D442,063 | S | 5/2001 | Snyder |
| D457,052 | S | 5/2002 | Snyder |
| 6,435,461 | B1 | 8/2002 | Saylor et al. |
| 6,792,876 | B2 | 9/2004 | Lin |
| D513,970 | S | 1/2006 | Sterling |
| 7,185,767 | B2 * | 3/2007 | Phillips ................... A47B 17/03 |
| | | | 211/11 |
| D563,771 | S | 3/2008 | Prechtel |
| D574,698 | S | 8/2008 | Grey |
| 7,802,407 | B2 | 9/2010 | Haberman |
| 7,926,430 | B2 * | 4/2011 | Bakker ................... A47B 37/00 |
| | | | 108/50.02 |
| D637,477 | S | 5/2011 | Wall |
| 7,992,349 | B2 | 8/2011 | Haberman |
| D682,661 | S | 5/2013 | Fitzpatrick |
| 8,596,599 | B1 * | 12/2013 | Carson ............... F16M 11/2085 |
| | | | 248/920 |
| 8,701,568 | B2 | 4/2014 | Miller et al. |
| 9,220,342 | B2 * | 12/2015 | Byrne ................... A47B 21/06 |
| 9,228,693 | B2 * | 1/2016 | Ditges ................... F16M 11/24 |
| 9,271,568 | B2 * | 3/2016 | Schiavello ............. A47B 21/06 |
| 9,400,083 | B2 | 7/2016 | Sapper et al. |
| D798,135 | S | 9/2017 | Doupnik |
| 9,797,544 | B1 * | 10/2017 | Smed ................... F16M 11/08 |
| 10,114,352 | B2 * | 10/2018 | Matlin ................... G05B 15/02 |
| 10,271,646 | B2 | 4/2019 | Danville et al. |
| 10,561,239 | B2 | 2/2020 | Game et al. |
| 10,851,938 | B2 * | 12/2020 | Glickstein ............. F16M 11/16 |
| 10,980,339 | B2 | 4/2021 | Game et al. |
| 11,211,755 | B2 * | 12/2021 | Miller ................... E04B 2/7405 |
| D973,475 | S | 12/2022 | Lin |
| 11,696,639 | B2 * | 7/2023 | Cvek ........................ H02G 3/34 |
| | | | 439/532 |
| 11,744,361 | B2 * | 9/2023 | Anderson .............. A47B 21/06 |
| | | | 108/50.02 |
| D1,028,843 | S | 5/2024 | Wang |
| 12,000,528 | B2 * | 6/2024 | Matlin .............. F16M 11/2092 |
| D1,057,546 | S | 1/2025 | Worden |
| 2006/0238967 | A1 | 10/2006 | Carson et al. |
| 2008/0290768 | A1 | 11/2008 | Haberman |
| 2022/0099125 | A1 * | 3/2022 | Fung ................... A47C 13/005 |
| 2023/0218080 | A1 * | 7/2023 | Cizmar ................... B25H 1/02 |
| | | | 211/87.01 |
| 2023/0389703 | A1 * | 12/2023 | Malmloff ............. F16M 13/022 |
| 2024/0130529 | A1 | 4/2024 | Choi |

FOREIGN PATENT DOCUMENTS

| | | |
|---|---|---|
| CN | 204144829 U | 2/2015 |
| DE | 86 29 967 U1 | 12/1986 |
| EP | 3 327 330 A1 | 5/2018 |

OTHER PUBLICATIONS

International Preliminary Report on Patentability issued in International Patent Application No. PCT/US2023/035612, dated Jan. 27, 2025.

Fellowes Announces Release of Rising Loft Rail System, posted Jun. 26, 2023 [online], [retrieved Feb. 18, 2025]. Retrieved from internet, https://www.prnewswire.com/news-releases/fellowes-announces-release-of-rising-loft-rail-system-301863103.html (Year: 2023).

* cited by examiner

Power cord

32

2.50 in

Front View

10

14

4.00 in 6.24 in 2.24 in

Side View

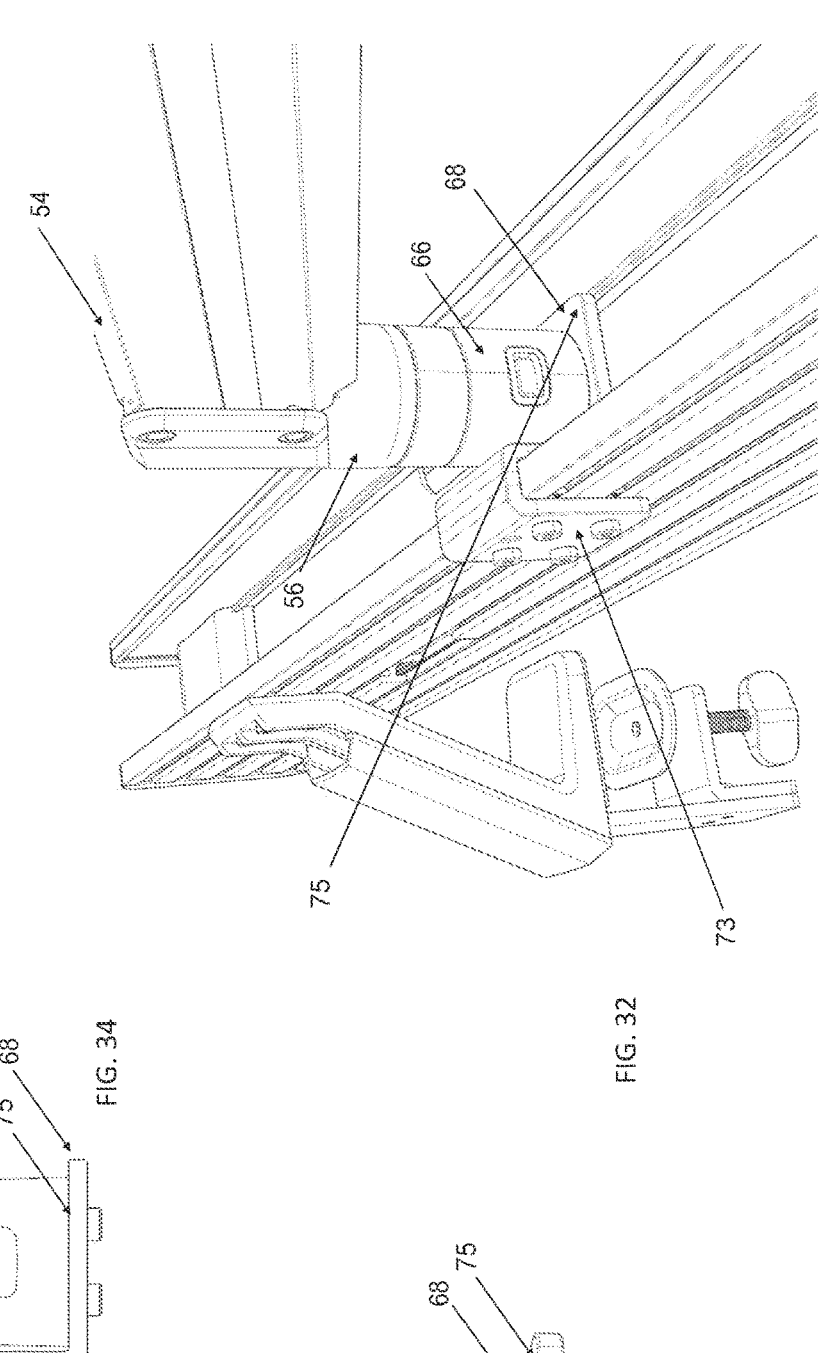
FIG. 32
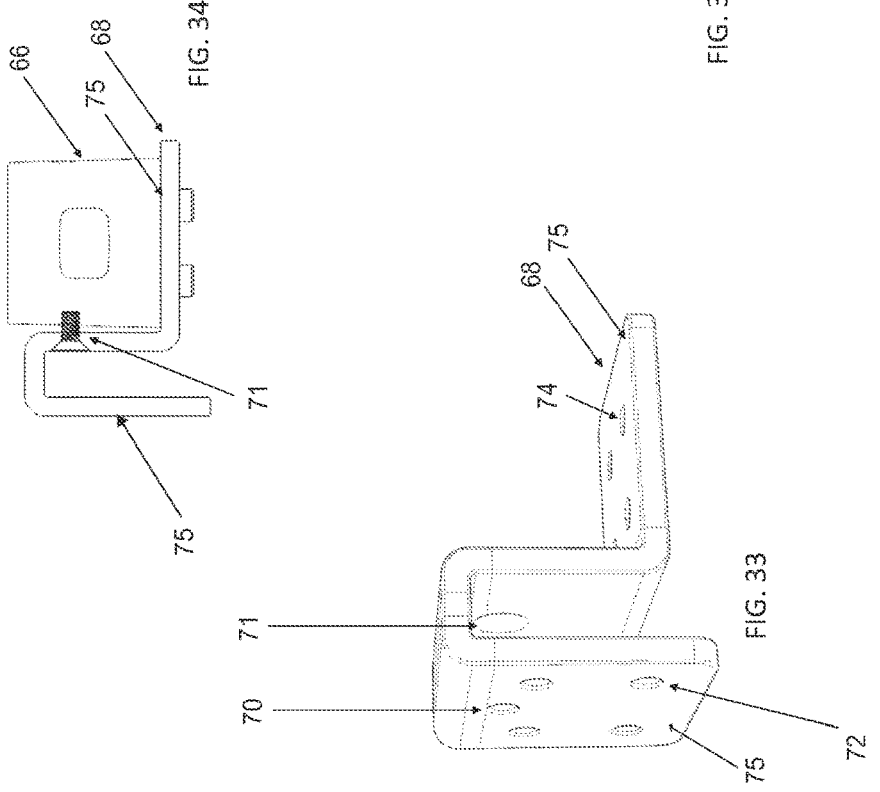
FIG. 34
FIG. 33

56

56

112

Holes for the bolts that connect
to the slats in the back of the rail

Holes for the bolts that connect
to the Quick Release Adapter

114

112

The bracket could be used in
either orientation, allowing for
increased height adjustability Privacy
PET/ Wood/
Fabric-Wood Adjustable Rail Shelf Wireless
Charging Denali Arm Planter/Utensils Lighting Laptop
Accessory AC & USB
Charging

132

138

130

136-1

135

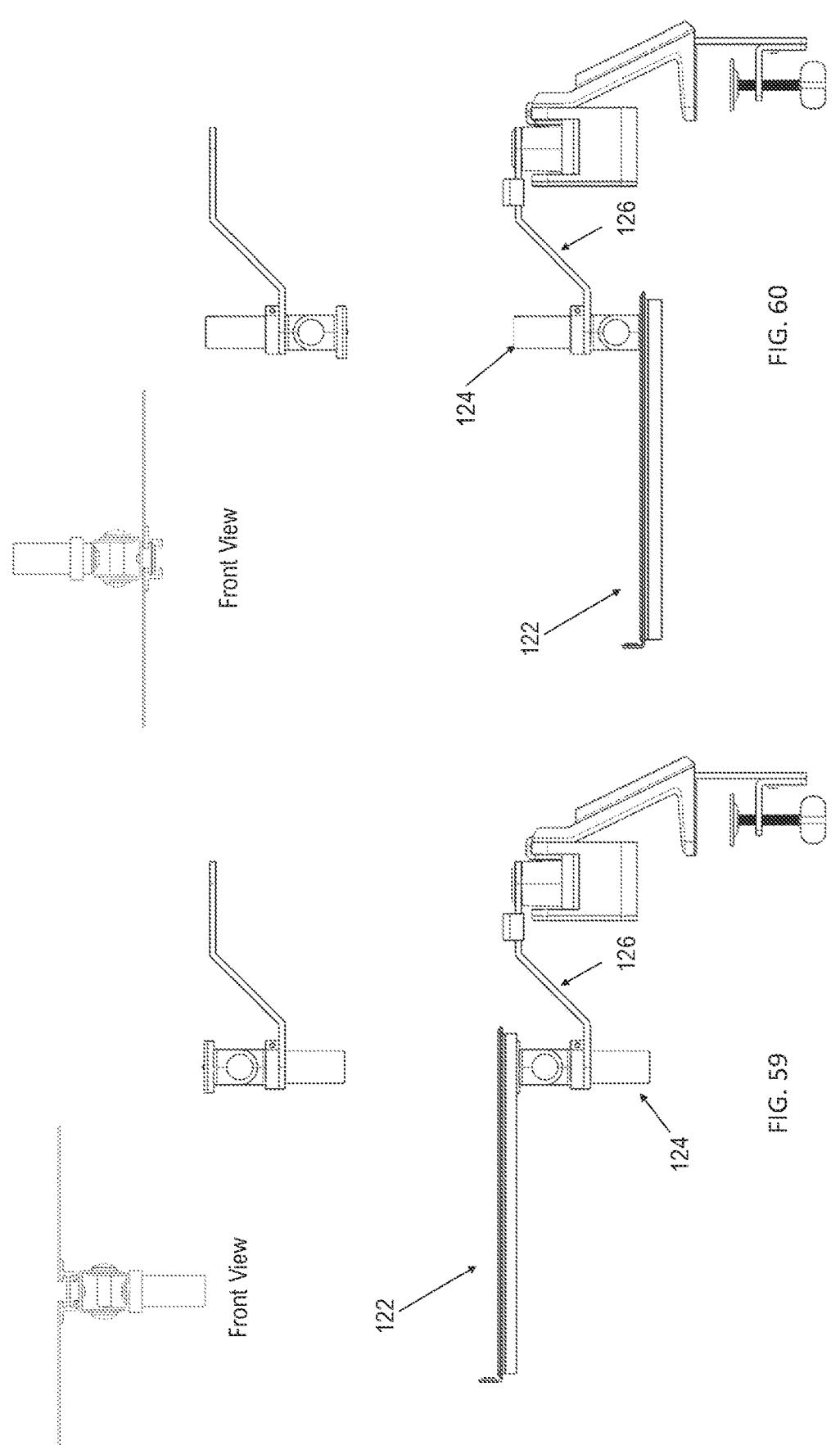

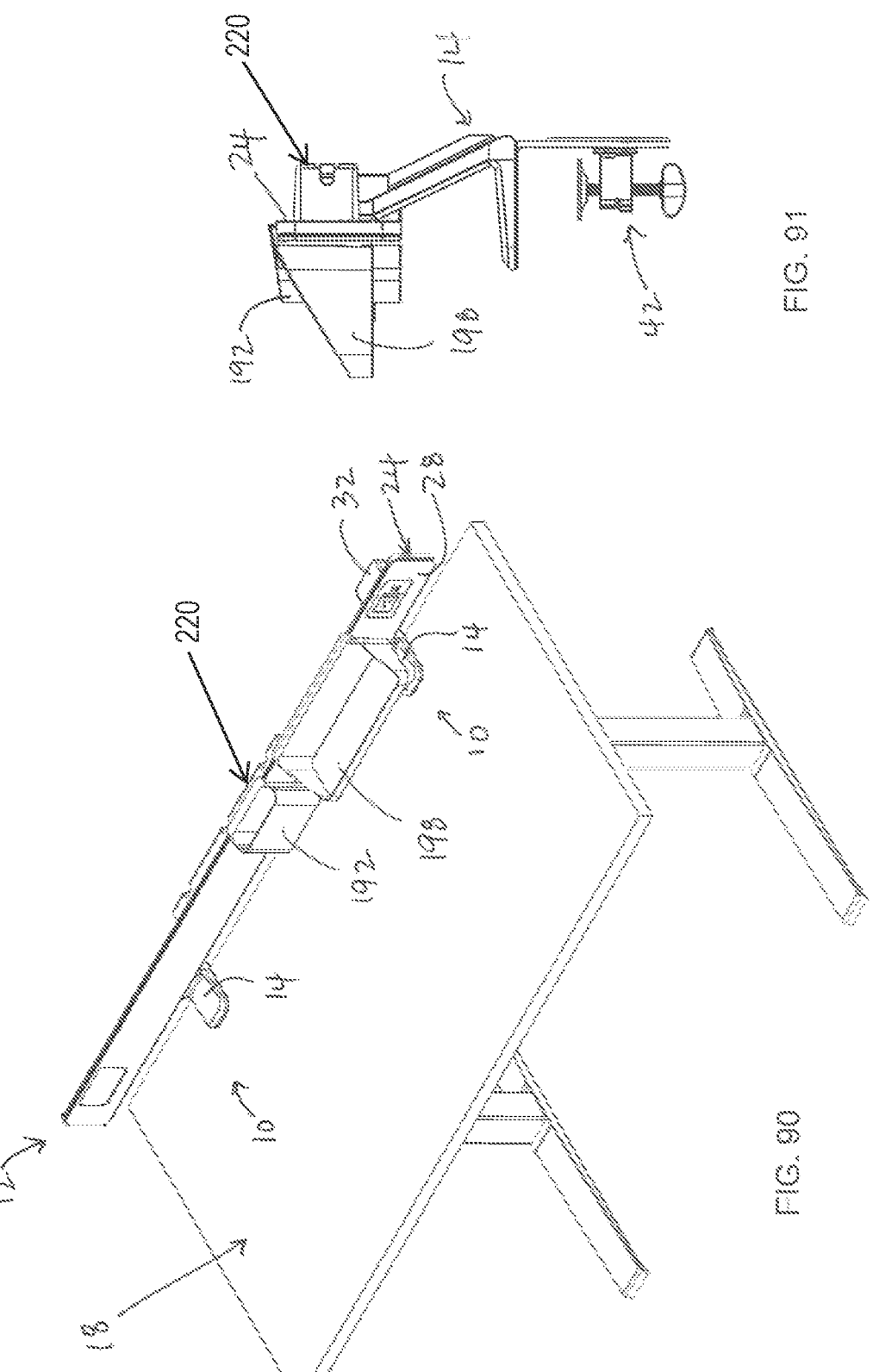

RAIL SYSTEM FOR WORKSPACE WITH MODULAR COMPONENTS

CROSS REFERENCE TO RELATED APPLICATION(S)

The present application claims priority to U.S. Provisional Patent Application 63/418,285 filed Oct. 21, 2022, the entirety of which is incorporated by reference herein.

BACKGROUND

Field

The present disclosure is generally related to a rail system that is configured for mounting relative to a surface of a table or desk. More specifically, the system includes an elongated rail and mounting mechanism(s) for mounting to the surface, with the option of adding accessories thereto to maximize use and flexibility of work zones of the surface.

Description of Related Art

It is generally known to include risers and/or standing desk configurations on desks or workstations, which may allow one to mount computer monitors thereto. However, most current configurations tend to be cumbersome and/or intrusive with regards to a working surface or table top of the desk space. For example, monitors can block a significant portion of a back of a work surface or desk. Another example of a typical system holds organizational items in a stationary location such as Herman Miller Surfaced-Attached Tool Rail slatwall system.

SUMMARY

It is an aspect of this disclosure to provide a rail system for a workspace. In embodiments, the rail system includes at least one mounting mechanism and an elongated rail. Each mounting mechanism is configured for attachment to the elongated rail and further configured for attachment to an edge of, or a surface of, a table or desk, so that the mounting mechanism(s) support the elongated rail relative to said surface. The elongated rail is configured to extend horizontally relative to and above the surface of the table or desk when mounted thereto via said mounting mechanism(s). The elongated rail has at least a front surface, a bottom surface, and a back surface that defines a channel (or trough) therein, according to embodiments. The channel extends between a first end and a second end of the elongated rail. The channel may be used for placement of electrical cords to/from a power source, for mounting components therein (e.g., clamps, brackets, release mechanisms) and/or for connecting accessories to the elongated rail.

Another aspect of this disclosure provides the rail system above, wherein each mounting mechanism is configured for attachment to the elongated rail and configured for attachment to a table or desk, so that the at least one mounting mechanism supports the elongated rail relative to a surface of said table or desk. The elongated rail is configured to extend horizontally relative to and above the surface of the table or desk at a height or distance thereabove when mounted thereto via said at least one mounting mechanism. The elongated rail has at least a front surface, a bottom surface, and a back surface that defines a channel therein, the channel extending between a first end and a second end of the elongated rail and configured for placement of accessories relative to the elongated rail.

Yet another aspect of this disclosure includes a method of using the aforementioned rail system.

Still yet another aspect provides a rail system for a workspace, the rail system including: at least one mounting mechanism and an elongated rail. Each mounting mechanism is configured for attachment to the elongated rail and configured for attachment to a table or desk, so that the at least one mounting mechanism supports the elongated rail relative to a surface of said table or desk. The elongated rail is configured to extend horizontally relative to and above the surface of the table or desk at a height or distance thereabove when mounted thereto via said at least one mounting mechanism. The elongated rail extends between a first end and a second end and having at least a front surface, a bottom edge, and a back surface, the back surface comprising a number of horizontally extending mounting slots formed therein for placement of accessories relative to the elongated rail. A method of using the same is also disclosed.

Other aspects, features, and advantages of the present disclosure will become apparent from the following detailed description, the accompanying drawings, and the appended claims.

BRIEF DESCRIPTION OF THE DRAWINGS

FIG. 32 shows a perspective view of mounting parts to the elongated rail using the quick release mechanism of FIG. 31, according to an embodiment.

FIG. 33 shows a perspective view of a primary mounting bracket of the quick release mechanism, in accordance with an embodiment.

FIG. 34 is a cross-sectional view of the primary mounting bracket of FIG. 33 and a quick release adapter mounted thereto, in accordance with an embodiment.

FIGS. 59-60 show side views of an example of using the adjustment post in two configurations, according to another embodiment.

FIGS. 90 and 91 show perspective and side views of the exemplary accessories mounted in FIGS. 88-89 with respect to the elongated rail of the rail system, according to embodiments herein.

For purposes of clarity and brevity, like elements and components bear the same designations and numbering throughout the Figures.

DETAILED DESCRIPTION OF EMBODIMENT(S)

Figure 1:
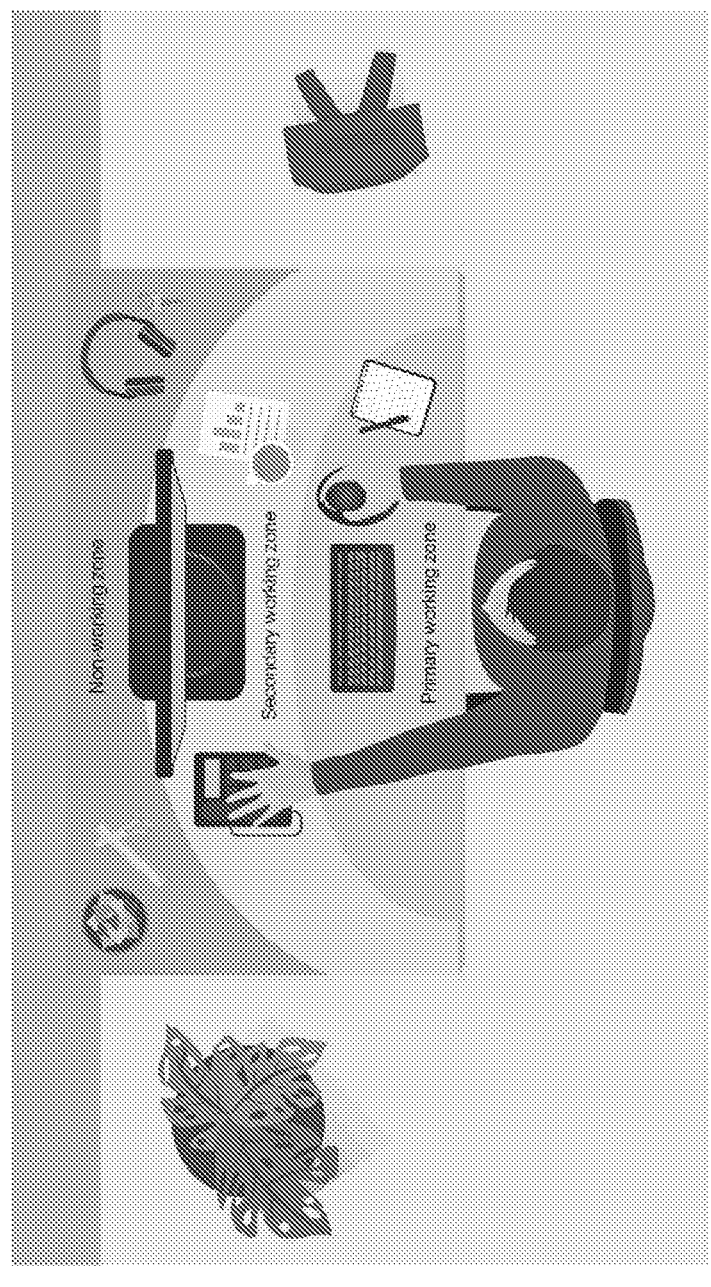
FIG. 1 shows an example of a prior art arrangement of a desk surface, including working and non-working zones as a result of a standard computer and desk arrangement.
Figure 2:
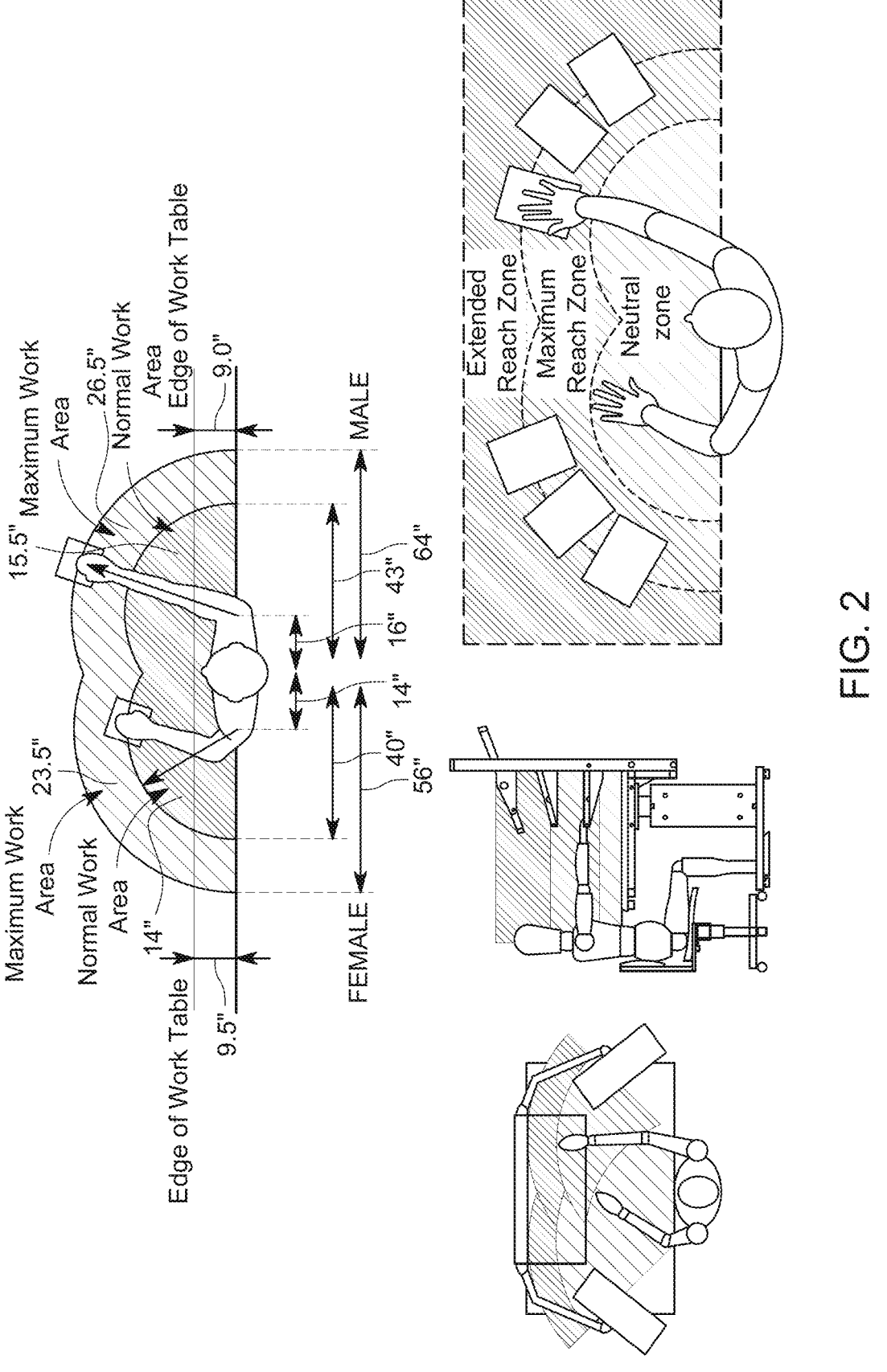
FIG. 2 illustrates examples of defined working zones with regards to a surface of a desktop or table top.

As evident by the drawings and below description, this disclosure relates to a rail system 100 for a workspace that maximizes use and flexibility of work zones of the surface. FIG. 1 shows an example of a typical (prior art) set up for a desktop or table top. Generally, monitors can block a significant portion of a back of a work surface or desk, forming a non-working zone. A secondary working zone and a primary working zone are typically provided in the remaining space. FIG. 2 shows an example of ergonomic reach zones, including on the desktop or table top surface, as well as such zones at a height above said surfaces. The measurements and/or dimensions noted therein are exemplary and not intended to be limiting. This disclosure aims to provide a system that helps move everyday items from the non-working zone(s) into the primary and secondary zones.

Figure 4:
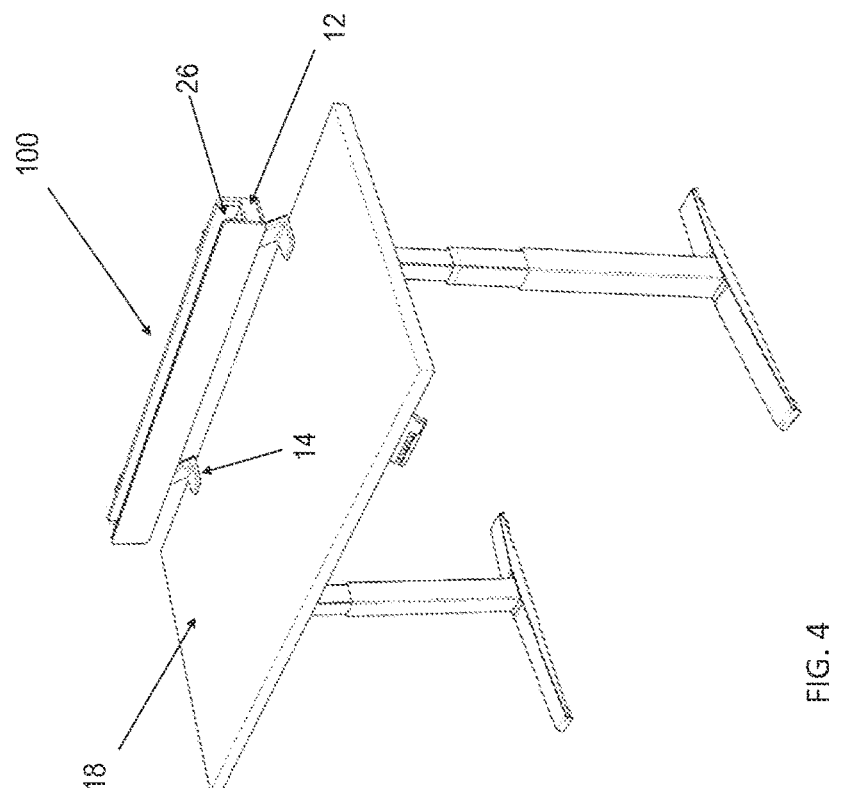
FIGS. 3 and 4 show back perspective and front perspective views, respectively, of a rail and clamps that are part of the disclosed system, in accordance with embodiments herein.
Figure 3:
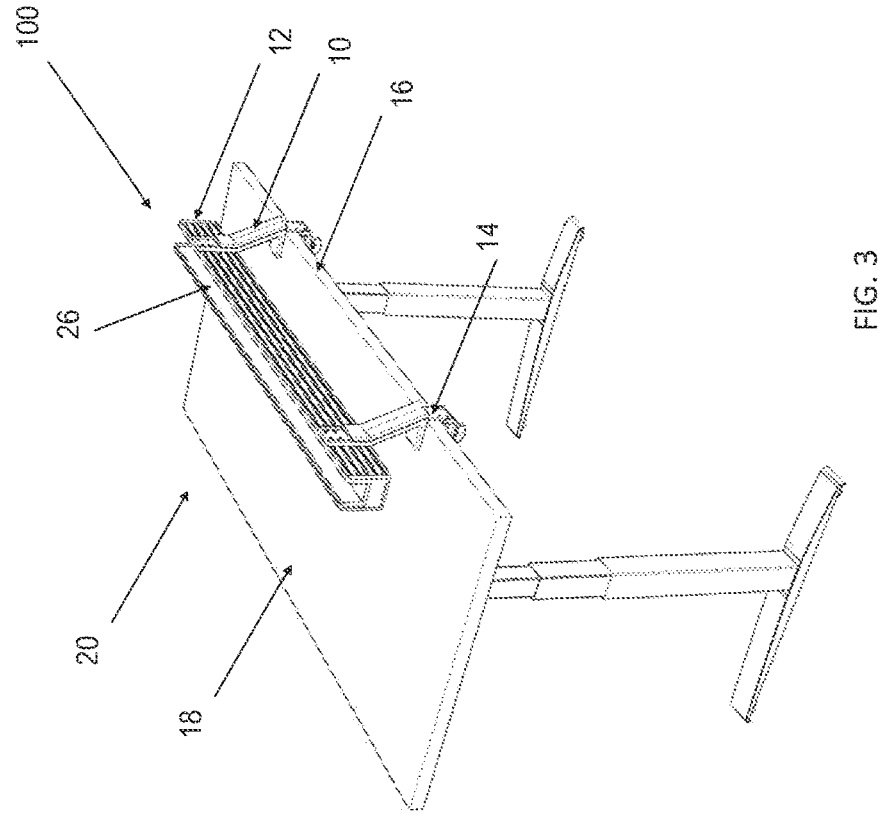
Figures 5, 6:
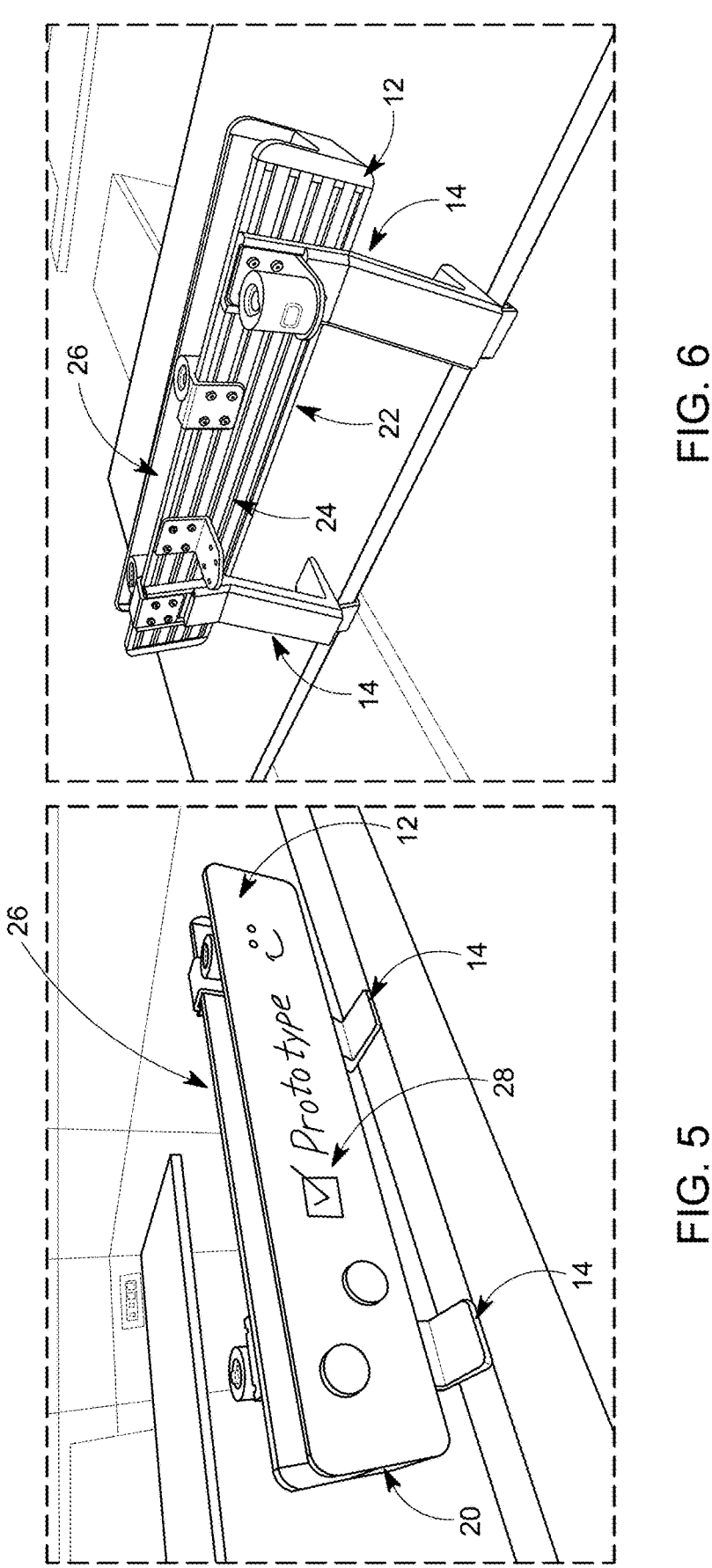
FIGS. 5 and 6 show front perspective and back perspective views, respectively, of the disclosed rail with quick release and connector parts attached thereto, in accordance with embodiments herein.
Figure 7B:
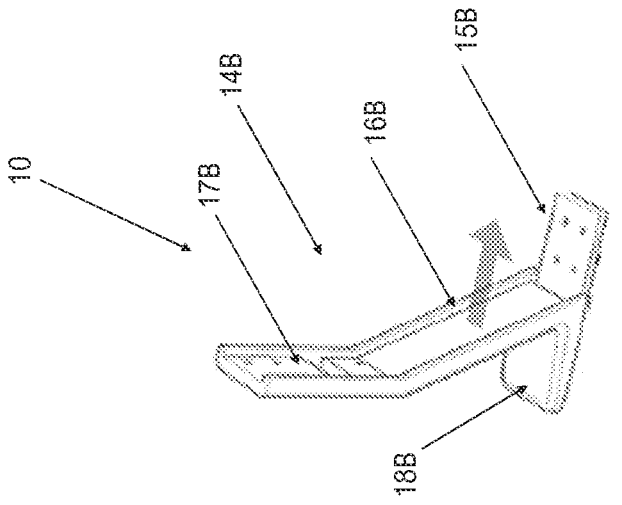
FIGS. 7A and 7B show alternative mounting mechanisms that may be used for attaching the rail to a surface of a table or desk, in accordance with embodiments.
Figure 7A:
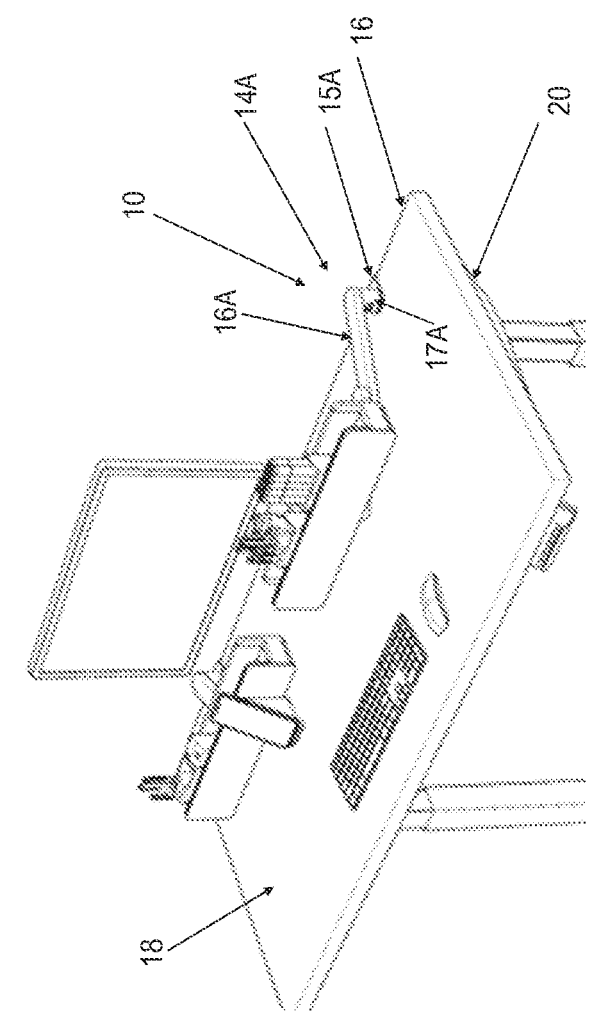

The rail system 100 includes at least one mounting mechanism 10 and an elongated rail 12, as shown in FIGS. 3 and 4. According to embodiments herein, one or more clamp mechanisms 14 are provided as mounting mechanisms, as shown in FIGS. 3-6, and configured for attachment to the elongated rail 12 and further configured for attachment to an edge 16 of, or a surface 18 of, a table or desk 20, so that the clamp mechanisms 14 support the elongated rail 12 relative to said surface. FIGS. 7A and 7B show alternative mounting mechanism 10 for mounting the elongated rail 12 to a surface 18 of a table or desk 20. Specifically, FIG. 7A shows an example of a non-static rail mounting mechanism 10, according to a non-limiting embodiment, in the form of a clamp 14A. Clamp 14A has a clamping portion 15A for attachment the edge 16 and/or surface 18, and a quick mount release mechanism 17A with a mounting rail 16A attached thereto. The clamp 14A allows for pivoting and rotation of the mounting rail 16A in place via a rotatable joint that is part of quick mount release mechanism 17A. In an embodiment, the mechanism 17A may include similar or the same parts as quick release mechanism 56 shown in FIG. 31 and described in detail later with regards to the associated Figures. FIG. 7B shows another example of a rail mounting mechanism 10, according to another non-limiting embodiment, in the form of a clamp 14B. Clamp 14B may be directly mounted to surface 18 of a table or desk top. Clamp 14B has a mount plate 15B that is attached via fasteners to the surface 18. In an embodiment, a raised mounting leg 16B may be attached to the mount plate 15B via a leg portion 18B which is configured for sliding along and relative to the mount plate 15B. Raised mounting leg 16B may further include a vertically extending portion 17B configured for attachment to elongated rail 12 (e.g., a back surface 24 thereof) for securing the rail 12 relative to the surface 18 and at a distance or height thereabove.

Generally, the elongated rail 12 is configured to extend horizontally relative to and above the surface of the table or desk when mounted thereto via said clamp/mounting mechanisms 10 (no matter the configuration used). The elongated rail 12 has at least a front surface 20 (see FIG. 5), a bottom surface 22, and a back surface 24 (see FIG. 6) that defines a channel 26 or trough therein, according to embodiments. The channel 26 (shown in FIGS. 3-4 but also described and illustrated later) extends between a first end and a second end of the elongated rail. The channel 26 may be used for placement of cable(s) 43 and/or electrical cords to/from a power source 32, for mounting components therein (e.g., clamps, brackets, release mechanisms) and/or for connecting accessories to the elongated rail. Accordingly, as described herein, the rail is configured to provide cable management, organizational elements, and power for devices and computers. In embodiments, at least the back surface 24 of the rail 12 (and, in some embodiments, the bottom surface 22 and/or inside of the rail also) includes a number of horizontally extending mounting slots 35 formed therein (see, e.g., FIG. 11 or FIG. 13) that provides at least the back of the rail 12 with a modular slat profile with slots therebetween which allow brackets of various types and/or accessories to attach thereto, in order to mount accessories, clamps, mounts, etc. to the back (and/or bottom, and/or inside) of the elongated rail 12. In order to provide a rail system 100 that is aesthetically pleasing, clean, organized, and modular, according to an embodiment, the slat profile with mounting slots 35 may be provided on the back of the rail system 100 in order to retain modularity of a slat profile, while ensuring the forward face or front surface 20 of the rail 12 is clean and visually impactful (rather than creating an undesirable aesthetic on the front or surface facing the user). Further options described herein include a front writing and erasable surface 28 (see FIG. 5 and FIG. 12A, and corresponding description), which may be magnetic, and/or interchangeable with the front surface 20 of the rail, as well as options for magnetic actuation, including organizational units that magnetically and/or mechanically connect to the system, including a keyboard tray (described later with regards to FIGS. 65-68 and 71-78, for example).

Figures 8, 9:
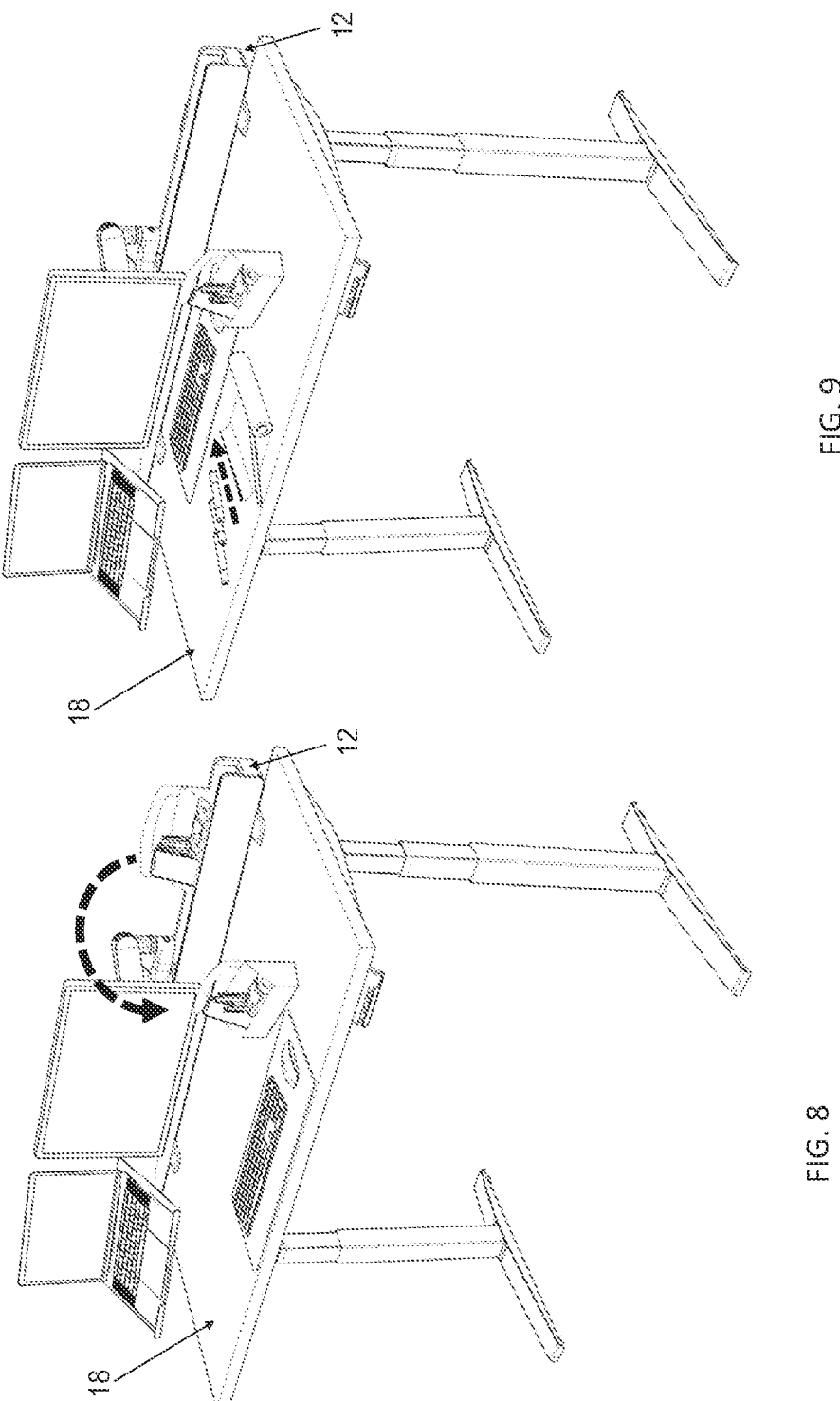
FIGS. 8, 9, and 10 illustrate exemplary arrangements of accessories and working tools on a surface of a desktop/tabletop throughout the day with the disclosed system, in accordance with embodiments herein.
Figure 10:
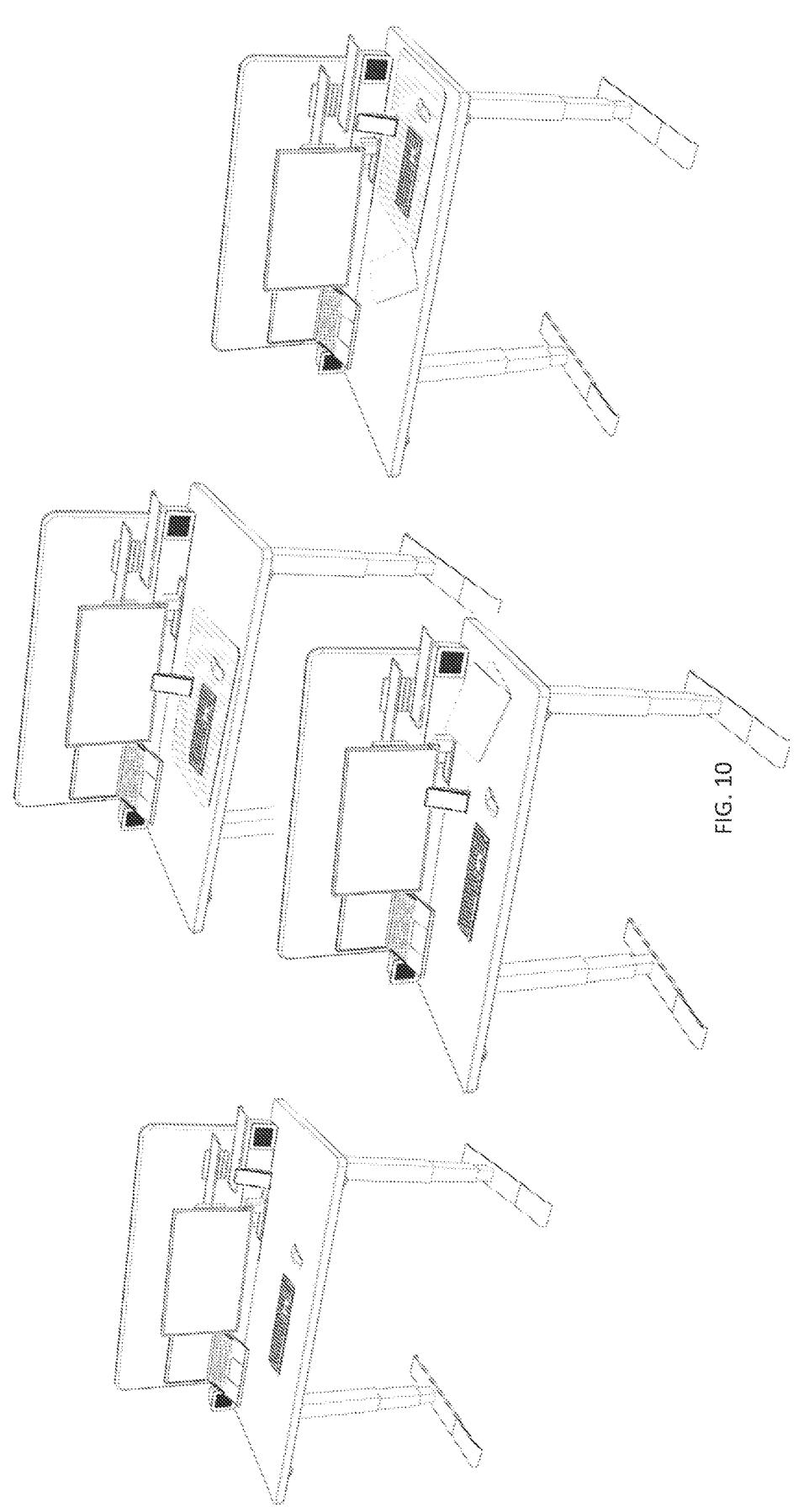

In addition, to mount a computer screen or display screen, quick connect monitor arms may clamp or connect to the elongated rail. Other devices such as quick connect lighting, light blockers, and/or privacy panels may be connected to the elongated rail. Furthermore, a motion rail or track may be provided on underside area (i.e., under the elongated rail; see FIG. 13 and later description of same) allowing for glide action accessories and/or organizational elements which go from the rail, to the surface of the desk or table, which enables movement of items within the work zones, e.g., to help to bring items closer and back as an immediate work area or zone is transformed and used throughout the day. FIGS. 8, 9, and 10 show examples of how a surface of a desktop/tabletop may change throughout the day, which the disclosed system is configured to accommodate by providing the above and later detailed features.

Figure 11:
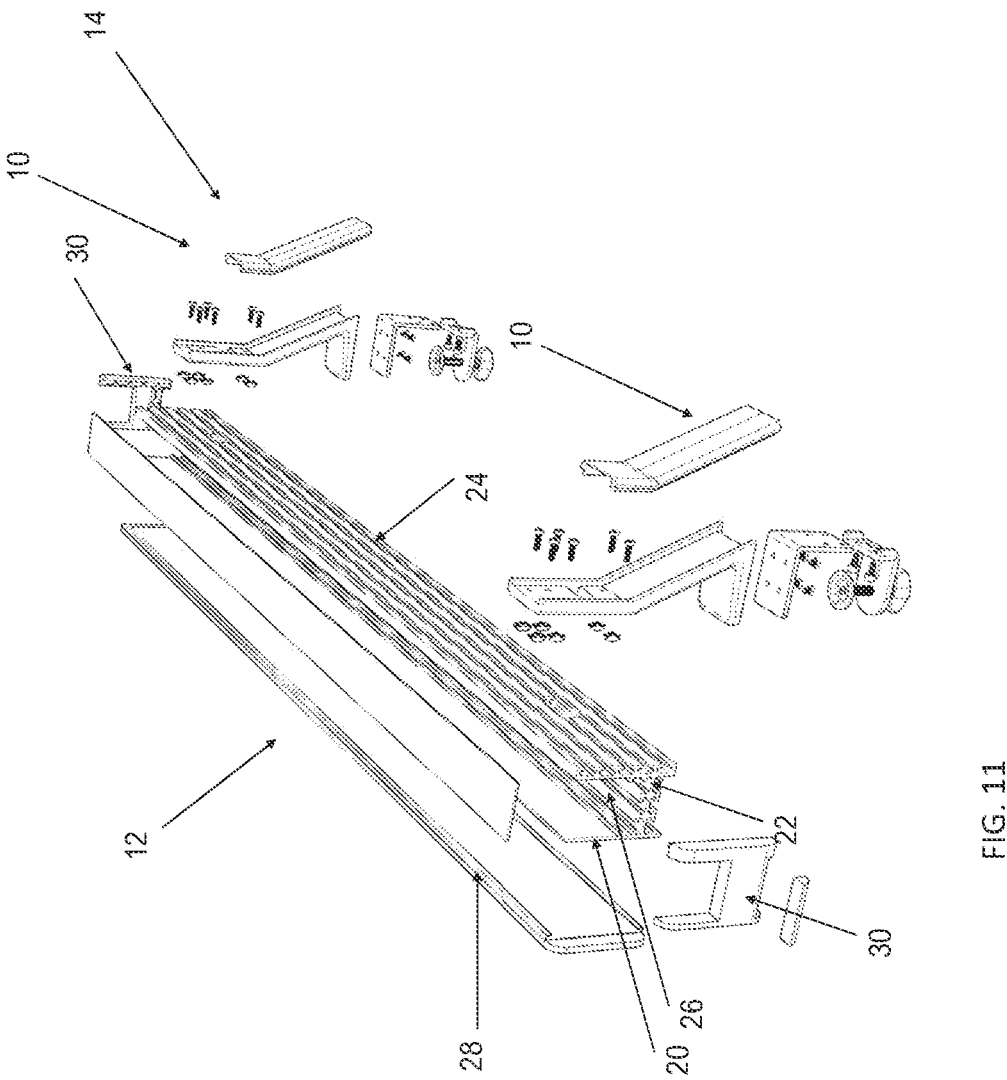
FIG. 11 shows an exploded view of the rail and clamps, in accordance with an embodiment herein.
Figure 12A:
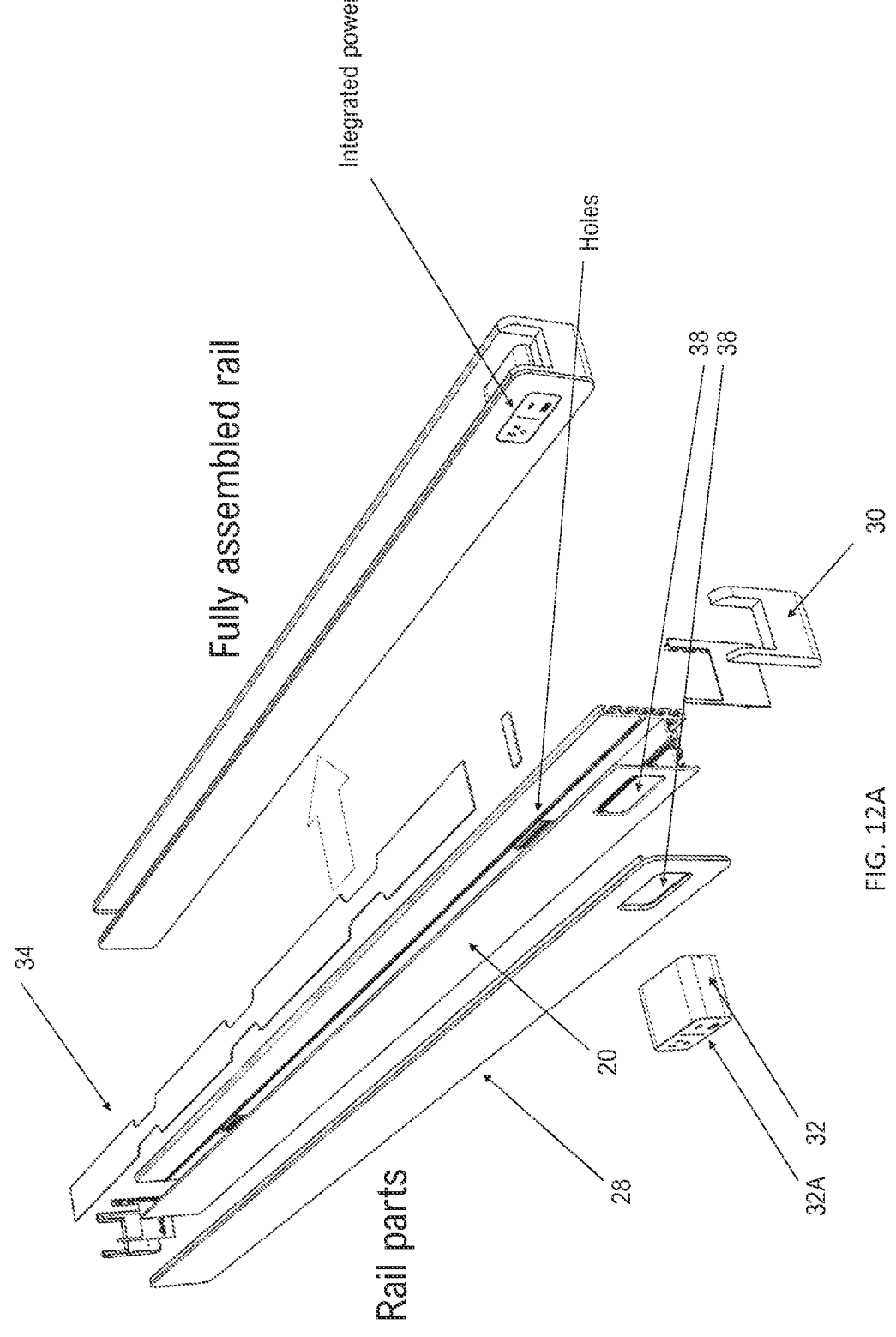
FIGS. 12A and 12B show exploded parts of the rail with examples of a cover and power adapter, in accordance with embodiments herein.

FIG. 11 shows an exploded view of the rail 12 and exemplary clamp mechanisms 14 of the rail system 100 in accordance with an embodiment herein; FIG. 12A shows an alternate embodiment. For explanatory purposes only, a majority of the following Figures illustrate mounting of the elongated rail 12 using clamp mechanisms 14 for support the elongated rail 12 statically relative to said surface 18; however, as previously noted, the mounting mechanism(s) 10 may be altered and/or the elongated rail 12 need not be statically mounted relative to the top of the table or desk 20. As shown, in embodiments, the rail system 100 includes at least two clamp mechanisms 14 for the elongated rail 12 (other embodiments may utilize a mounting mechanism 10 when movement of the rail 12 itself is desirous, such as shown in FIG. 7A and FIGS. 68-70). The elongated rail 12 has a front surface 20, a bottom surface 22, and a back surface 24 that defines the channel 26 therein which extends between a first end and a second end of the elongated rail. In addition to being mounted horizontally and, in some embodiments, statically (when two or more mounting legs, e.g., clamp mechanisms 14, are used), the bottom surface 22 of the rail 12 may be positioned at a height above the surface 18 of the desktop 20 or table top such that objects may be positioned or provided on the surface and underneath the rail. In an embodiment, in addition to securing the clamps thereto, the back surface 24 may be utilized as an area for connecting with connection points (e.g., clamps for secure-ment of the rail; clamps for added accessories including, but not limited to, monitor clamps; etc.). As noted, one or more mounting slots 35 may be provided in at least the back surface of the rail, as well as, in embodiments, provided on in an inside of the rail and/or an underside of the rail (see, e.g., FIG. 11). According to embodiments, two or more horizontally extending mounting slots 35 may be provided in back surface 24 of the elongated rail 12. In a non-limiting embodiment, two to six horizontally extending mounting slots 35 may be provided in the back surface 24. In one exemplary embodiment, four or five horizontally extending mounting slots 35 are provided in the back surface 24 of the elongated rail 12. In an embodiment, the mounting slots/ slats 35 may include raised areas 37 therein or added thereto in order to reduce friction for any sliding elements and/or to create a corresponding shape for attaching accessories thereto. Further, the mounting slots 35 are designed to maximize strength and T-slot functionality.

In an embodiment, the elongated rail 12 may be an extruded rail, formed of a material such as aluminum (e.g., 6063 aluminum extrusion (anodized)). A length of the rail may vary, and is not limited with regards to the size or length of the surface it may be attached to. In embodiments, the length of the rail may be between approximately 24 inches to 60 inches. In embodiments, the length of the rail may be between approximately 36 inches to 48 inches. In an embodiments, the length of the rail may be approximately 24 inches. In an embodiment, the length of the rail may be approximately 48 inches. In an embodiment, the length of the rail may be approximately 60 inches. A height and/or a width of the rail may also vary. In an embodiment, the elongated rail and/or rail system may have an overall height between approximately 3 inches to approximately 6 inches. In an embodiment, the height of the rail may be approxi-mately 4 inches. In an embodiment, the elongated rail and/or rail system may have an overall width of approximately 1 inch to approximately 6 inches. In an embodiment, the width of the rail may be between approximately 2 inches to approximately 4 inches. In an embodiment, the width of the rail may be approximately 3 inches. In one embodiment, the elongated rail and/or rail system may have an overall height of approximately 4 inches and an overall width of approxi-mately 3 inches.

The first end and the second end of the elongated rail also may include end caps 30 thereon, which are also shown in FIG. 12A. In an embodiment, each end cap 30 is formed of two parts that snap together and press fit onto the first and second ends of the elongated rail. For example, in an embodiment, the end caps are inserted into slots provided on the ends. In another embodiment, the end caps may be snapped over or around the edges of the rail. Aesthetically, the end caps provide rounded ends for the elongated rail, e.g., to match the front face. In an embodiment, the end cap part(s) may be formed of plastic, such as ABS plastic.

Figure 12B:
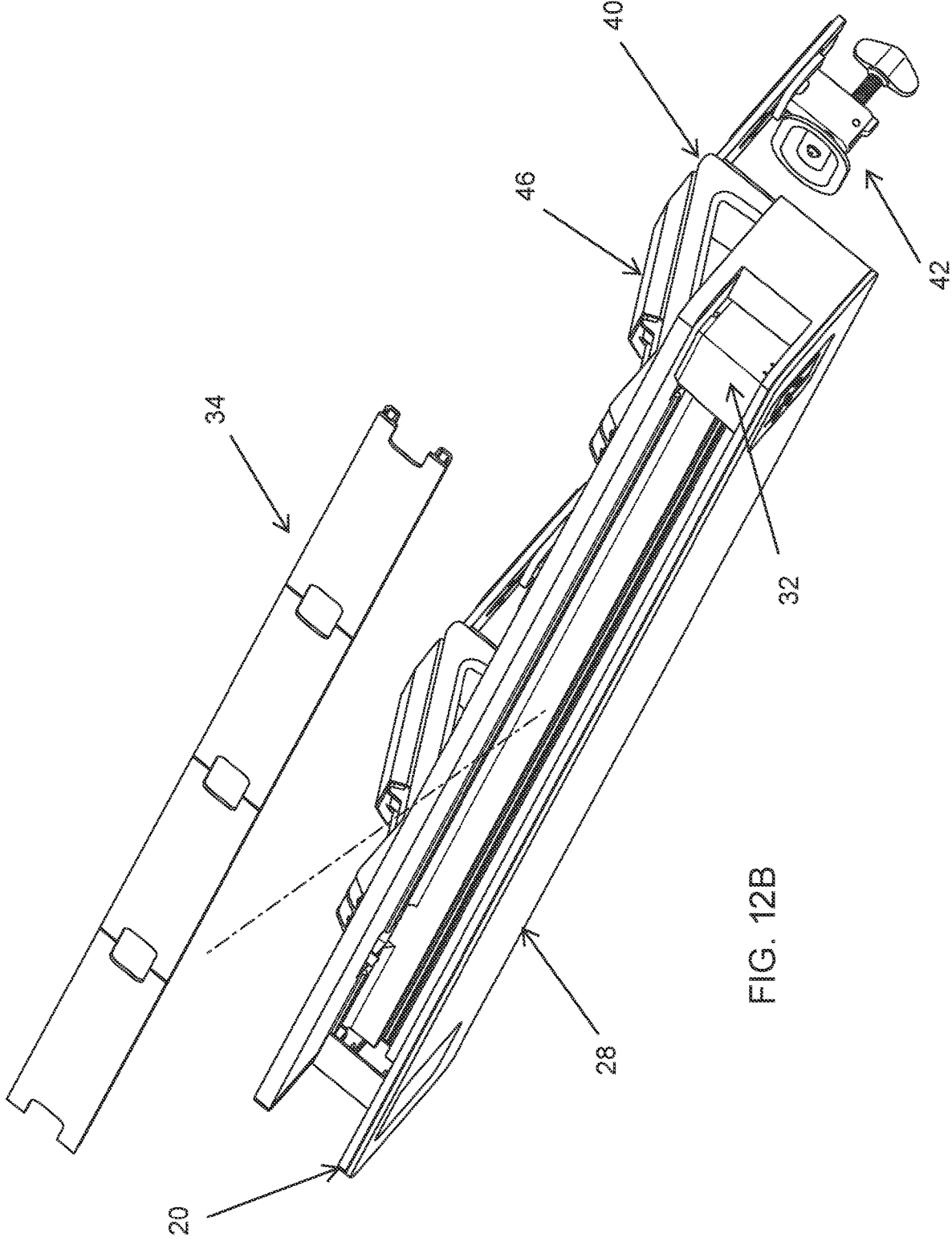

With regards to the channel extending between a first end and a second end of the elongated rail, as noted, cables 43 and/or electrical cords to/from a power source 32 may be placed therein. In embodiments, at least a portion of the channel is covered via an elongated and optionally seg-mented cover 34 (e.g., shown in FIGS. 11 and 12A-12B) that is an internally positioned cover, i.e., a cover that divides the channel into a top portion and a bottom portion, such as shown in the side view of FIG. 13. Such cover 34 may be referred to as an elongated cover herein. However, it should be noted that the elongated cover 34 may be formed as a single element (such as shown in FIG. 12A) or as multiple elements (such as shown in FIG. 12B) combined and placed in the elongated rail, and designed to cover the elongated channel within the elongated rail 12. The cover 34 may be inserted or slid into the elongated rail 12 according to embodiments. The bottom portion of the channel (that is covered) may act as a dedicated space (see FIG. 13) for the cable/cord management for the power source and other electronic elements that are mounted on the elongated rail. The channel may include bump outs 36 therein (shown in FIG. 13) for holding the cover/s thereon. As an example, a pair or a set of bump outs may be provided on either side of the channel, e.g., on an inside surface opposite the front surface and an inside surface opposite the back surface, parallel to one another and with a ledge for holding the cover(s) thereon. One or more sets of bump outs may be provided within the channel, so that a size of the dedicated space may be adjusted.

In an embodiment, the cover 34 may include cut-out portions, as shown in FIGS. 12A and 12B, spaced along its edges to allow for cables 43 and/or cords to enter and exit the channel, for example, when the cover is positioned on the bump outs. The cover 34 may be formed from plastic in accordance with embodiments.

According to embodiments herein, the front surface 20 of the elongated rail 12 is shown with an optional one or more hole(s) 38 therein for receipt of a power connector from a power source 32, i.e., an electrical outlet on a wall or floor. A housing 32A of the power connector may inserted in the hole 38 (e.g., such that it snaps into the hole and front) and a back portion of the housing 32A may be positioned within the channel, e.g., the dedicated space and/or on bump outs portions, such as shown in FIGS. 12A, 12B, 14, and 15. In embodiments, the hole(s) 38 and thus the housing of the power connector may be centered vertically with the same space to the side as well and will snap into the front. After the component/power connector is snapped into the rail, its power cord is designed to fit under the cable cover when connected to a power source. The power connector may include AC and/or USB ports (USB C and/or USB A ports), for example. According to an embodiment, the power con-nector is configured to meet or exceed these specs: 1 AC outlet: 15 A, 125V, 60 hz; 1 quick-charge USB-A port: 3 A, 5V; and 1 quick-charge USB-C port: 3.1 A, 5V. The housing of the power connector may be provided in the form of plastic, e.g., ABS plastic housing that surrounds the elec-tronics, in an embodiment herein.

In an embodiment, the end caps may additionally and/or alternatively have power integrated therein, i.e., provide access to ports and/or a power source, in a similar manner as described with regards to the front surface and face of the elongated rail.

Figures 14, 15:
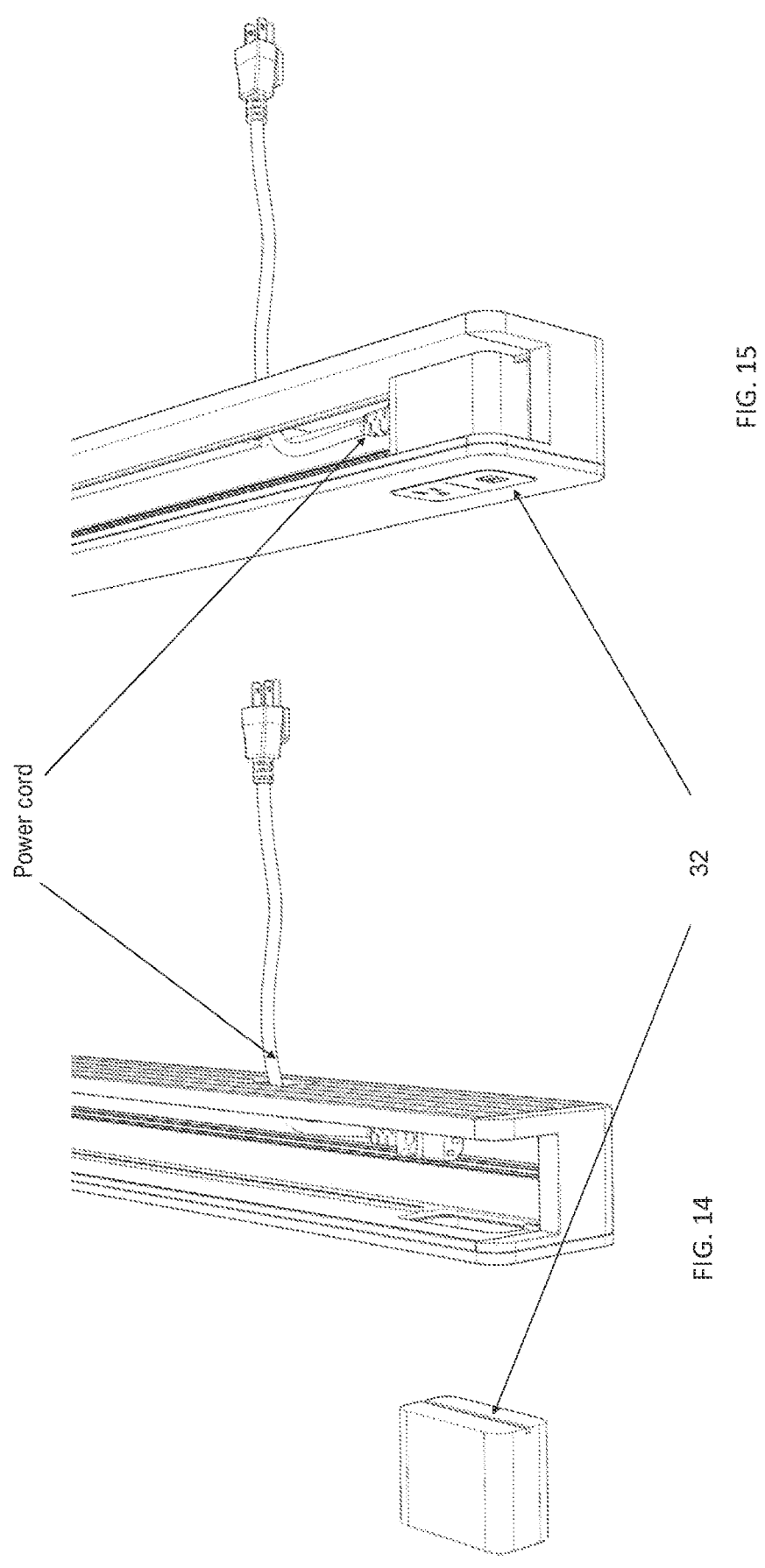
FIGS. 14 and 15 show insertion of a power component into the elongated rail, in accordance with an embodiment herein.

Additional hole(s) may be cut out (machined) or provided in the extruded rail, e.g., in back surface 24 thereof as shown in FIGS. 14-15, for cables/cords 43 to extend out of the back of the rail system (to go to/from a power source; to/from connected electronics mounted in/on the elongated rail; etc.). FIGS. 14-15 show how a front of a power component (power source 32) is designed to snap into and through a front surface 20 of the elongated rail 12, while a back housing of the power source 32 is fitted on the inside of the rail 12, i.e., within its channel 26, e.g., near an end cap. A power cord 43 with plug at its end—and/or similar cable (s)—connects to the component housing and is designed for placement under the cover 34 along with the component housing.

Figure 13:
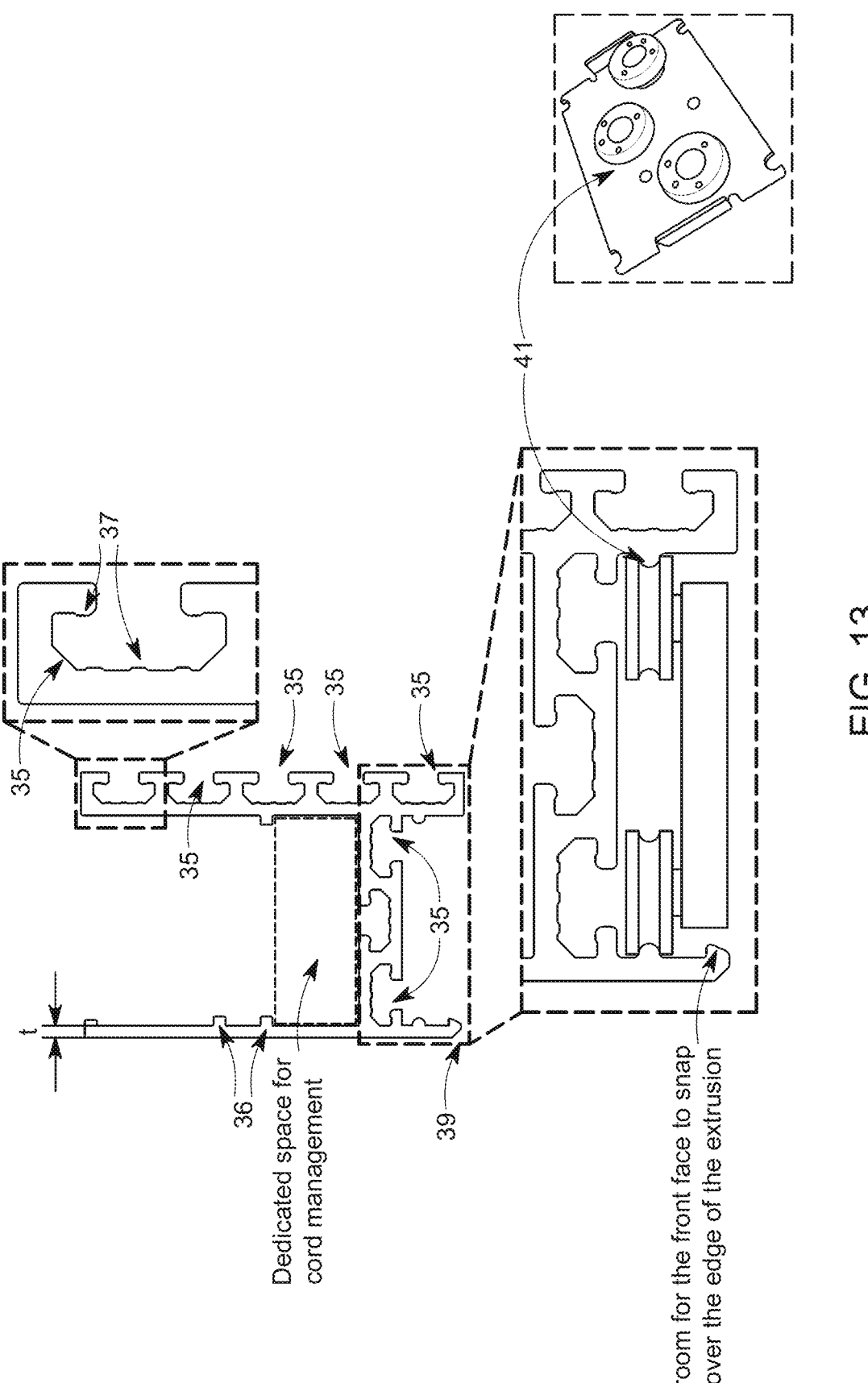
FIG. 13 shows a side view of the rail, without end caps, in accordance with an embodiment herein.

FIG. 13 also shows an example of a wheeled or sliding mounting bracket(s) that include load bearing slider(s) 41 (or rollers, or wheels) to move along a bottom surface or underside of the elongated rail 12. In an embodiment, the load bearing sliders may be constructed out of machined aluminum and assembled (e.g., bolted on) the bracket. Said sliders may be shaped to match the corresponding track features provided on the bottom or underside of the elongated rail 12. FIG. 13 shows an example of a bottom of the rail 12 being shaped to have a channel and elongated guides (shown in cross-section in the Figure, in the form of a bump or extension) that are received in a detent of the sliders for guiding the sliders thereon along the length of the rail 12 in a horizontal direction. Such a bracket may be attached or mounted directly or indirectly to an accessory and/or a moving arm for accessories, allowing for moving items in and out of the work zones, including the primary work area, and/or surface of the desk or table, moving items horizontally (side to side) along the rail (when viewed from the front or back), as well as facilitating the ease of bringing needed tools of the trade for a particular task into and out of the primary work area throughout the work day. This action along with pivoting or rotating (single or double pivot) of an attached arm allows for semi-complex articulation allowing the accessories to move into the user-preferred work zone, be articulated into position, and to return to a storage and/or out of the way position (against the elongated rail). As previously noted with regards to FIG. 5, front surface 20 (or 28) may be designed to provide an aesthetically pleasing appearance in addition to function(s). In an embodiment, the front surface 20 of the elongated rail may have writing and (dry) erasable surface 28 attached thereto, such as shown in FIG. 12A and FIG. 12B. In an embodiment, the surface 28 may be a tempered glass surface and/or other materials such as plastic, designed as a forward-facing surface that is similar to a white board surface and therefore may be written upon by dry markers. An optional backing surface (e.g., galvanized steel backing surface or other sheet metal layer, or a painted metal layer) may be placed between the front surface 20 of the elongated rail 12 and a back surface of the writing and erasable surface 28 to provide magnetism, i.e., the ability for the writing and dry erase surface to connect (snap) over the front surface of the rail (see FIG. 13) and/or to secure magnets thereto for holding items thereon. That is, the added backing surface allows, for example, magnetic retention of notes and other elements by way of the metal layer immediately behind the surface 28. Further, the magnetic surface may be used in addition to the front surface 20 and/or edge of the channel of the elongated rail 12 to retain heavier items, such a shelves or bins, like those described later with reference to FIGS. 71-78.

The surface may be a snap on surface that snaps over the front surface of the elongated rail. In an embodiment, as shown in FIG. 13, a bottom edge 39 or surface of the elongated rail 12 is shaped, e.g., with a projection, to allow the surface to snap thereover. In a similar context, a projection may also or alternatively be provided a top edge of the elongated rail 12. According to an embodiment, a thickness and/or a shape of the backing surface may change whereas the front surfaces are of similar thicknesses for positive engagement and securement. In a non-limiting embodiment, the thickness t (see FIG. 13) of the walls forming front, back, and bottom surfaces of the elongated rail 12 [not including the mounting slots] is approximately 0.125 in.

In an embodiment, the surface and the backing surface include corresponding holes therein that are cut out and align with holes in the front surface of the elongated rail (see 38 in FIG. 12A, for example). For example, both surface and backing surface may include a hole for the integrated power component and/or a multitude of corresponding holes therein if more than one power component is utilized as to be forward facing to the user.

Figure 18:
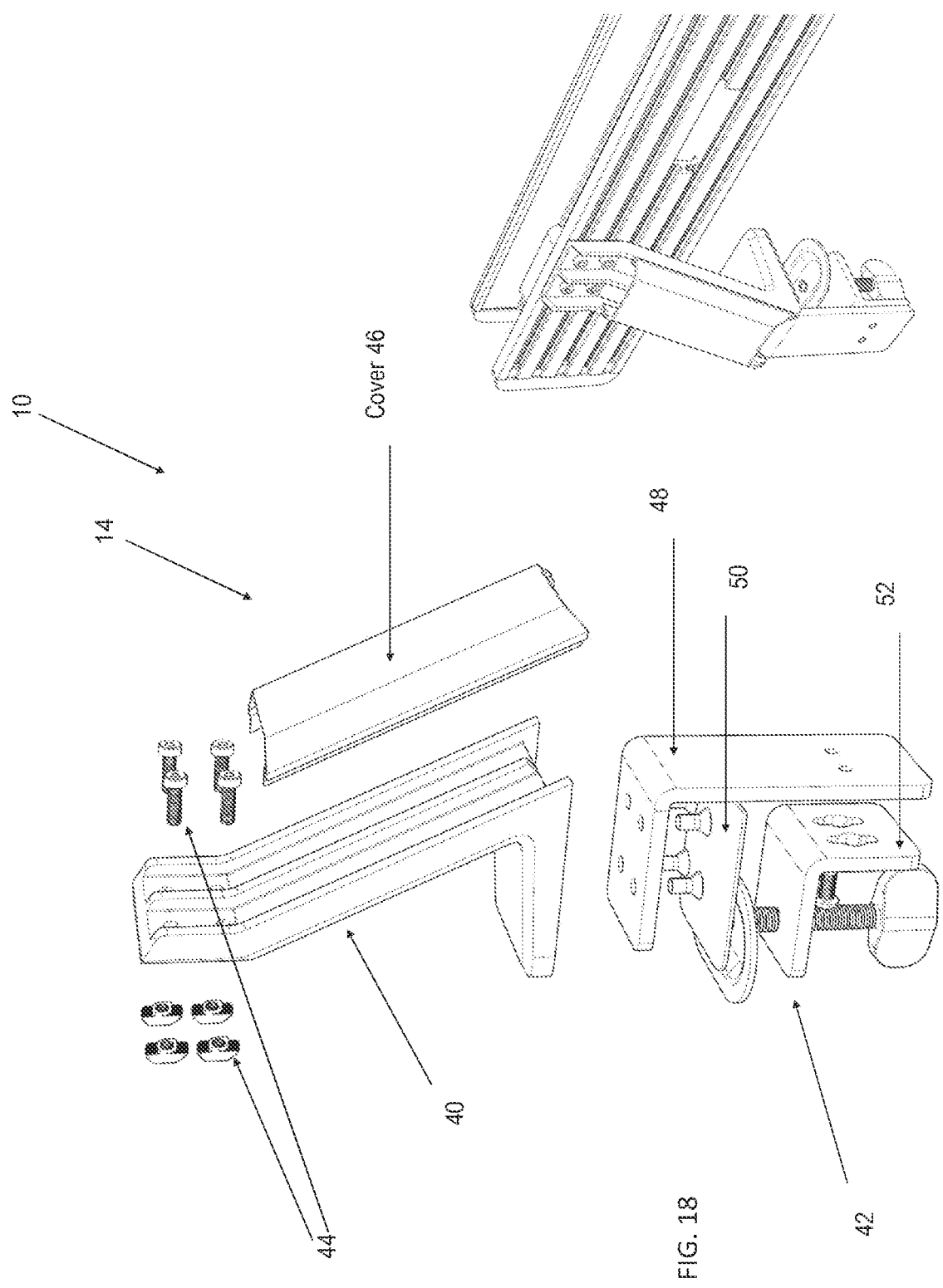
FIG. 18 shows an exploded view of parts of a clamp mechanism, in accordance with embodiments herein.
Figures 19, 20:
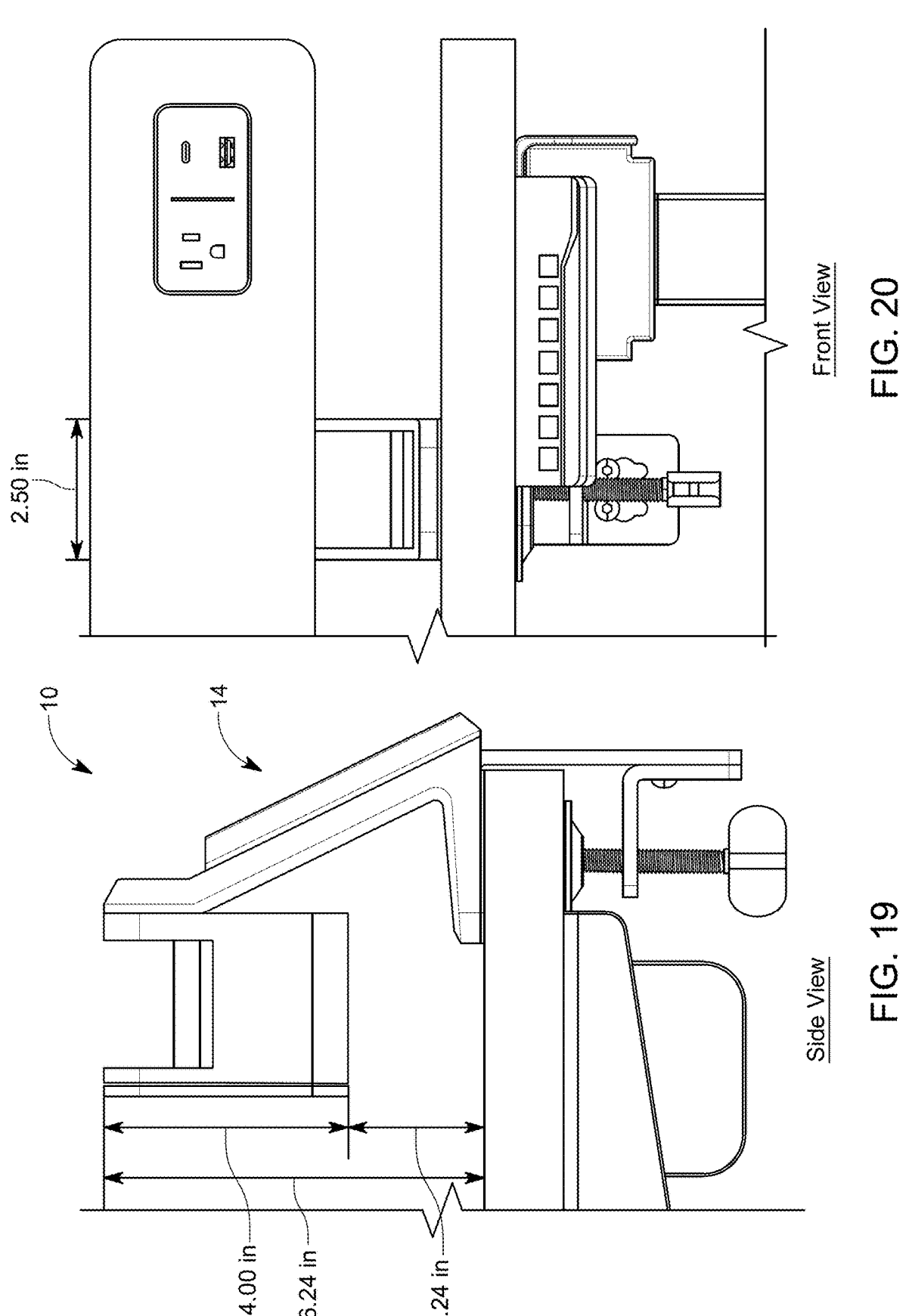
FIGS. 19 and 20 show side and front views, respectively, of a clamp mechanism as mounted to an edge of a desktop or table top, in accordance with embodiments herein.

Turning now to FIGS. 18-20, exemplary embodiment of the clamp mechanism(s) 14 used with the rail 12 in the rail system 100 are shown. Each clamp mechanism 14 may include a first mounting portion 40, or attachment bracket, configured for attachment to the elongated rail 12, and a second mounting portion 42, or base clamp combined with a table clamp, configured for attachment to an edge 16 of, or a surface 18 of, a table or desk 20. The first mounting portion 40 is designed to handle the force(s) and/or torque from the elongated rail and weight(s) of components secured thereto. The first mounting portion may be provided in the form of an angular part or attachment bracket that is attached via fasteners 44 (e.g., bolted or screwed) to the rail, for example, via stainless steel hardware. As shown in FIG. 18, for example, the first mounting portion 40 may connect to the elongated rail 12 via four or six T-nuts. In an embodiment, one or more rib reinforcements may be added to the clamp body to provide further structural support and rigidity to the first mounting portion; these support ribs may be spaced in such a way as to function as cable routing channels as well.

In an embodiment, a top portion of the first mounting portion 40 is configured to line up with a top of the elongated rail 12, such as shown in FIG. 19; however, the top portion of the clamp mechanism 14 may also be configured to connect to a lower part of the elongated rail 12 based on a user's desired height of the rail. Based on the attachment and placement of the first mounting portion 40/clamp mechanism 14 to the elongated rail 12, according to a non-limiting embodiment, a distance or height of the space between the top surface 18 of the desktop (or table top) and a bottom surface 22 of the elongated rail 12 and/or rail system 100 may be adjusted. That is, since the back surface 24 of the elongated rail 12 includes, in embodiments, a number of (multiple) horizontally extending mounting slots 35, these slots 35 act as and provide several attachment locations for mounting mechanism(s) 10 (e.g., clamp mechanism(s) 14) as well as other items and accessories. Accordingly, in embodiments, first mounting portion(s) 40—or the employed mounting mechanism(s) 10—may be attached to a particular [one] mounting slot of the multiple mounting slots 35 on the back surface 24 of the elongated rail 12, thus determining the distance or height the rail/system is provided above the surface 18 of the desk/table. Moreover, the multiple mounting slots 35 allow for adjustment of the height of the rail 12 relative to the surface 18 by allowing changes in the location (slot) in which such portions/mechanisms are attached. In embodiments, the distance or height of the space between the top surface 18 of the desktop/table top and bottom surface 22 of the elongated rail 12 or system 100 may be between approximately 2 inches to approximately 6 inches. In embodiments, a distance or height of the space between the top surface of the desktop (or table top) and a bottom surface of the elongated rail may be between approximately 2 inches to approximately 4 inches. In one embodiment, a distance or height of the space between the top surface of the desktop (or table top) and a bottom surface of the elongated rail may be between approximately 2.2 inches to approximately 3.5 inches. In an embodiment, the first mounting portion or bracket may be a cast aluminum clamp portion. Each mounting mechanism may have a width of approximately 2.5 inches to approximately 2.75 inches, for example, according to embodiments herein. However, such dimensions of the distance/height and mounting mechanisms are exemplary only and not intended to be limiting in any way.

Figure 17:
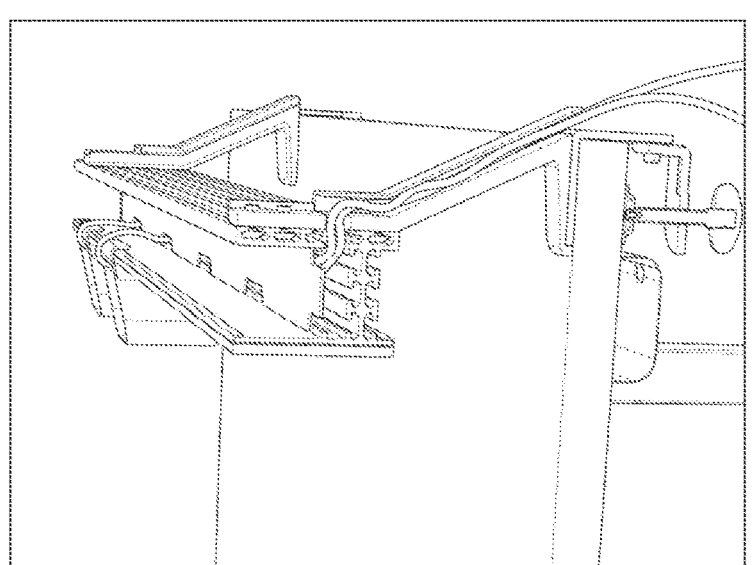
FIGS. 16 and 17 show examples of routing cables and/or cords within the rail system, according to embodiments herein.
Figure 16:
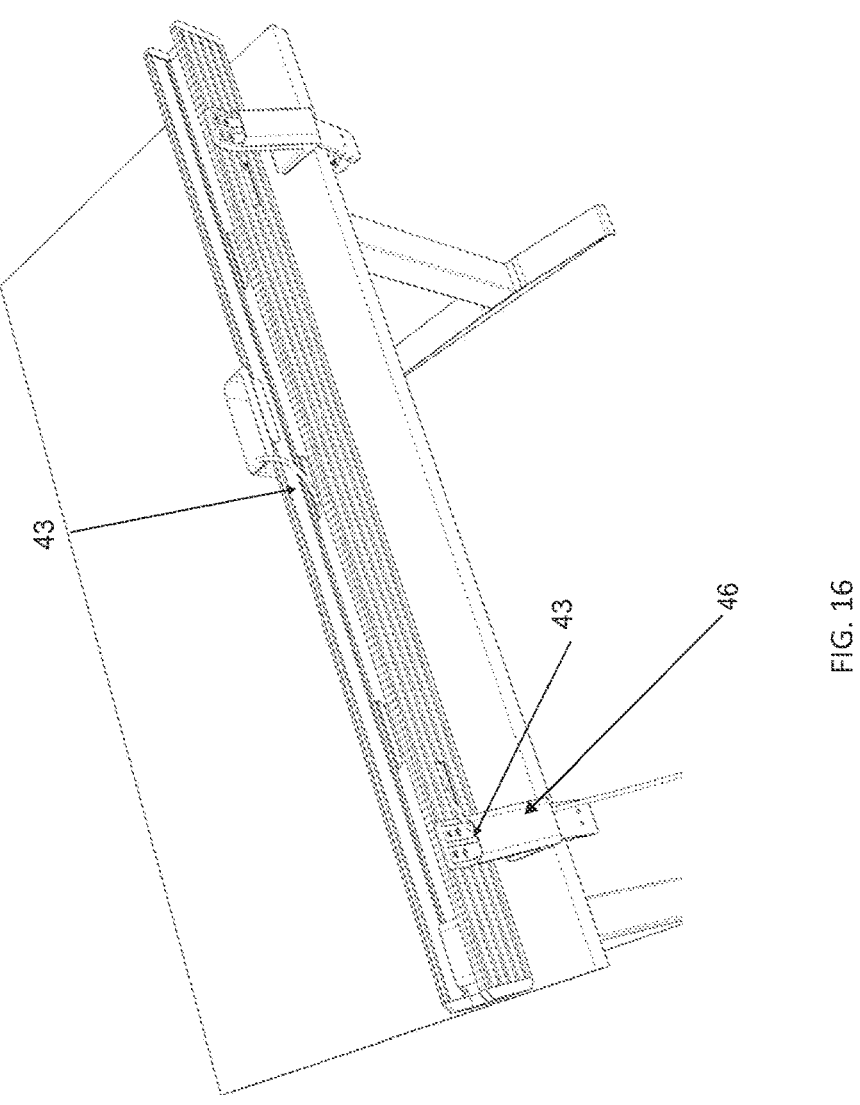

In embodiments, a corresponding angular cover, referred to as a mount cover 46, may be connected to (e.g., snapped onto) each first mounting portion on an outer or back surface thereof to cover at least a portion of said back surface (or outer surface) of the mounting portion and provide an aesthetically pleasing look. In an embodiment, a bottom of the mount cover may be angled or cut off to limit projection of its edge (see, e.g., FIG. 19). Moreover, at least one feed channel may be formed between the back/outer surface of the first mounting portion and inside surface of the mount cover, which allows for further cable or cord management by feeding and/or hiding cables and/or cords therein, as depicted in FIGS. 16 and 17. Accordingly, cables 43 and/or cords may be fed such that they are positioned to go down the back of the mounting mechanism and covered by the mount cover. In an embodiment, as previously noted, the back surface of the first mounting clamp portion may have cable management ribs and at least one channel, with a cover thereon, allowing for main power cable/s to be routed up through the clamps/mounting mechanism(s) from the nearest wall or floor outlet.

The second mounting portion 42 may include a base clamp 48, e.g., in the form of an L-bracket, that is configured to connect to the attachment bracket/first mounting portion 40 at a bottom portion or back portion thereof. The second mounting portion 42 may further include a desk pad 50 (for positioning on a top of the surface of the desk or table top; see FIG. 18) to limit markings thereon and a table clamp 52 that is configured to include a tightening mechanism for engagement with a bottom surface of the desktop or table top, as shown in FIGS. 19-20. In alternative configurations, the base clamp 48 may be replaced with a surface mounting plate which is directly mounted to the surface of the desk or table allowing the first mounting portion to attach directly and securely to the surface mounting plate.

Figures 21, 22:
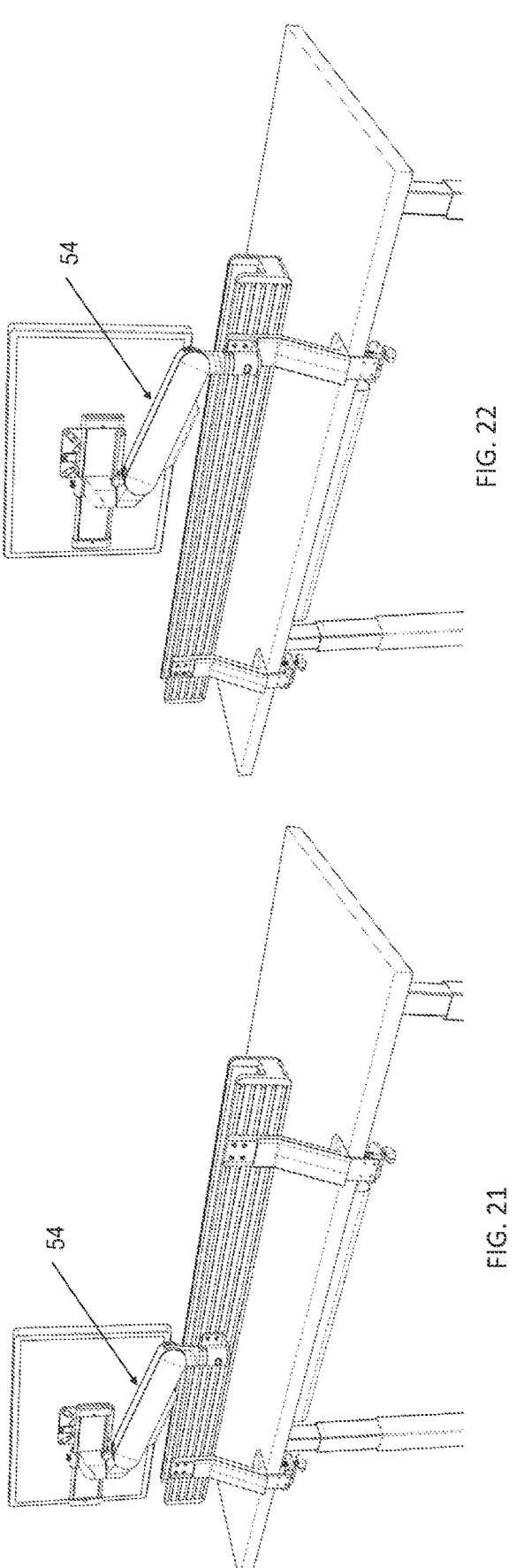
FIGS. 21-26 show examples of attaching a monitor to the elongated rail of the rail system using a monitor arm arrangement, in accordance with embodiments herein.
Figures 23, 24:
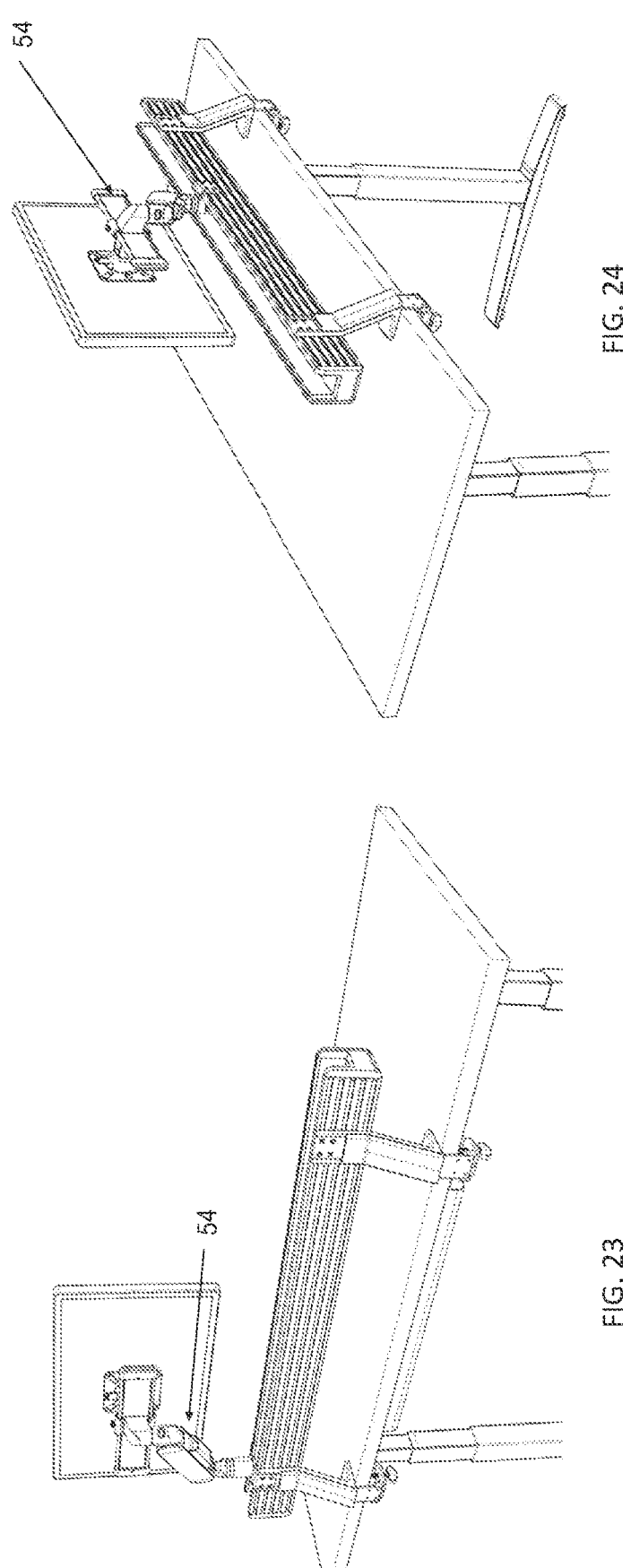
Figures 25, 26:
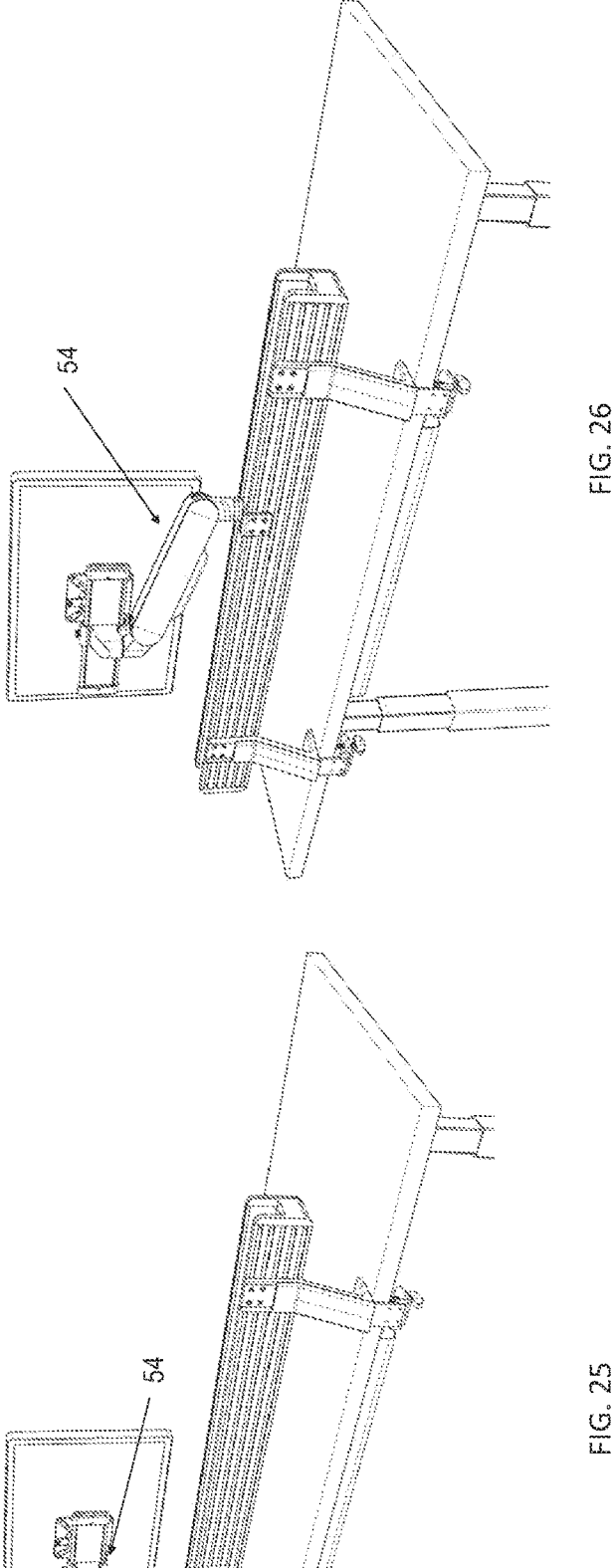

According to embodiments herein, one or more monitors (e.g., computer monitors) or screens may be attached to the elongated rail via one or more monitor arm arrangements 54 that includes at least one arm that is attached at one end to the monitor and at another end to a mechanism (described later below with respect to FIGS. 31-44) connected to the elongated rail 12. FIGS. 21-26 show examples of attaching a monitor to the elongated rail of the rail system using a monitor arm arrangement, in accordance with embodiments herein. FIG. 21 shows an example of using a monitor arm that is attached to the back surface of the elongated rail, according to one embodiment. FIG. 22 shows an example of using a monitor arm that is attached to the back of one of the clamp mechanisms, according to another embodiment. FIG. 23 shows an example of using a monitor arm that is attached over the elongated rail and to the clamp mechanism, according to one embodiment. For example, an L-bracket may be used to attach the monitor arm to the clamp mechanism. In another embodiment, a U-bracket may be used to attach the monitor arm to a back of the elongated rail. FIG. 24 shows an example of using a monitor arm that is attached over and to the back of the elongated rail, according to another embodiment. In yet another embodiment, shown in FIG. 25, the monitor may be positioned in the channel of the elongated rail, with the monitor arm attached to the clamp mechanism. FIG. 26 shows an example of still yet another embodiment wherein the monitor may be positioned in the channel of the elongated rail, with the monitor arm attached to the back surface of the elongated rail.

Figure 27:
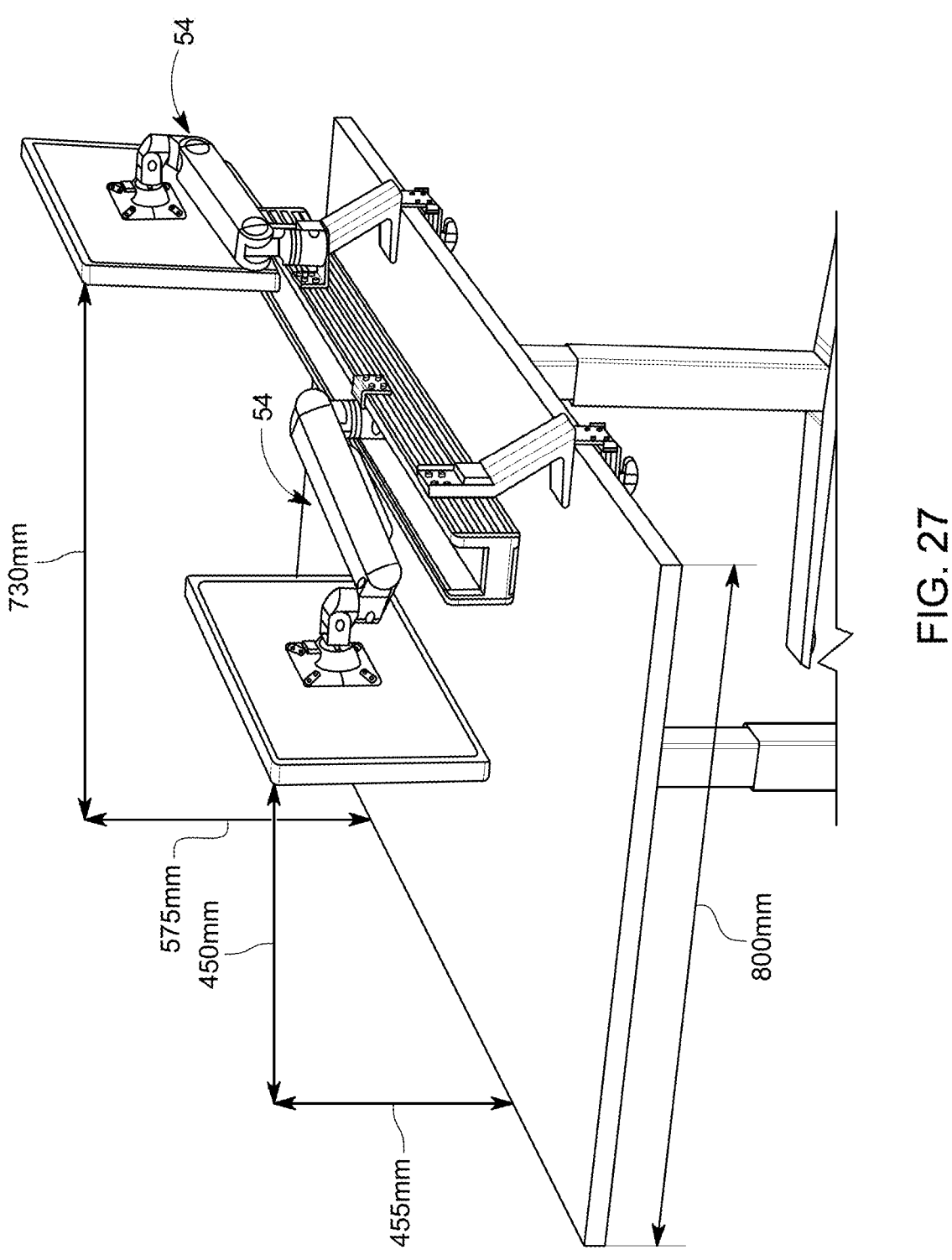
FIG. 27 shows one exemplary embodiment showing mounting of dual monitors to the rail system.

In embodiments that include two or more monitors designed for attachment to the elongated rail of the rail system, a combination of attachment locations like those shown in FIGS. 21-26 may be implemented. FIG. 27 shows one exemplary embodiment showing mounting of dual monitors to the rail system, wherein one monitor arm arrangement is mounted within the channel of the elongated rail, and another monitor arm arrangement is mounted to the back surface of the elongated rail.

Figures 28, 29, 30:
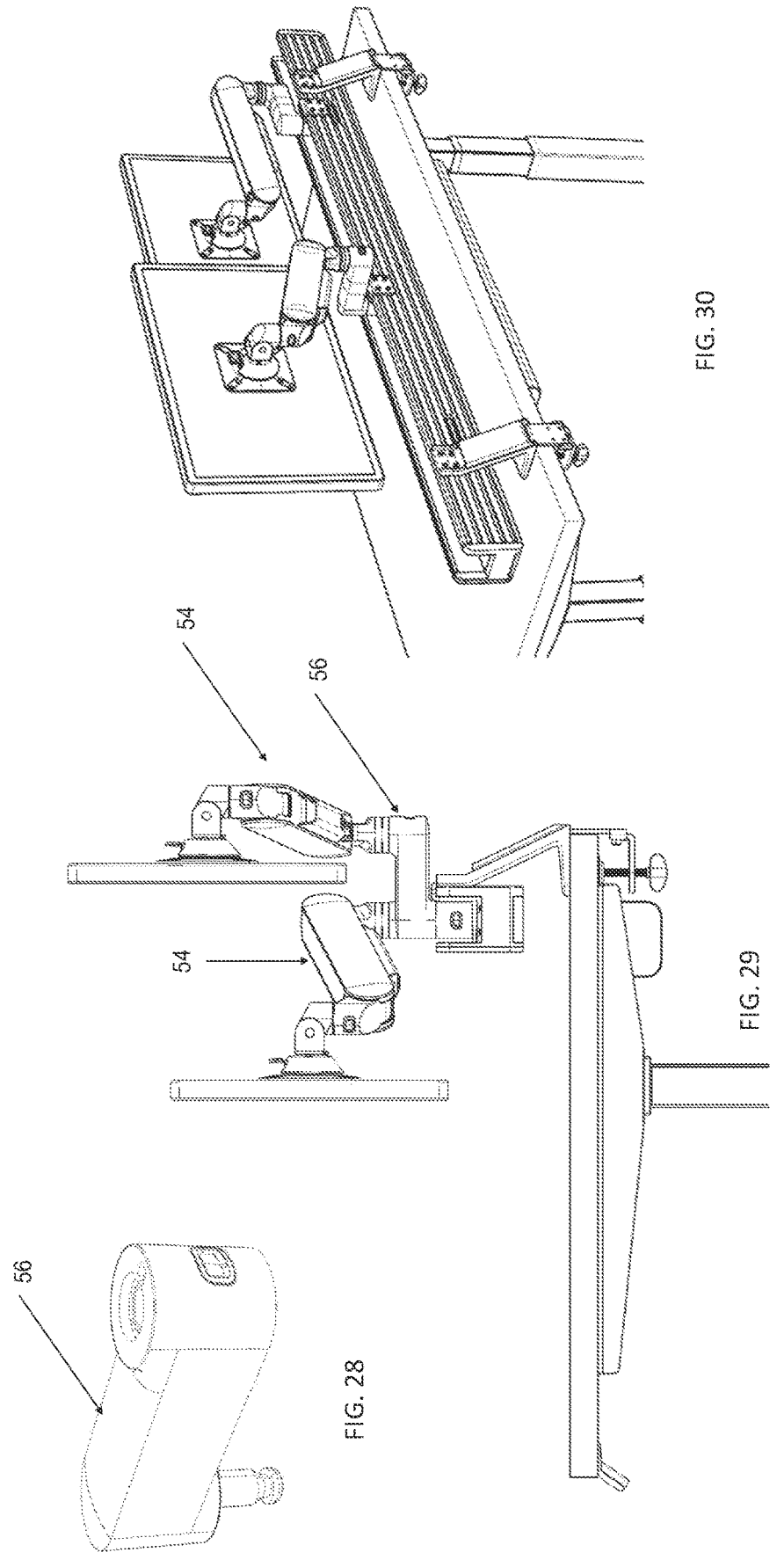
FIG. 28 shows an example of a horizontal arm that may be utilized with the rail system, in accordance with an embodiment.
FIGS. 29-30 show examples of mounting the horizontal arm of FIG. 28 within the elongated rail of the rail system, with a monitor arm arrangement attached thereto.

FIG. 28 shows an example of a horizontal arm 56 that may be utilized with the rail system, in accordance with an embodiment. In particular, the horizontal arm 56 may be mounted at a first end within the channel of the elongated rail of the rail system and have a monitor arm arrangement 54 attached to a second end thereof, as shown in FIGS. 29-30.

Figure 31:
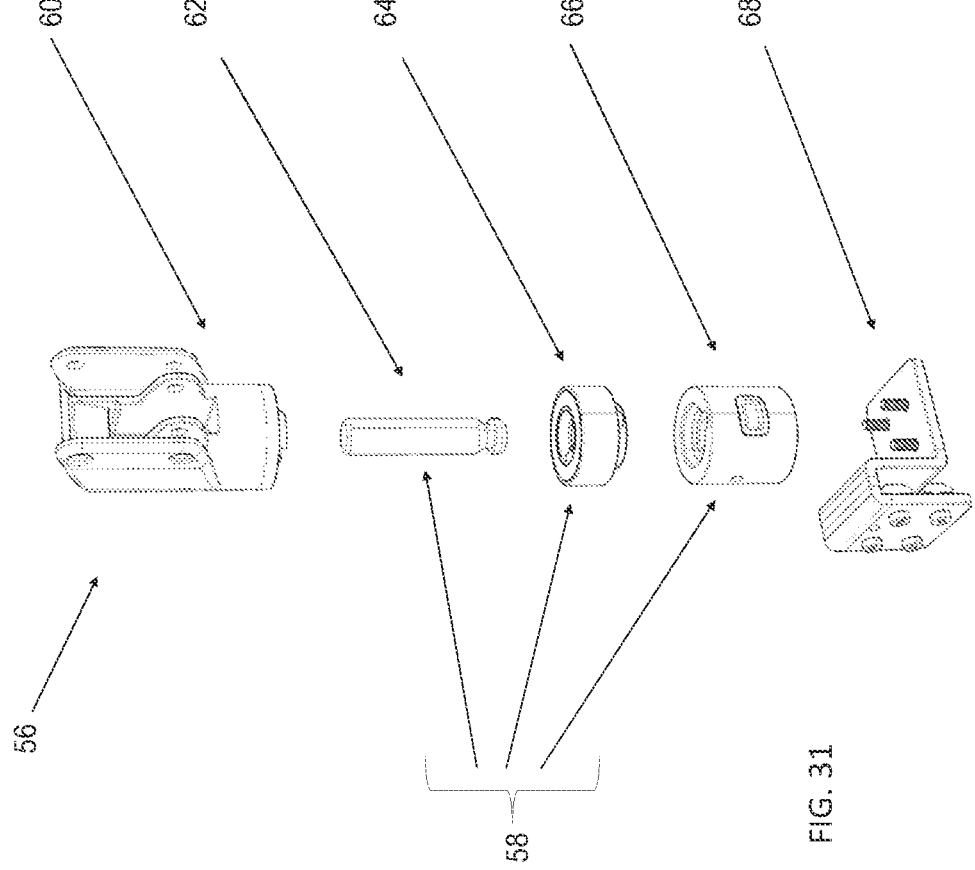
FIG. 31 shows an exploded view of parts of a quick release mechanism according to embodiments herein.

According to embodiments herein, a monitor arm arrangement 54 includes one or more arms and at least one quick release mechanism 56. FIG. 31 shows an example of parts that may be provided as part of the quick release mechanism 56 according to embodiments herein. The quick release mechanism 56 may include a universal attachment system 58 that includes a quick release pin 62, a 180 degree rotation limiter 64, and a quick release adapter 66. The quick release mechanism 56 may further include an adjusted joint 60 and a primary mounting bracket 68, according to embodiments herein.

The quick release pin 62 may be a machined pin that is press fit into the bottom of the adjusted joint 60, in an embodiment. The 180 degree rotation limiter 64 may be placed in between the joint 60 and the quick release adapter 66 with a set screw used to limit the rotation. The quick release adapter 66 may be designed for snapping with the quick release pin 62 to allow for quick connect and release of any compatible components. The primary mounting bracket 68 is configured to attach to the adapter 66 inside of the rail 12 with most of the weight on the back mounting slots 35 of the rail and some of the weight resting inside of the rail. As shown in FIG. 32, some of the weight (of the quick release adapter and attached arm/components/accessories) is taken on by the extrusion because the front is designed to rest on the bump out(s) inside the rail. According to an embodiment, a main attachment of the primary mounting bracket 68 may be mounting slots 35 that are provided on the back surface 24 of the rail 12, e.g., via fasteners as shown in FIG. 32, because that is the strongest part of the rail. That is, most or a majority of the weight of such attachments is distributed to the back surface 24. The bracket 68 (mounted into the slat profile on back surface 24) is a quick connect interface allowing a male protrusion of the monitor arm mount to be inserted into the button actuated receiving interface, according to embodiments herein. Due to the use of bracket 68, the monitor arm arrangement 54 may be placed in any number of positions within or outside of the trough/channel 26 since back of the bracket 68 may be attached by way of the slat profile on back surface 24 and mounting hardware/fasteners.

As shown in FIG. 33, a back portion 73 of the primary mounting bracket 68 has a number of holes therein, including a countersunk hole 70 for a hex wrench for a reenforcement screw 71 inserted through and into the quick release adapter, as shown in FIG. 34, to help dissipate some of the force on the bottom of the bracket. The remaining holes 72 (e.g., four) in the back portion are T-nut holes for attaching to the slats in the back of the rail via fasteners inserted therethrough. A front extension 75 of the primary mounting bracket includes holes 74 (e.g., four) for attaching to a bottom of the quick release adapter 66. In an embodiment, the primary mounting bracket 68 is formed of a material such as 5 mm thick Steel.

Figure 35:
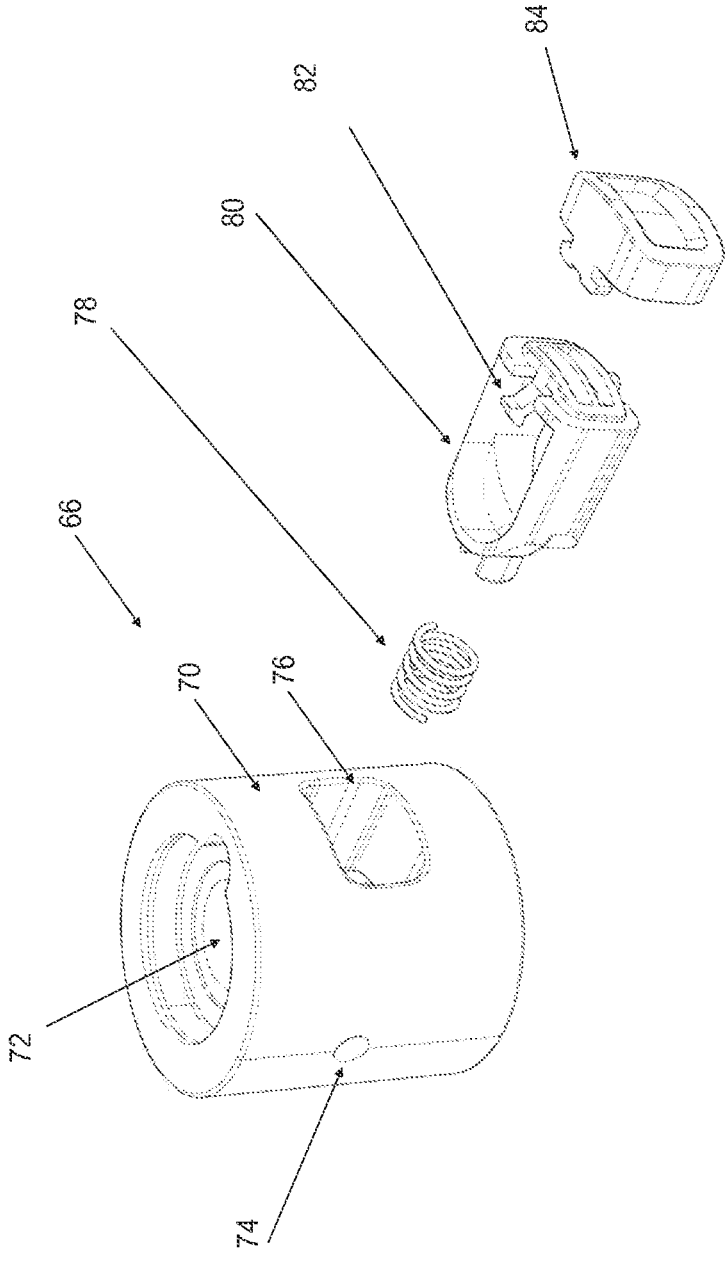
FIG. 35 shows an exploded view of parts of the quick release adapter of the quick release mechanism of FIG. 31, according to embodiments herein.

Parts of the quick release adapter 66 are shown in FIG. 35. The quick release adapter 66 may include, according to embodiments herein, a main body 70 formed of e.g., aluminum, with a center area 72 machined therein a post-process in order to hold tight tolerances with the quick release pin. A threaded hole 74 is provided on each side of the adapter for re-enforcement screws that help hold the adapter to the mounting bracket. In an embodiment, a number (e.g., four) of threaded holes (not shown) are on the bottom of the adapter for connecting to the bracket. An opening 76 is provided in the quick release adapter that receives a spring 78 to hold a button 80 in the forward position when it is not pressed in. The spring 78 may be formed of steel and the button 80 may be formed of plastic, e.g., ABS plastic, in accordance with an embodiment. The button 80 is used to release the pin when pressed in. The button 80 includes a clip 82 thereon to hold the button in and allow for disassembly with a small screw driver. A button cover 84 may also be included on a front surface of the button to provide a soft texture and to make for less tooling when creating buttons for different shaped adapters. According to an embodiment, the button cover may be formed of TPE material.

Figure 36:
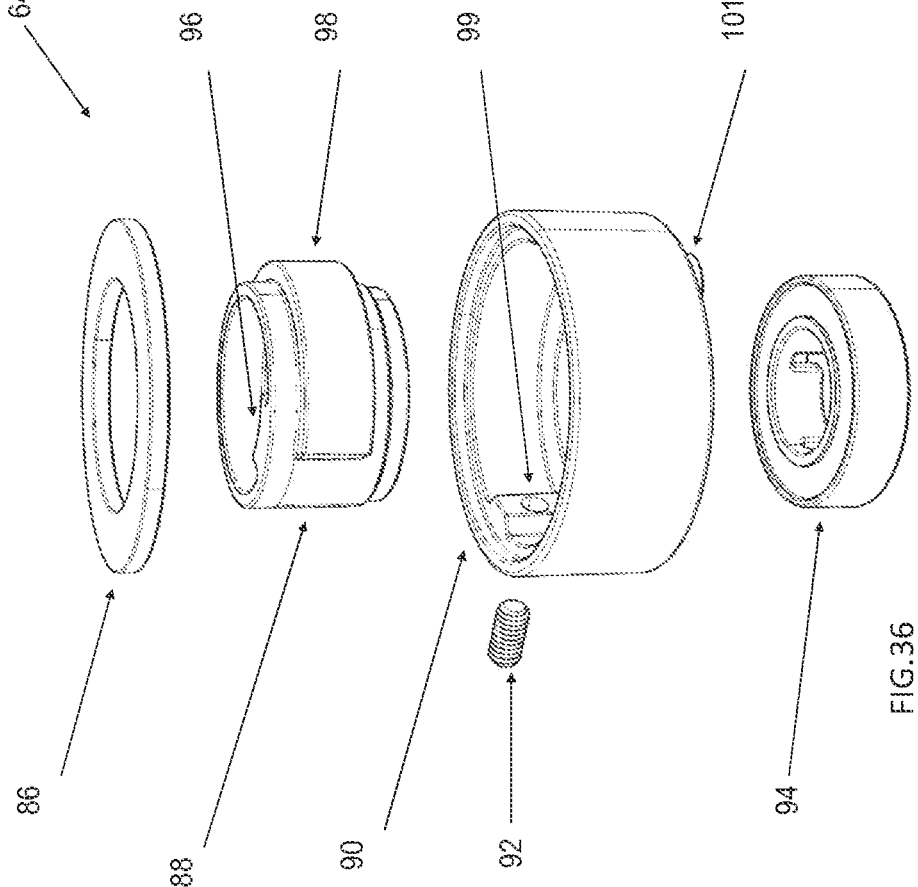
FIG. 36 shows an exploded view of parts of an 180 degree rotation limiter that is part of the quick release adapter of FIG. 35.
Figures 37, 38:
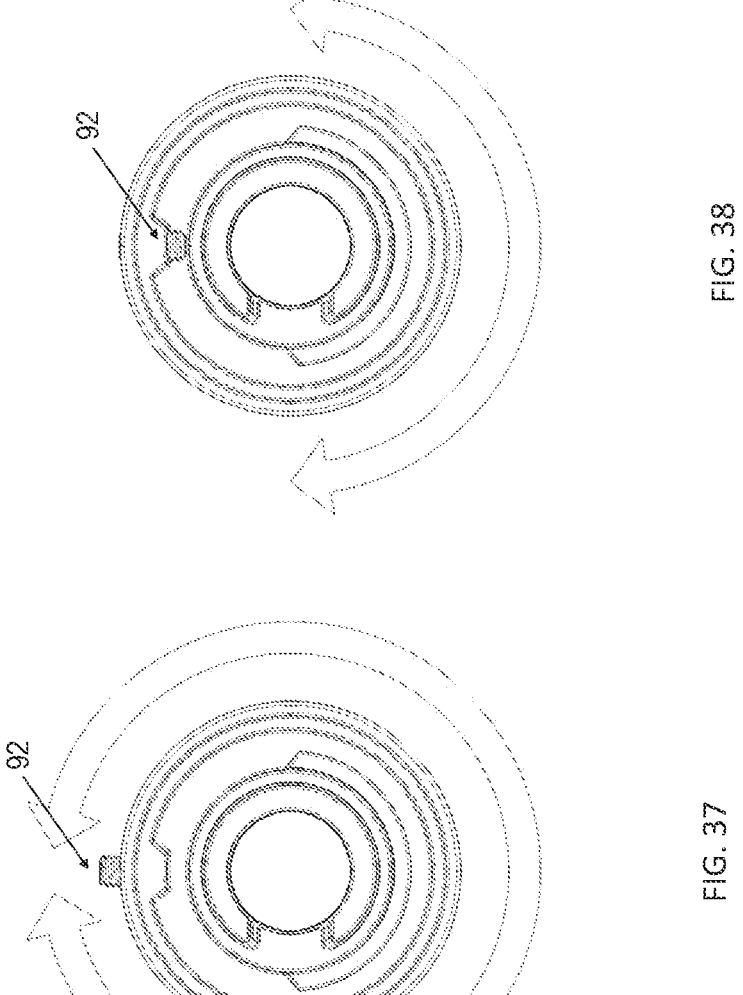
FIG. 37 and FIG. 38 show top views depicting rotations without a set screw and with a set screw, respectively, provided by the rotation limiter of FIG. 36.

FIG. 36 shows parts of the 180 degree rotation limiter 64. According to an embodiment, a top bushing 86 is press-fit into a main outer housing 90 and holds the assembly together. In an embodiment, the main outer housing 90 is designed to lock into the quick release adapter 66 positioned there-below. In a non-limiting embodiment, the top bushing 86 may be formed of a nylon material and the main outer housing 90 may be formed of aluminum. An inner element 88 is designed to rotate with an attached monitor arm, for example. The inner element 88 may be formed of an aluminum material according to an embodiment. In the inner element 88, inner feature key(s) 96 may be provided for insertion/connection into the monitor arm and thus make the inner element 88 rotatable with the monitor arm. The inner element 88 may further include an outer feature 98 which runs into a set screw 92 when it is screwed in and limits the rotation to 180 degrees, according to an embodiment. A threaded hole 99 may be provided in the main outer housing 90 that holds the set screw 92 that limits the rotation. As shown in FIG. 37, for example, the monitor arm can rotate 360 degrees when the set screw is not screwed in. However, as shown in FIG. 38, when screwed in, the set screw limits the rotation to 180 degrees. In an embodiment, an attached monitor arm may rotate 180 degrees when the set screw is partly screwed in, or rotation may be locked if screwed in far enough to the point that the screw is pressing against the inner element. In an embodiment, the set screw 92 may be formed of steel. The main outer housing 90 may also include bottom feature keys 101 which are configured for insertion into the quick release adapter 66 below to ensure that the outer housing 90 does not rotate with respect to the adapter 66. In an embodiment, a bottom bushing 94 may be provided to fit tightly around the quick release pin 62 from the monitor arm and hold the limiter assembly 62 on the arm. Such a bushing 94 may be formed of a material like nylon, for example.

Figure 39B:
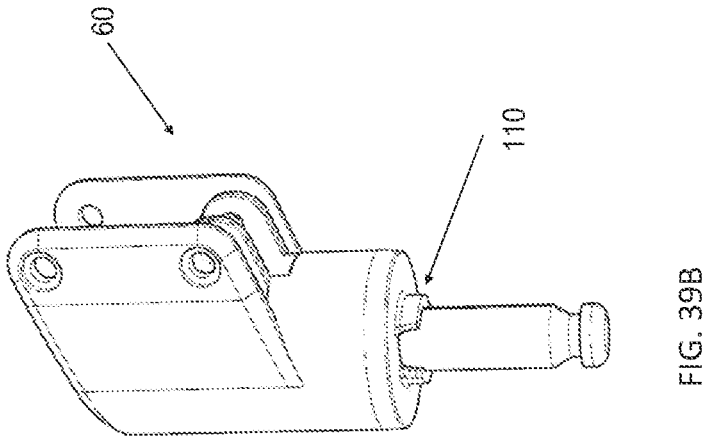
FIGS. 39A and 39B show an exploded view and an assembled perspective view, respectively, of an example of parts of an adjusted joint used in the quick release adapter of FIG. 35 according to embodiments herein.
Figure 39A:
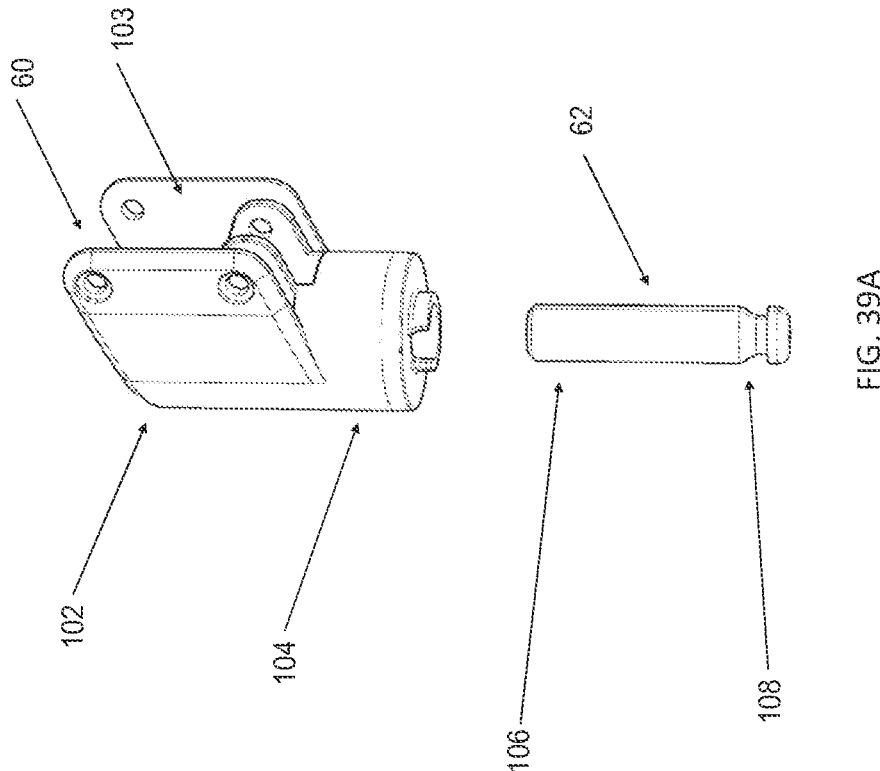

FIGS. 39A and 39B show an example of parts of an adjusted joint 60 according to embodiments herein. An upper section 102 of the joint includes a bracket 103 for receipt of a monitor arm. A lower section 104 of the joint provides material for the pin to be press-fit in. That is, a top portion 106 of the quick release pin 62 presses into the joint 60 through the lower section 104. A bottom portion 108 of the quick release pin 62 may be designed to be secured and locked into the quick release adapter 66. In an embodiment, a bottom 110 of the joint interfaces with the rotation limiter 64. The adjusted joint 60 may be formed of aluminum, according to a non-limiting embodiment. In an embodiment, the quick release pin 62 is formed of steel.

Figure 42:
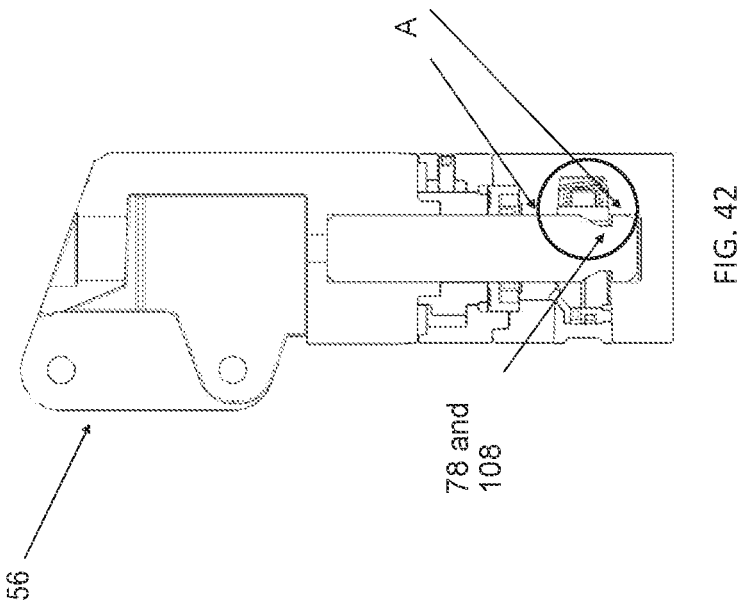
FIGS. 40 to 42 show cross sectional views of the functionality of the quick release adapter of FIG. 35.
Figure 41:
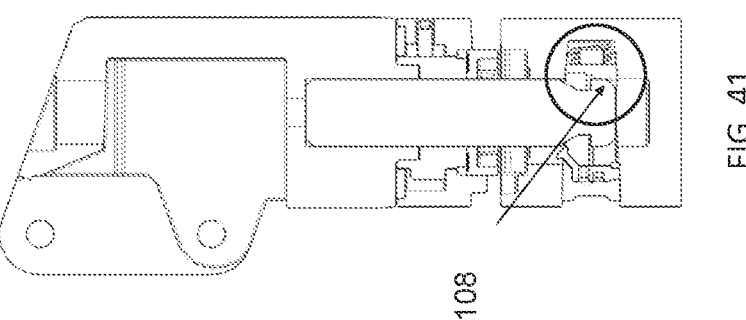
Figure 40:
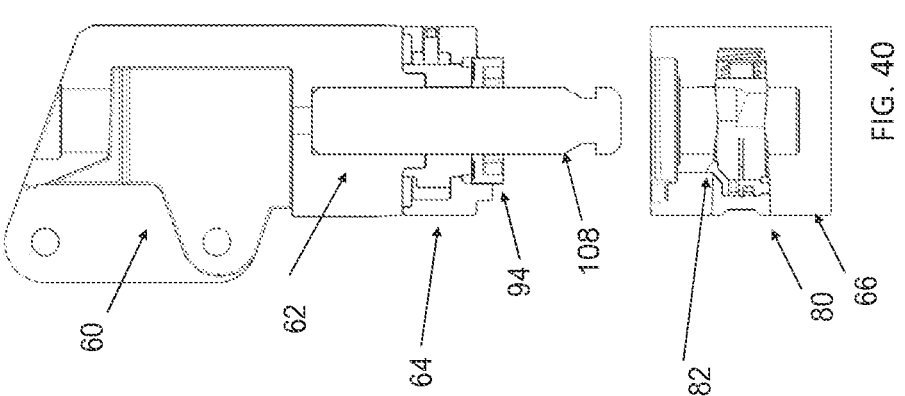

FIGS. 40 to 42 show the functionality of the quick release adapter 66 when assembled. FIG. 40 shows, as generally mentioned earlier, how the pin 62 is press-fit into the bottom joint or lower section 104 of the adjusted joint 60. The 180 degree rotation limiter 64 is held to the adjusted joint 60 by friction of the lower/bottom bushing 94 on the pin 62. Clip 82 holds the button 80 in place, such that the button 80 usually sits flush to the outside surface of the quick release adapter 66. FIG. 41 shows how the pin 62 pushes the button 80 out of the way as the pin 62 slides (downwardly) into place and into the quick release adapter 66 when assembled. Per FIG. 42, once the pin 62 slides past, the spring 78 pushes the button 80 back out and locks the pin 62 in place. The pin 62 holds tight tolerances with the inside walls and engages above and below the button 80, as represented by arrows A.

Figure 44:
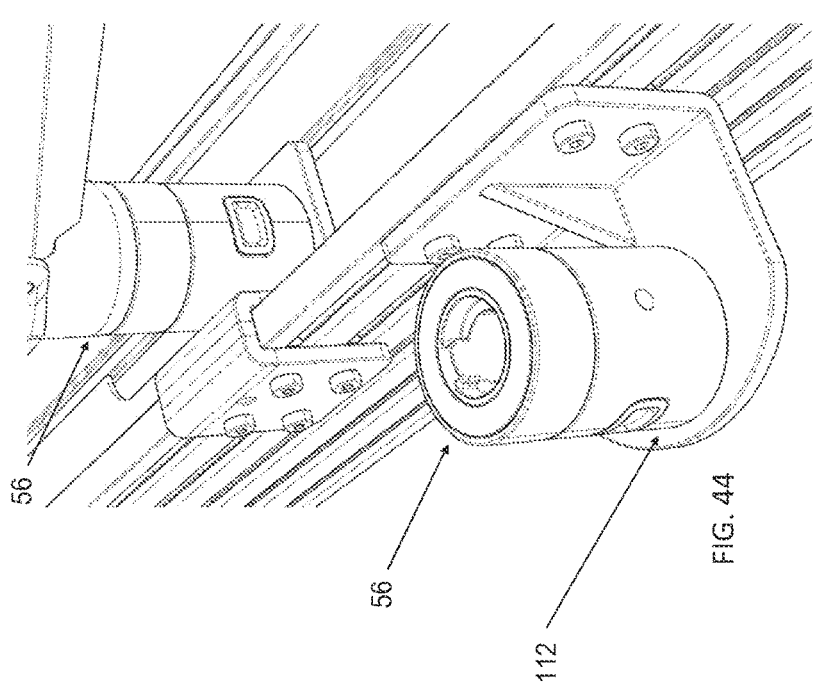
FIGS. 43 and 44 show perspective views of an example of a secondary mounting bracket, alone and assembled, respectively, for attaching a quick release mechanism to the rail, according to embodiments herein.
Figure 43:
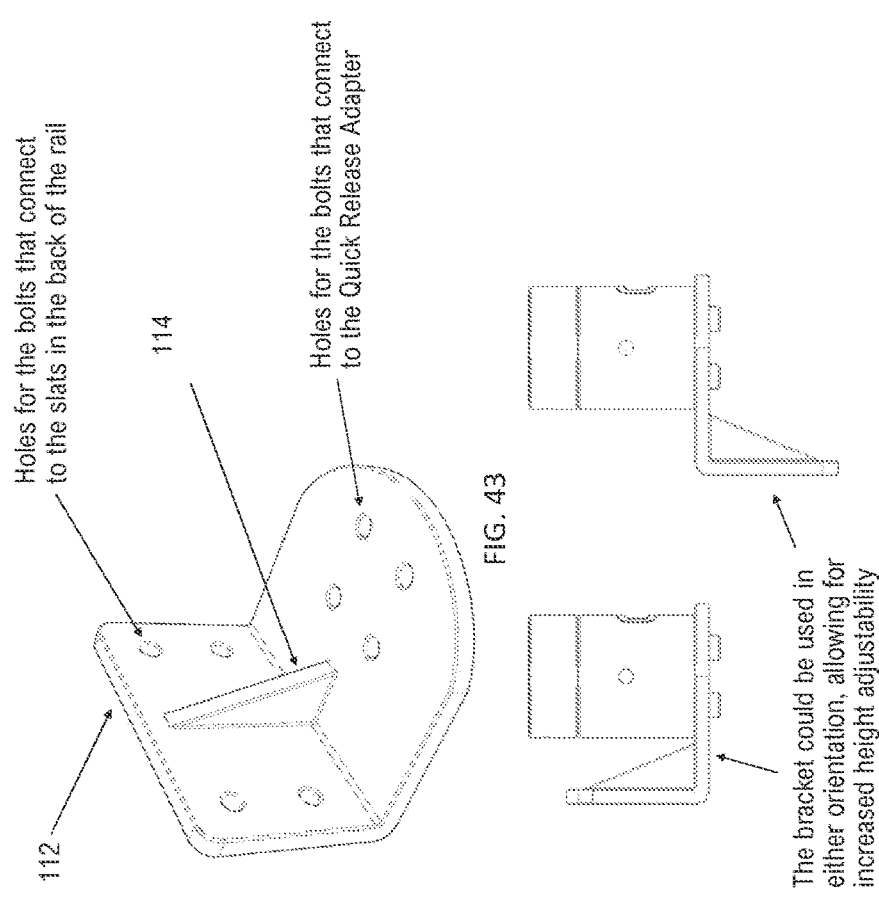

In embodiments, a secondary mounting bracket 112, shown in FIG. 43, may also and/or alternatively be provided for attaching the quick release mechanism 56 to the rail. As shown in FIG. 44, the second mounting bracket 112 allows for connecting a monitor arm behind the rail (i.e., to the back surface 24 of the rail 12, using fasteners) for users who want a monitor(s) further back and/or want some height adjustability. The bracket 112 is an L-shaped bracket with a top extension portion that has holes for the fasteners (e.g., bolts) that connect to the slats in the back of the rail 12, and a bottom portion that has holes for the fasteners (e.g., bolts) that connect to the quick release adapter 66, as shown in FIG. 44. One or more ribs 114 may be provided for re-enforcement of the bracket 112, which extend between the top extension portion and bottom portion as shown in FIG. 43. In addition, the bracket 112 is configured for use in either orientation, allowing for increased height adjustability, as shown. In a non-limiting embodiment, the second mounting bracket 112 may be formed of 5 mm thick steel.

Figure 45:
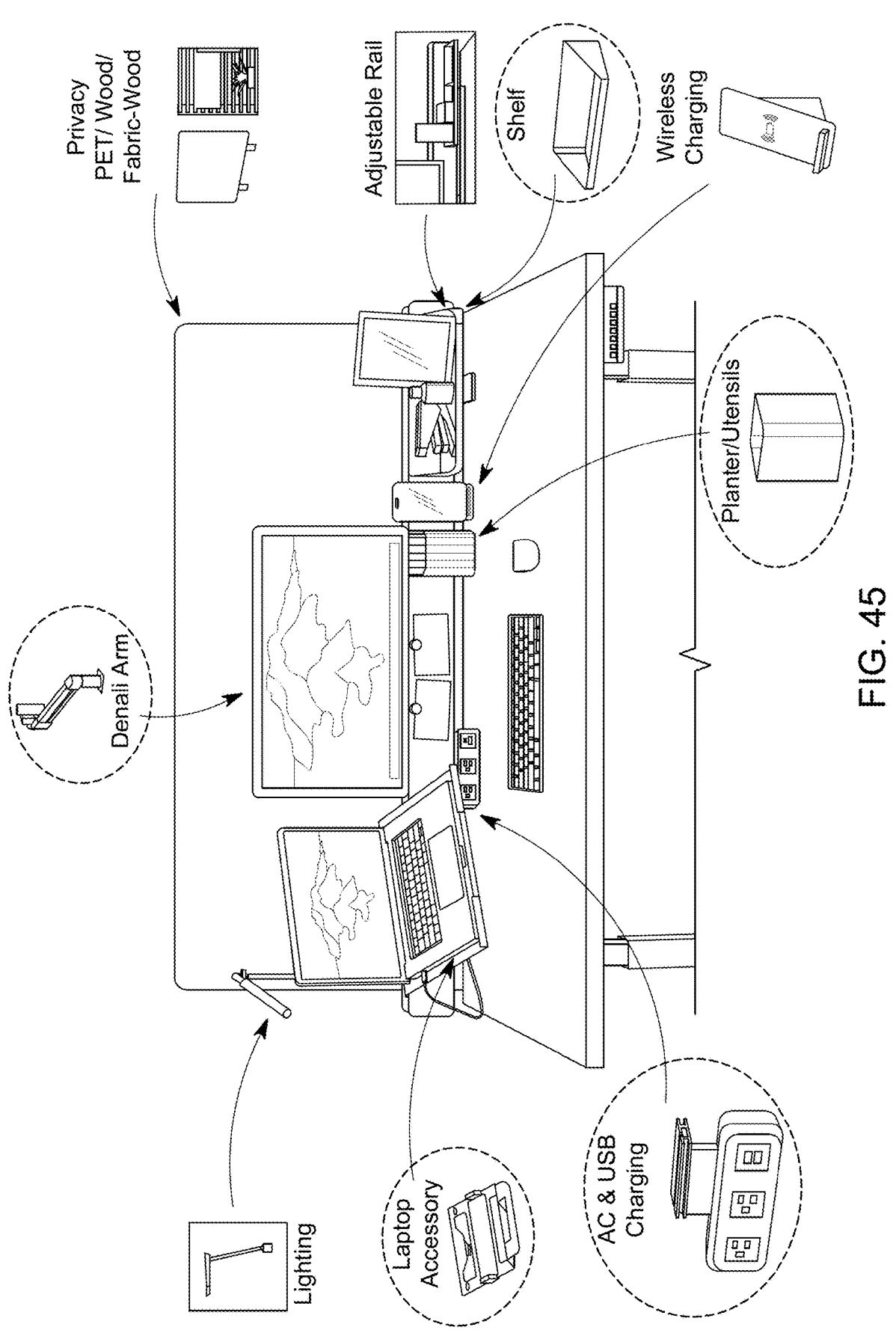
FIG. 45 shows a front view of an example of the multitude of accessories that may be attached to and used with the rail system, according to embodiments herein.

FIG. 45 shows an example of the multitude of accessories that may be attached to and used with the rail system 100, including, but not limited to, lighting, a laptop accessory (riser or holder), power housing (as previously noted), planter/utensil/storage bins, wireless charging accessory, shelf, monitor arm(s), and privacy or divider screens/panels.

Figure 46:
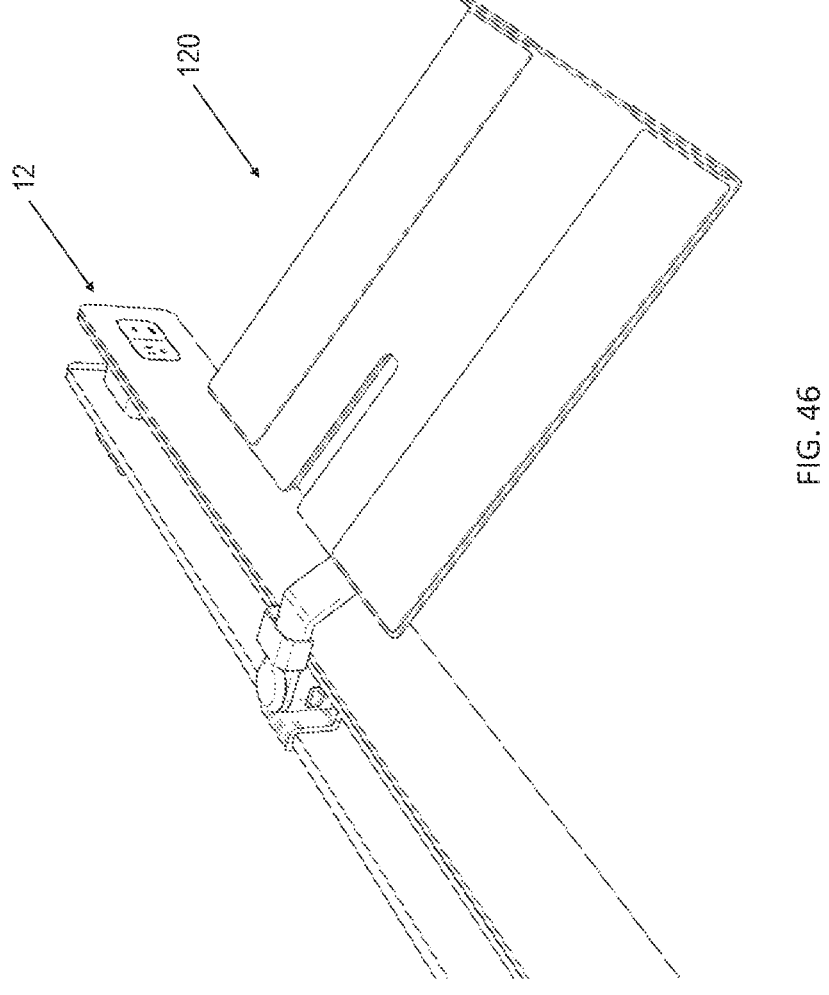
FIG. 46 shows a perspective view of an example of a laptop riser or holder used with the rail system, according to an embodiment herein.
Figure 47:
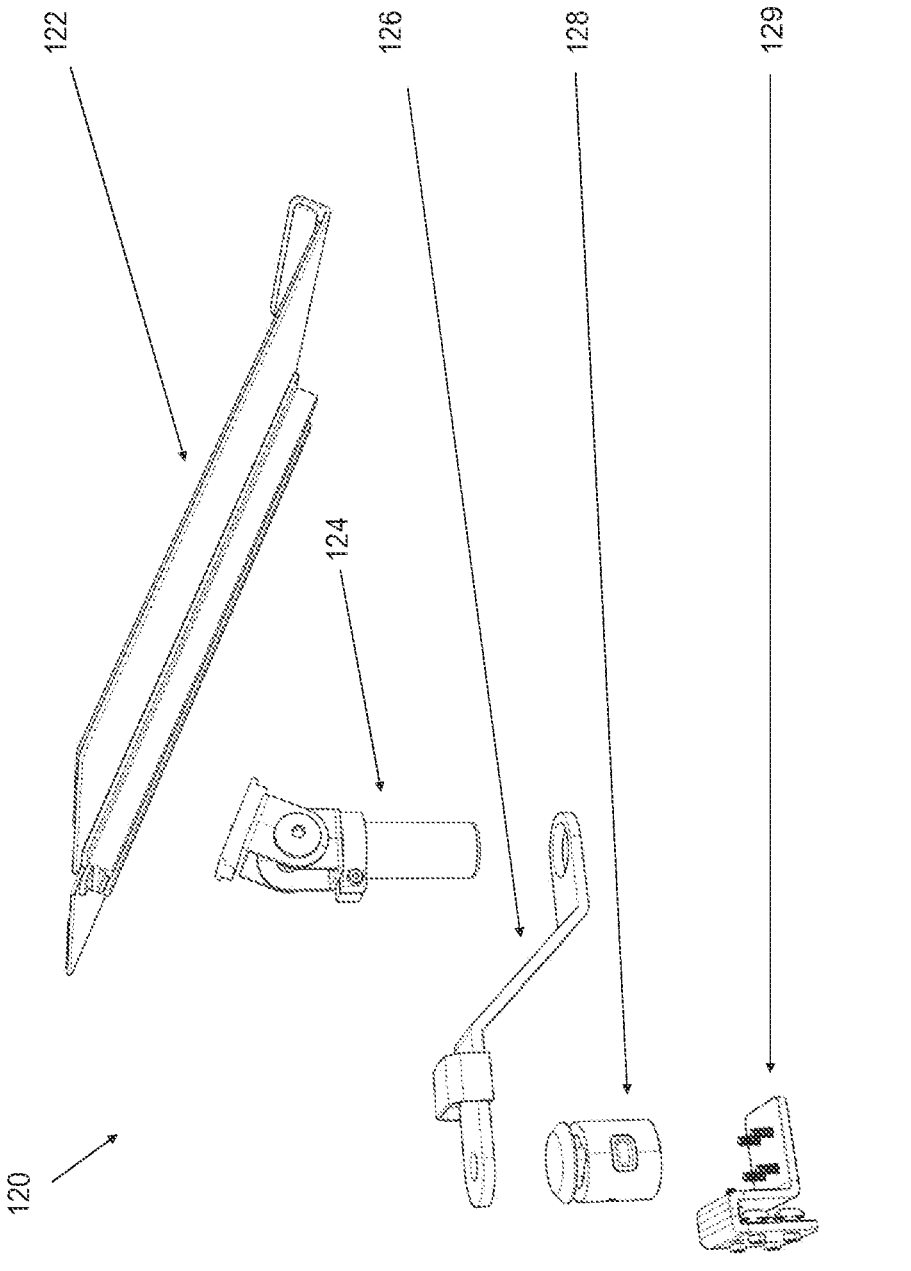
FIG. 47 shows an exploded view of main components of the laptop riser or holder of FIG. 47 according to embodiments herein.

FIG. 46 shows an example of a laptop riser or holder 120, according to an embodiment herein. The laptop riser or holder 120 may be connected anywhere along the rail 12, including the front and/or back of the rail and inside the channel 26 of the rail 12. The holder 120 may be vertically adjusted, i.e., up and down relative to the rail 12, as well as forwards and backwards. As shown in FIG. 47, the main components of the laptop riser or holder 120 may include a laptop holder portion 122 which is a platform for holding the laptop, an adjustment post 124 which provides vertical and tilt adjustment for the laptop holder via an attachment post and an articulating joint, and a jogged rotational arm 126, which is a bent arm that rotates around a quick release pin of a quick release adapter 128 to allow some forward movement to the laptop holder 120. This arm 126 can also be flipped upside down to allow for different height options. The quick release adapter 128 is designed to snap in the quick release pin to allow for the quick connect and release of any compatible components. The pin is used to lock in the rotational arm 126. A mounting bracket 129 may attach the quick release adapter 128 inside of the rail 12 (i.e., in the channel 26) with most of the weight on the back mounting slots 35 of the rail and some of the weight resting inside of the rail.

Further, it should be noted that the quick release mechanism 56 and adapters 66, 128 are configured to be integrated with their respective brackets 68, 129 (see, e.g., FIGS. 43-44, 47 and 49) according to embodiments herein. That is, the mechanisms/adapters and brackets may be formed and assembled such that they are integrated to behave as a singular component that is mounted as a unit onto the elongated rail 12.

Figure 48:
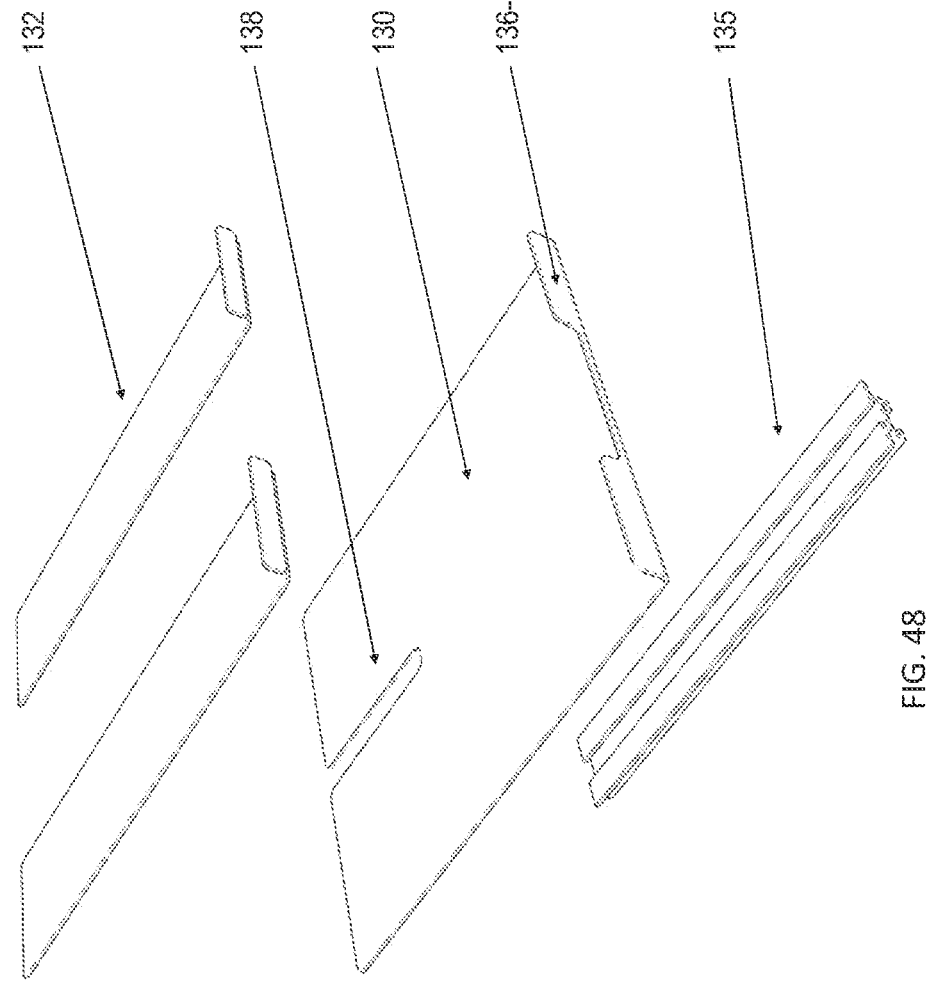
FIG. 48 shows an exploded view of parts of a laptop holder portion of the laptop riser or holder of FIG. 47, according to an embodiment herein.

FIG. 48 shows parts of the laptop holder portion 122, according to an embodiment, which may include a platform 130, non-slip pads 132, and an extrusion slider 135. The platform 130 may include a foot portion or feet 136-1 thereon to hold the laptop at an angle, and the cut out allows you to open and close the laptop with ease. The platform 130 may be formed of sheet metal, such as a steel, according to a non-limiting embodiment. The non-slip pads 132 may be added for extra grip along the top and on the feet 136-1. The non-slip pads 132 may be formed of silicone, according to a non-limiting embodiment. The extrusion slider 135 may be fixed to the platform 130 in any number of ways. In an embodiment, the extrusion slider 135 has a slot in the top and bottom which is symmetrical so the adjustment post 124 may attach from above or below. In an embodiment, the platform 130 has a cut out 138 that allows the extrusion slider 135 to be accessed from above for additional mounting options. The extrusion slider 135 may be formed of aluminum, according to a non-limiting embodiment. Further details regarding use of the extrusion slider 135 are described later below with reference to FIGS. 61 and 62.

Figure 49:
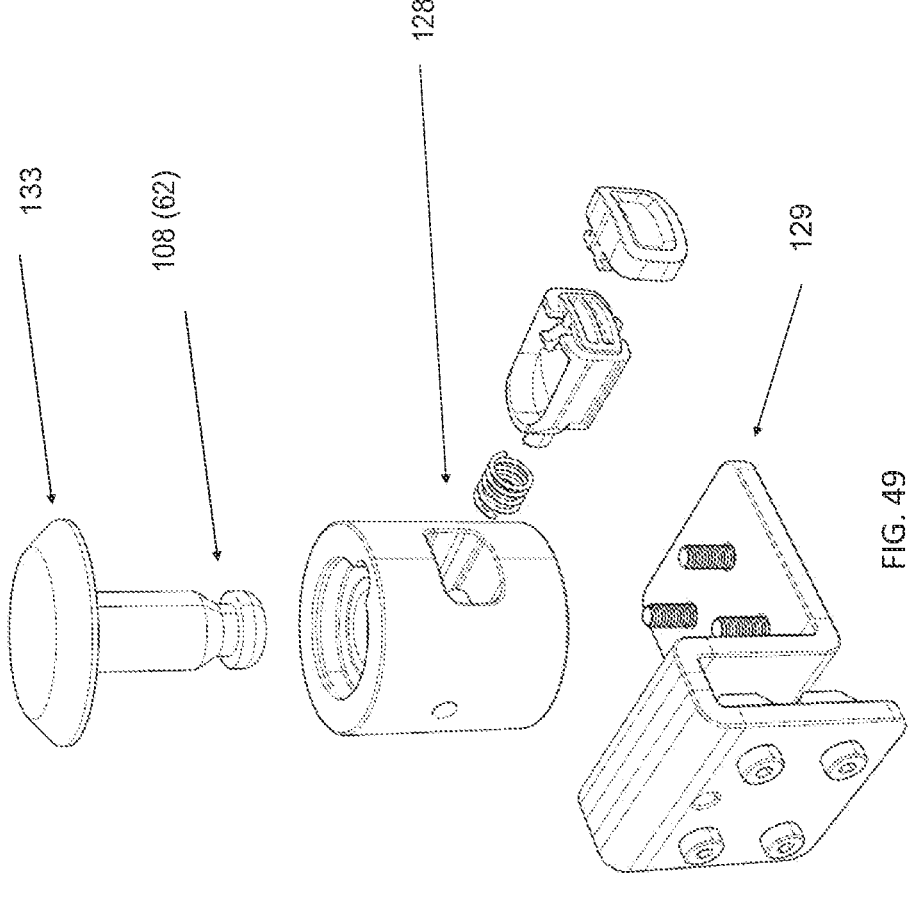
FIG. 49 shows an exploded view of a quick release adapter and bracket of the laptop riser or holder of FIG. 47 according to embodiments herein.

FIG. 49 shows an exploded view of the quick release adapter 128 and bracket 130. According to embodiments herein, the quick release adapter 128 includes a bottom portion that is the same or has similar parts as provided in quick release adapter 66, e.g., a main body with a center area, threaded holes on each side, threaded holes (e.g., four) are on the bottom of the adapter an opening 76 that receives a spring to hold a button and a button cover, and thus acts in a similar manner. A top of the quick release adapter could be part of the same machined pin 62 as previously described, or it could include a cap 133 that is screwed into or onto the pin, as shown, according to embodiments herein. The pin 62 includes a same bottom portion 108 as previously shown. The bracket 130 may be the same as or similar to the primary mounting bracket 68 as previously described, including, a back portion with a number of holes therein and a front extension for attaching to a bottom of the quick release adapter 128.

Figure 50:
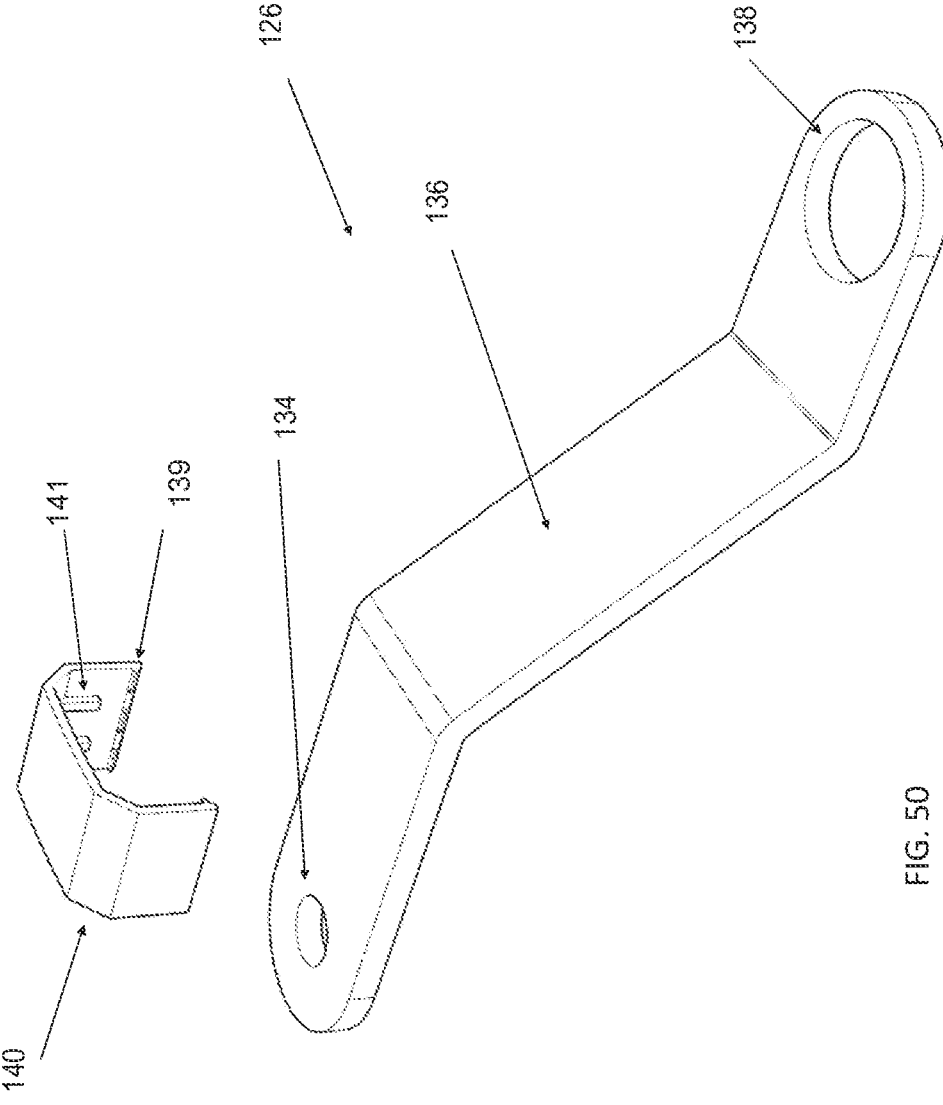
FIG. 50 shows an exploded view of a rotational arm with cable management clip that is part of the laptop riser or holder of FIG. 47, according to embodiments herein.
Figures 52, 53:
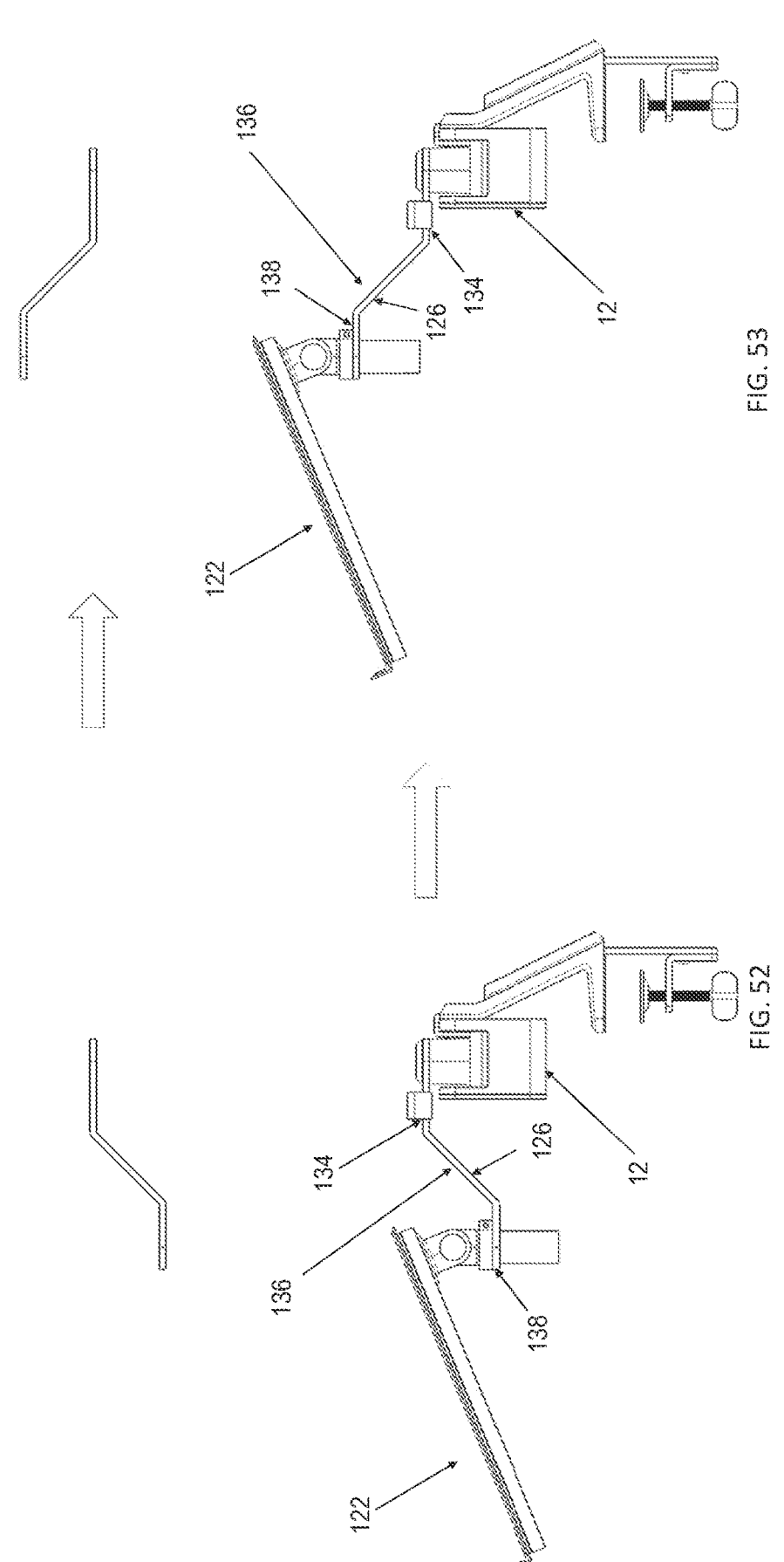
FIGS. 52-53 show side views of an example of using the rotational arm of laptop riser or holder for vertical adjustment, according to an embodiment.

FIG. 50 shows an embodiment of the jogged rotational arm 126 with cable management clip 140. The rotational arm 126 allows for horizontal adjustments by rotating the arm. In a non-limiting embodiment, the jogged rotational arm 126 may be formed of 6 mm steel. The rotational arm 126 includes a top section 134, a downward angled section 136, and a bottom section 138. The top section 134 of the arm is designed to fit closely around and held in by the quick release pin associated with the adapter 128 via a hole therein. The downward angle section 136 allows for using the laptop holder or riser 120 closer to the work surface 18, as well as higher off the surface 18 when the arm is flipped upside down, such as shown in FIG. 53. The bottom section 138 includes a hole and fits closely around the adjustment post 124, providing rotation for the laptop holder 120. The cable management clip 140 holds the cable(s) in place while the arm 126 moves. In embodiments, the clip 140 may include end portions with snap hooks 139 configured to snap over a bottom side of the top section 134 of the arm 126. Further, ribs 141 of the clip 140 may be provided on an underside thereof to engage with a top side of the top section 134 of the arm 126. According to a non-limiting embodiment, the clip 140 may be formed of ABS material.

Figure 51:
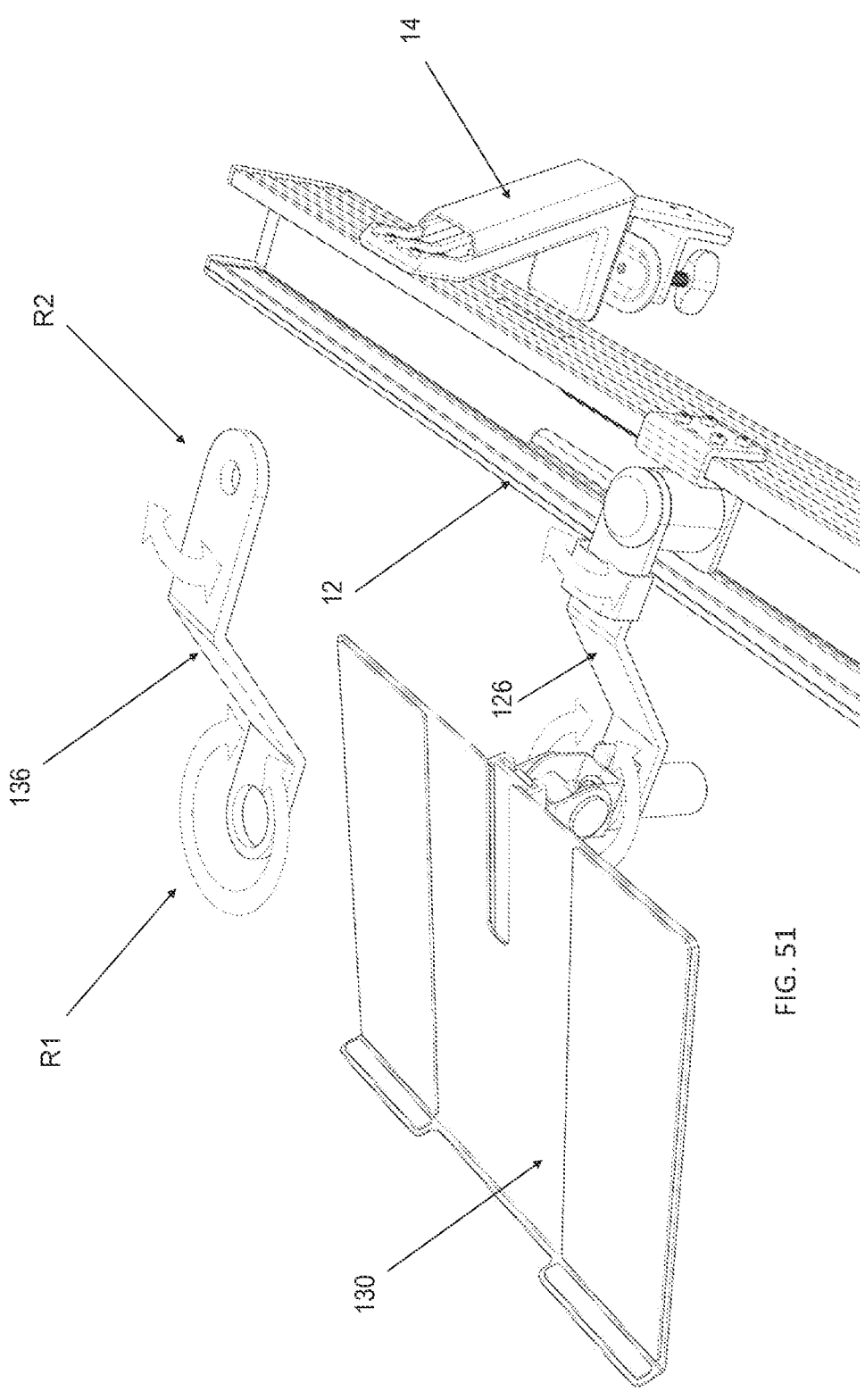
FIG. 51 shows examples of rotational motion that may be imparted to parts of the laptop riser or holder, according to an embodiment.

According to embodiments herein, the laptop riser or holder 120 is configured to move in a variety of positions via the aforementioned parts when connected to the elongated rail 12. FIGS. 51-53 show examples of possible movements and mountings of the rotational arm 126 of the laptop holder 120 to the rail 12, in accordance with embodiments herein. FIG. 51 shows examples of rotational motion that may be imparted to the parts and, more specifically relative to the rotational arm 126 at its top section 134 and bottom section 138, according to an embodiment. At the bottom section 138, which in FIG. 51 is placed in a front position and attached to the laptop holder portion 122 via the adjustment post 124, the adjustment post 124 is configured to rotate within or inside of the hole therein, represented by arrow R1. In the top section 134, which in FIG. 51 is placed in a back position and attached to the quick release adapter 128 which is mounted via bracket 130 within the rail 12, the rotational arm 126 is configured to rotate around the quick release pin, represented by arrow R2. FIGS. 52-53 show an example of using the rotational arm 126 for vertical adjustment, based on providing the arm in a first position of FIG. 52 or flipping the arm upside down in FIG. 53, and attaching the quick release adapter 128 and bracket 130 within the channel 26 of the elongated rail, according to one embodiment. Specifically, FIG. 52 shows that the downward angle section 136 is positioned at a first angle with bottom section 138 being provided relatively below the top section 134, whereas FIG. 53 shows that the downward angle section 136 is reversed at a second angle to position the bottom section 138 relatively above the top section 134. Accordingly, flipping the arm 126 into a position as shown in FIG. 53 provides a vertical adjustment in height to the laptop holder portion 122 relative to the rail 12 (i.e., in this case, there is an increase in height or vertical adjustment).

Figure 54:
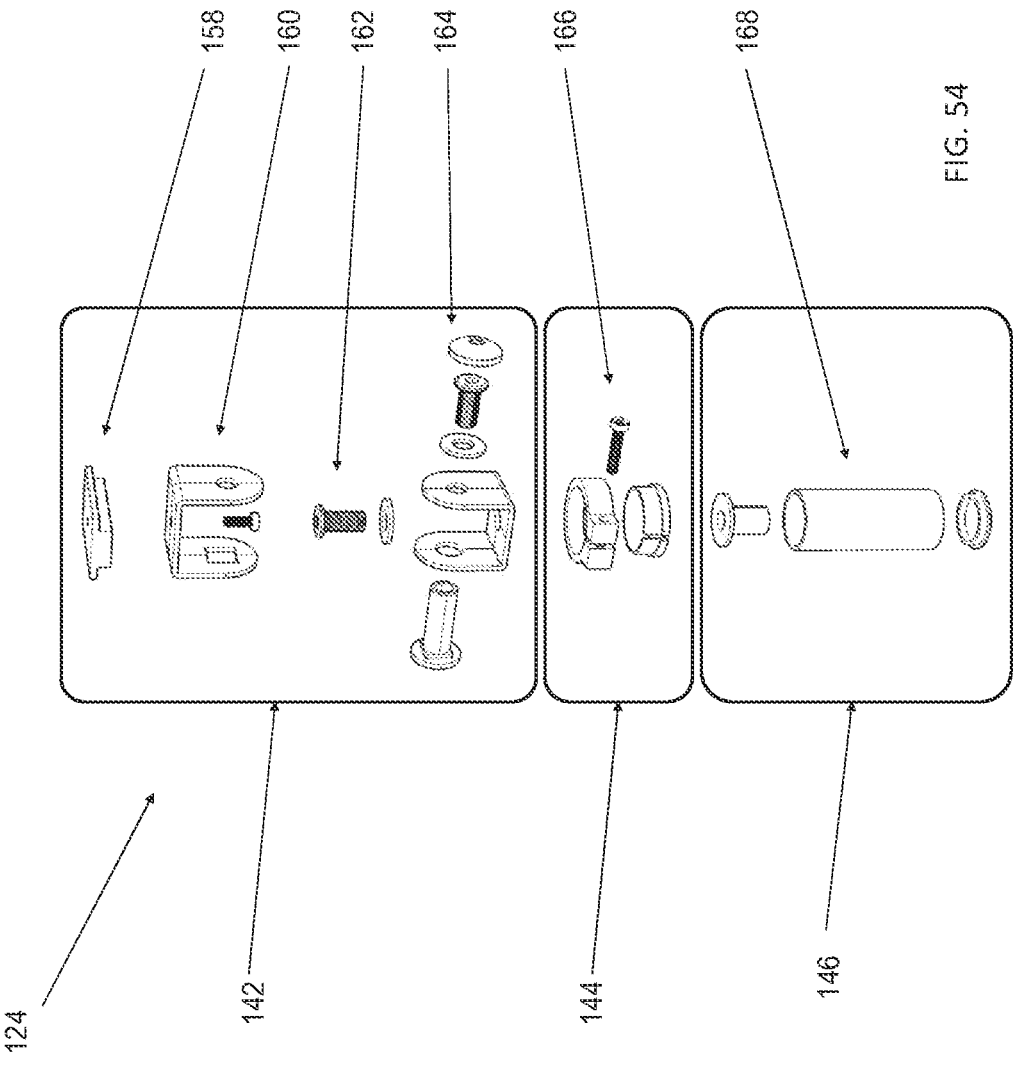
FIG. 54 shows an exploded view of an exemplary embodiment of the parts of the adjustment post of laptop riser or holder in an exploded view.

FIGS. 54-62 show examples of possible movements and mountings of the adjustment post 124 of the laptop holder 120 to the rail 12, in accordance with embodiments herein. FIG. 54 shows an exemplary embodiment of the parts of the adjustment post 124 in an exploded view. At a top portion thereof is a tilt mechanism 142, along with a collet 144 and a post 146 in a form of a tube at a bottom portion thereof. The tilt mechanism 142 includes an extrusion portion 158 (e.g., of aluminum material) to slide the laptop holder portion 122 along with a threaded hole therein for locking in place via a fastener (shown below bracket 160). Portion 158 may be connected via the fastener to a tilt bracket 160, which connects to a bottom tilt bracket 164. A bolt 162 is provided to connect the tilt bracket 164 to a bottom portion of the adjustment post 124. A bolt is also provided with the tilt bracket 164 and through the tilt bracket 160 to cause tilting or rotational motion of the laptop holder portion 122 of the laptop holder 120, as described later. The collet 144 may be a tightening collet (tightened via a screw 166) with a bushing (e.g., made of nylon) inside. The post 146 may include a tube 168 (e.g., made of steel) in accordance with embodiments. The tube 168 may include a threaded insert welded to one end and a cap (e.g., of plastic) provided on the other end, as shown in FIG. 54, thus forming the post 146.

Figures 55, 56:
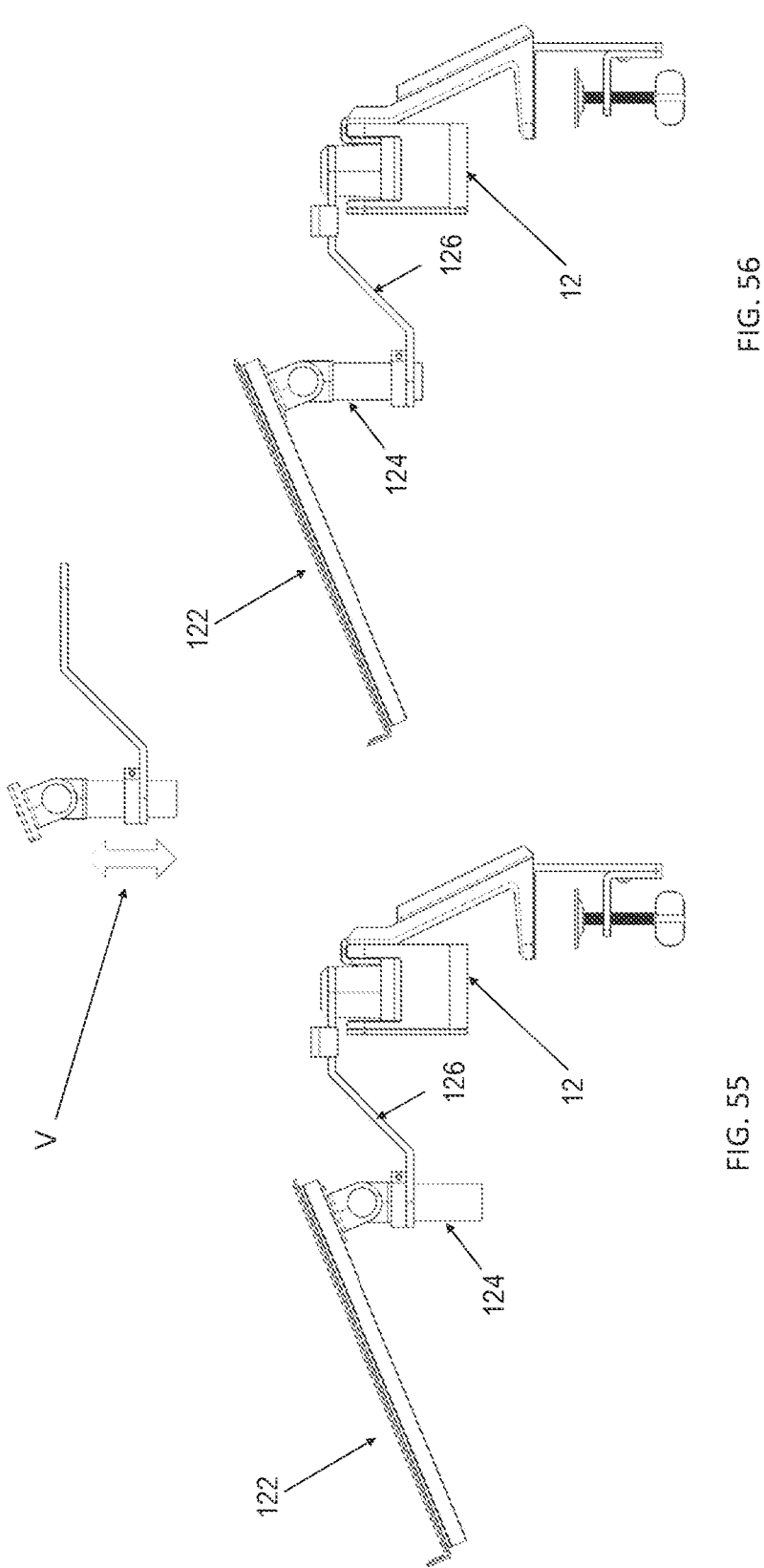
FIGS. 55 and 56 show side views of an example of using the adjustment post of laptop riser or holder for vertical adjustment, according to an embodiment.
Figures 57, 58:
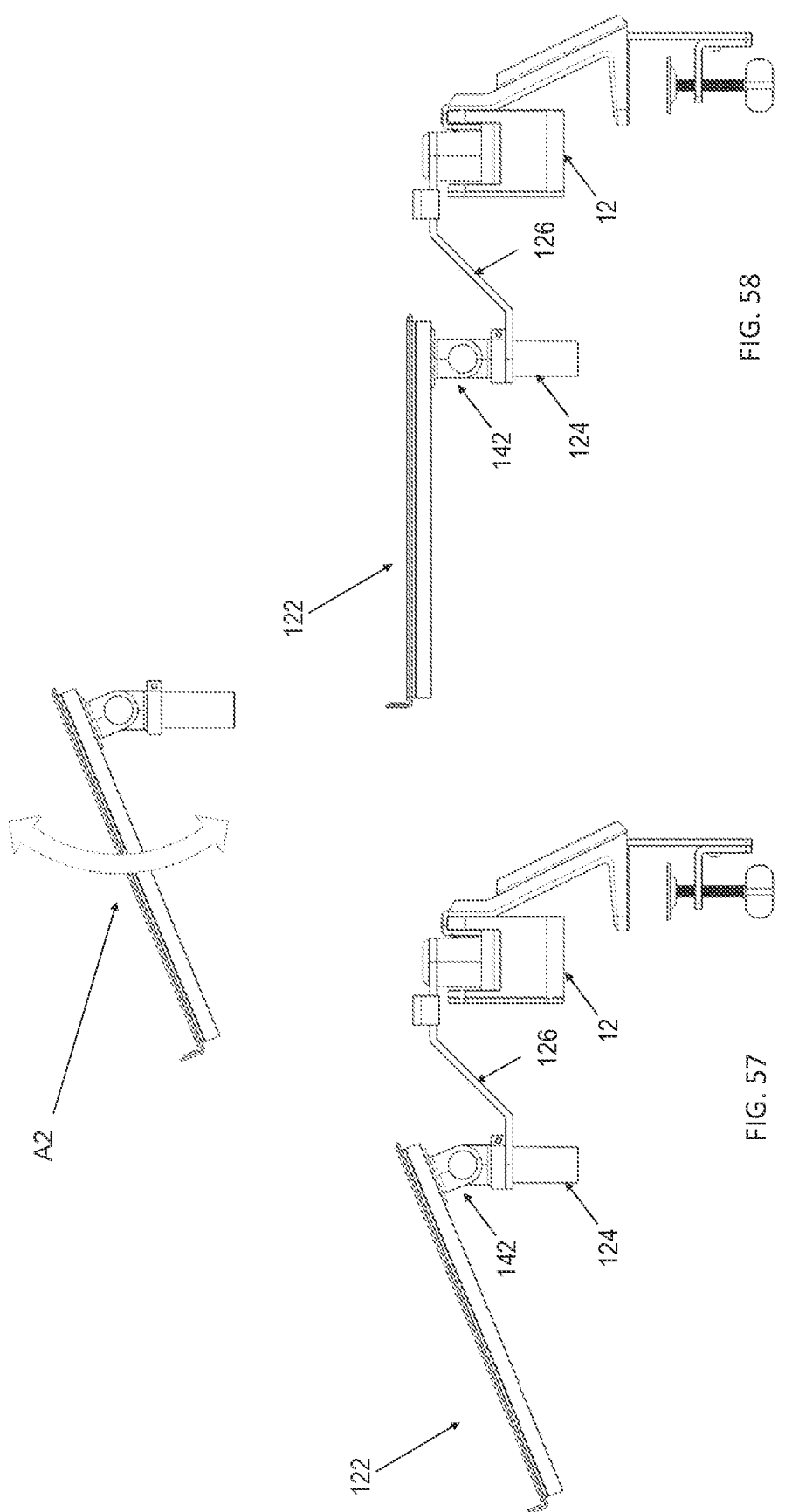
FIGS. 57-58 show side views of an example of using the tilt mechanism of the laptop riser or holder for tilt adjustment, according to an embodiment.
Figures 61, 62:
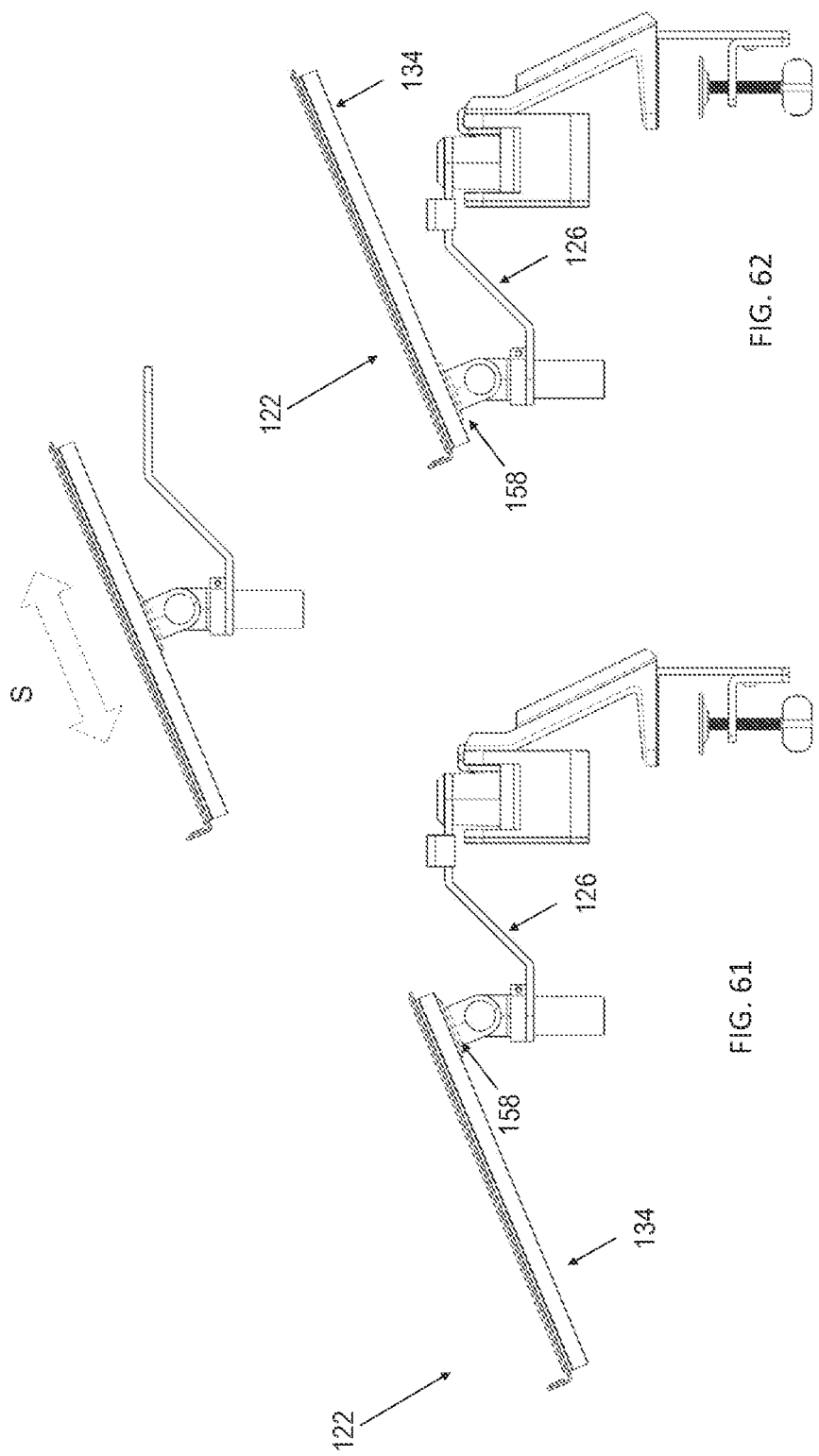
FIGS. 61 and 62 show side views of an example of using an extrusion portion of the adjustment post with an extrusion slider of the laptop holder portion of the laptop riser or holder for sliding adjustment, according to yet another embodiment.

FIGS. 55 and 56 show an example of using the adjustment post 124 for vertical adjustment, according to an embodiment. The adjustment post 124 is configured for vertical movement within the hole of the bottom section 138 of the rotational arm 126, with the collet 144 being used for securement of and tightening about the post 146. FIG. 55 shows an example of placing the adjustment post 124 in a downward most vertical position, according to one embodiment. FIG. 56 shows an example of placing the adjustment post 124 in an upward most vertical position, according to another embodiment. In yet another embodiment, the adjustment post 124 allows for smaller vertical adjustments—represented by arrow V—for hitting any desired height, i.e., may be secured in any number of vertical positions between the downward most vertical position and the upward most vertical position. FIGS. 57-58 show an example of using the tilt mechanism 142 for tilt adjustment, i.e., for tilting the laptop holder portion 122 up and down via tilt mechanism 142. The laptop holder portion 122 is configured for placement at any number of angles, e.g., such as an angle between approximately 15 degrees to approximately 90 degrees relative to a vertical axis through the adjustment post 124, as represented by arrow A2. FIGS. 59-60 show an example of using the adjustment post 124 in two configurations, according to another embodiment. Specifically, by placing the adjustment post 124 such that the post 146 is relatively below the rotational arm 126, as shown in FIG. 59, or flipping and placing the adjustment post 124 such that the post 146 is relatively above the rotational arm 126, as shown in FIG. 60, thereby providing more vertical adjustability. Moreover, the laptop holder portion 122 may be positioned on top (FIG. 59) or on the bottom (FIG. 60) based on the mounting of the post 146. FIGS. 61 and 62 show an example of using the extrusion portion 158 of the adjustment post 124 with the extrusion slider 135 of the laptop holder portion 122 for sliding adjustment, according to yet another embodiment. The laptop holder portion 122 is configured for sliding backward and forward relative to the adjustment post 124, as represented by arrow S, along the extrusion slider 135 via the extrusion portion 158.

Figures 63, 64:
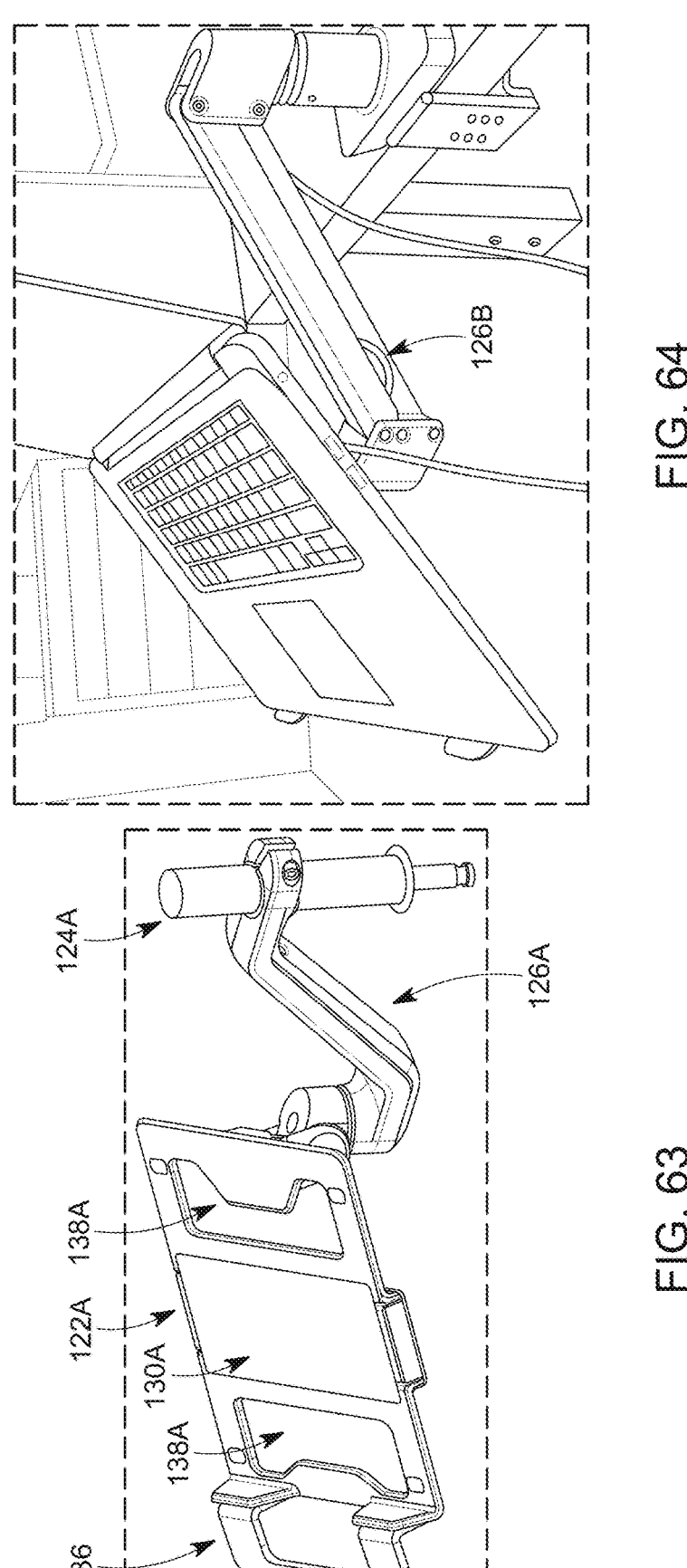
FIGS. 63 and 64 illustrate perspective views of alternative mounting examples of parts that may be used as a laptop holder, according to embodiments herein.

It should be noted that while FIGS. 46-61 show exemplary features of laptop holder 120, including adjustment post 124 and rotational arm 126, such depictions are not intended be limiting. That is, one or more of such features may be altered while still achieving similar functions, according to embodiments herein. FIGS. 63 and 64 illustrate two alternative mounting examples of parts that may be used as a laptop holder. For example, FIG. 63 shows a laptop holder having an adjustable pole 124A of alternative configuration, with the quick connect mechanism and alternative arm 126A for holding a laptop holder portion 122A with a platform 130A including alternative cut out areas 138A and foot portion 136A. FIG. 64 shows an example of a Bowden cable actuated four bar arm 126B, holding a laptop holder portion, which allows for hand actuation to engage a multi-positional gas spring at various heights/angles of the four bar. Accordingly, such laptop mounting features and/or accessories are not intended to be limited to the noted illustrations of the Figures.

Figures 65, 66:
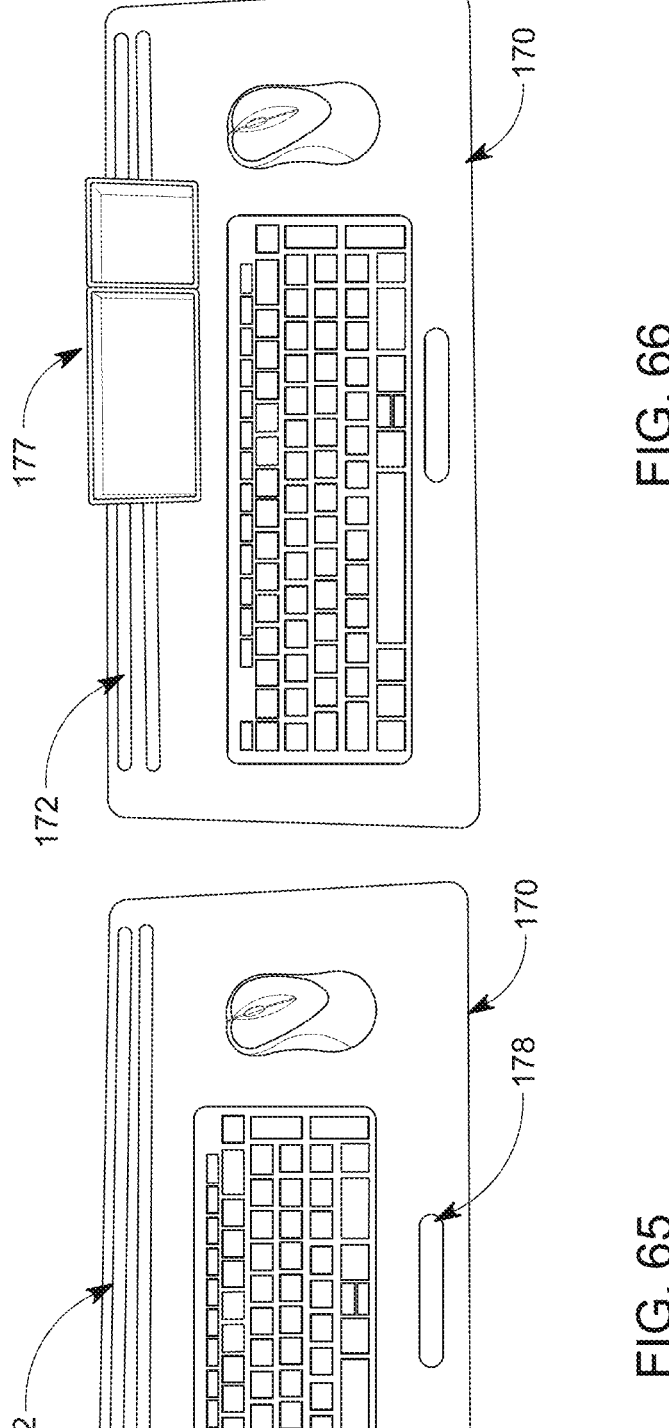
FIGS. 65-67 show top and bottom views an example of a tray that may be used with the rail system in accordance with embodiments herein.
Figure 67:
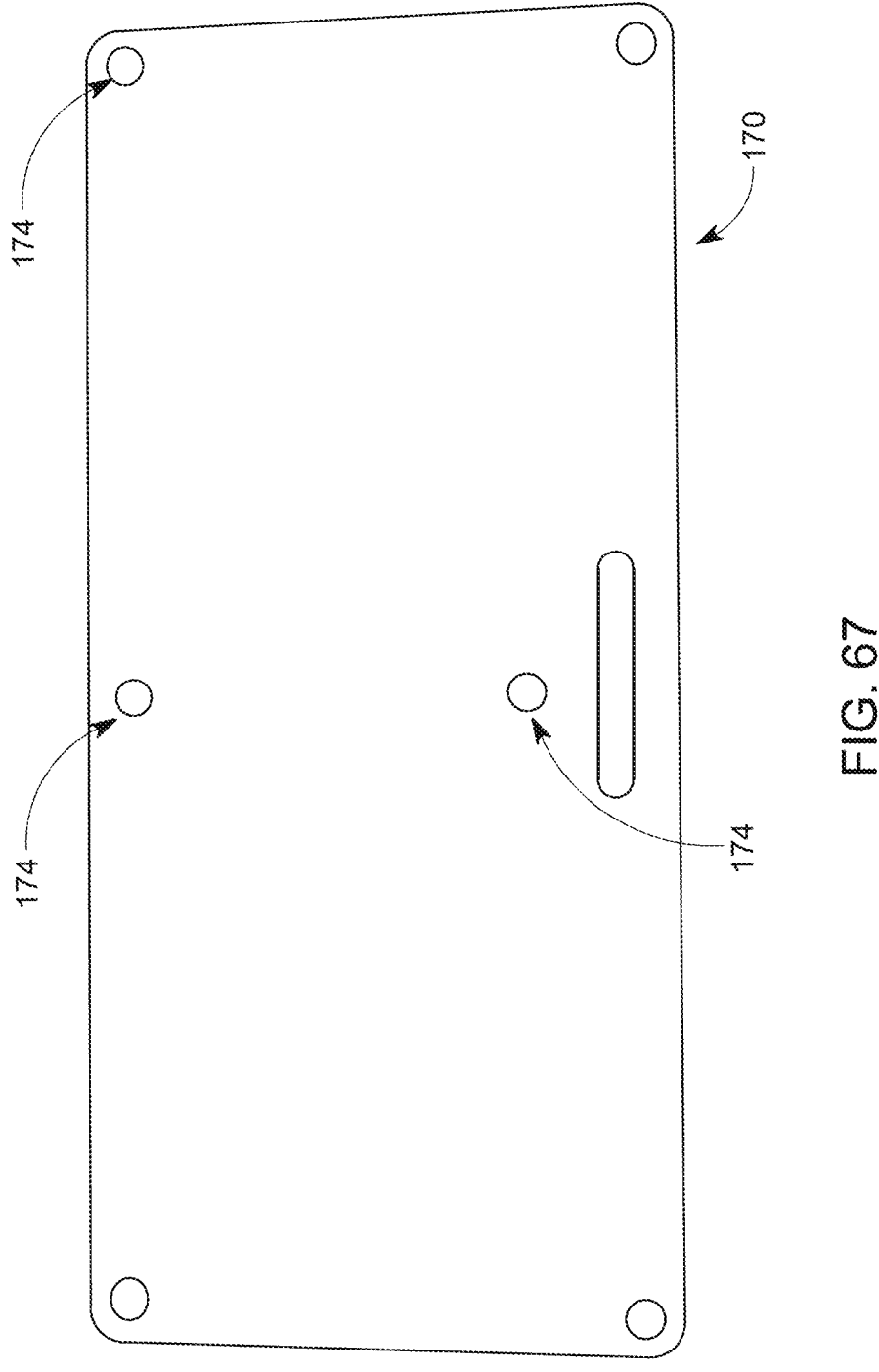

FIGS. 65-67 show an example of an optional tray 170 configured for use with the rail system 100, according to embodiments herein. The tray 170 is designed for mounting on surface 18 of the desk or table and may be designed to support a keyboard and mouse thereon, for example. The tray 170 is configured for sliding on the surface 18 via feet 176 (e.g., made of felt or similar material) provided on a bottom surface thereof (shown in FIG. 67). The tray 170 may be constructed out of similar material as the front writable surface 28 of the elongated rail 12 (e.g., glass with a steel backer for magnetic engagement), according to an embodiment, or, as an alternative, the tray 170 may be constructed out of plastic, wood, or nearly any stable flat material. In an embodiment, magnetic strip(s) or surface(s) of material may be provided on tray 170, for interaction with accessories that also include magnets thereon (e.g., such as cups 177 (shown in FIG. 66) and/or bins, described below). Such strip(s) may be inset or provided on top of the tray 170. The magnetic interaction of accessories allows them to be removably attached to both the tray 170 and rail 12, such that they are repositionable throughout the work day. In the exemplary illustrated embodiment shown in FIGS. 65-66, two rows or strips of magnetic material are provided, which encourages linear alignment of accessories thereon. Optionally, the tray 170 includes a handle 178 (shown in the Figures as an opening) for ease of movement.

In addition to the features noted above, adding a tray 170 for use with rail system 100 allows a user to move multiple items (keyboard, mouse, bins, etc.) at once (e.g., out of the way or out from in front of the rail, e.g., to the side) to get ready for a different task within the primary work zone, for example. The tray 170 may be designed to interact with either the rail or the organizational items, according to embodiments herein. In an embodiment, the tray 170 is designed to include an auxiliary power battery allowing for off rail powered use of a mobile phone (wireless charging), cordless mouse, and keyboard, etc. For example, when the tray 170 is docked or pushed under the raised elongated rail 12, the auxiliary battery of the tray 170 may be charged/recharged.

Figure 68:
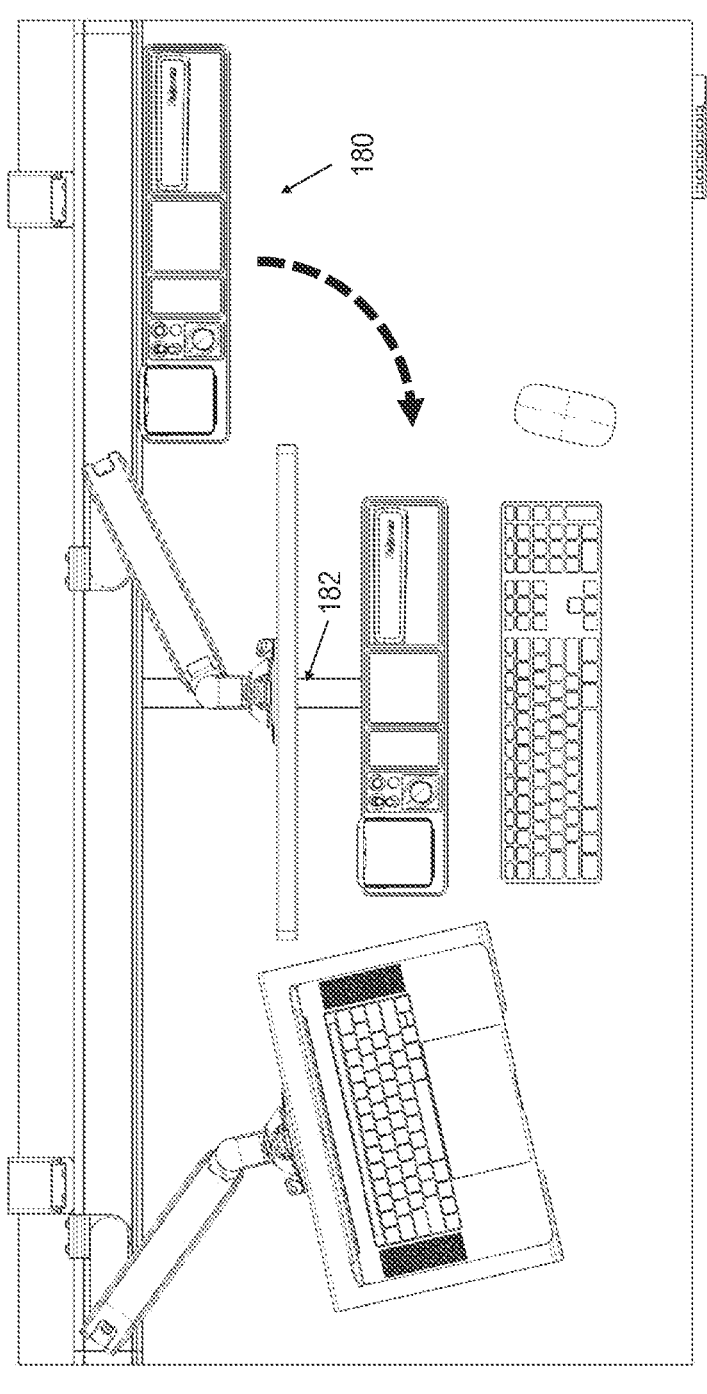
FIGS. 68-70 show top views of examples of mounting rails and accessories, and movements thereof, used with the rail system in accordance with embodiments herein.
Figure 69:
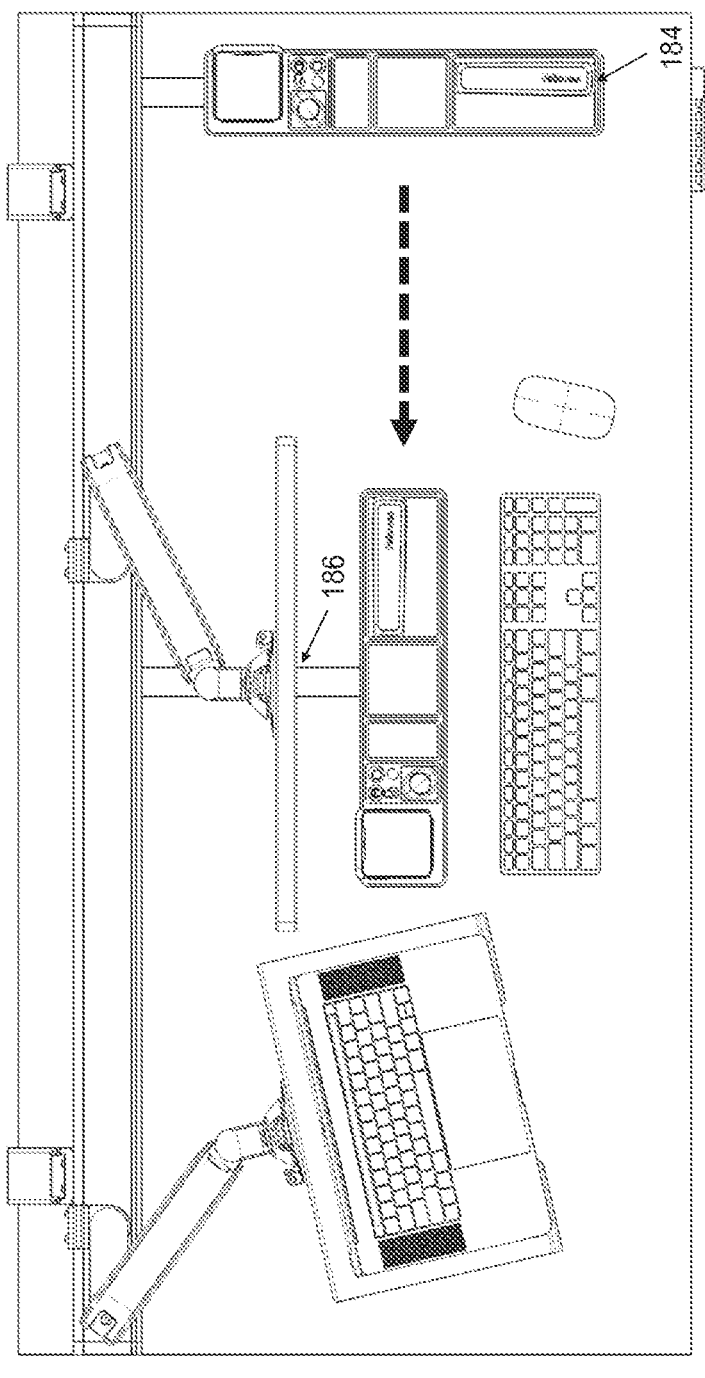
Figure 70:
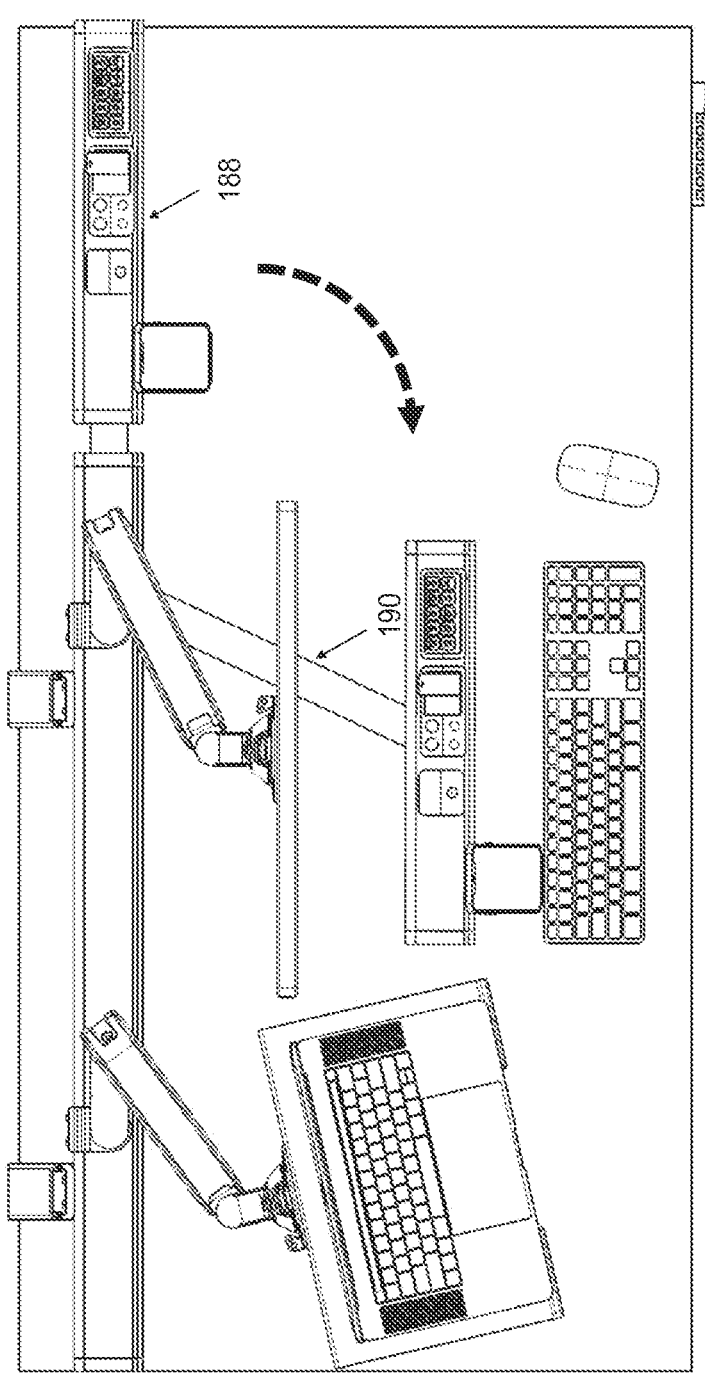

Existing monitor solutions and articulating arms/rails may be attached to, or used with, the rail system 100 disclosed herein, and addition of a laptop holder 120 and/or mounting arm arrangements 54 for monitors is optional. Accordingly, users do not necessarily need to eliminate use of other items on a desk or table top. FIGS. 68-70 show examples of mounting rails and accessories, and movements thereof, used with the rail system 100 in accordance with embodiments herein. For example, in an embodiment, the elongated rail 12 may be mounted for use with a swing out tray 180, shown in FIG. 68, that may be attached to a swing arm 182 which allows the swing out tray 180 to rotationally move between work zones, including in front of any monitor(s) and to other positions (including a storage position). FIG. 69 shows an embodiment wherein a slide and rotate tray 184 is mounted to elongated rail 12, with a swing arm 186 that allows for horizontal movement between work zones. With the tray 184 on a slider, its storage position may be off to the side, for example, and the swing arm 186 allows for movement of the tray 184 in front of any monitor(s) and back, for example. FIG. 70 shows an embodiment wherein shorter articulating rail(s) 190 are utilized for moving a tray 188. For example, whether a single or a dual monitor mount is utilized, the tray 188 may be moved between positions into work zones in a rotational manner via rail 190. The mounting mechanism(s) or device(s), adapter(s), etc. used to mount the swing arm(s) as shown in FIGS. 68-70 may vary according to embodiments herein, and, in some embodiments, may include brackets and/or components (e.g., quick release adapter) as previously described herein.

Moreover, other embodiments wherein alternative mechanism(s) and/or alternative movement(s) may be utilized. For example, more than one swing arm may be used. In an embodiment, a swing out double arm may attach to the desk or table such that it is designed to move in a parallelogram-type fashion in order to move the elongated rail 12. In embodiments, three or four arms may be used in rail system 100. Other types of movement of the rail 12 and/or accessories attached thereto using arm(s) are also envisioned.

FIGS. 71-78 show examples of storage accessories and/or organizational elements such as containers, shelves etc. that may be used with the rail system 100 in order to facilitate moving such items in and out of the primary work zone (e.g., the area resided in front of the computer monitor). In an embodiment, this action is facilitated by magnets being provided on the organizational elements (containers, shelf, etc.) which allow them to interlock with each other, to the elongated rail 12 and, optionally, to a tray on the surface 18 as well. For example, as previously described, if tray 170 is provided, such accessories may also be provided on the tray 170 in addition to a keyboard, mouse, etc. and secured via magnets to said tray for securement and/or movement therewith.

Figure 72:
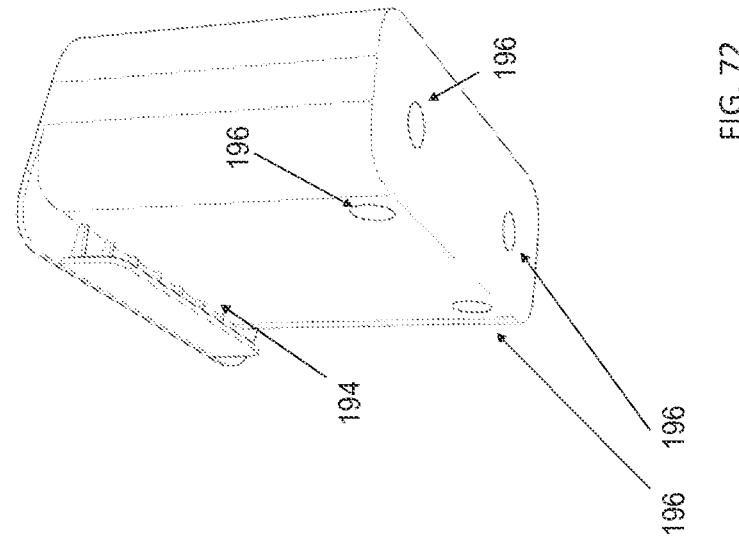
FIGS. 71-72 show front and back perspective views of a bin with shelf for use with the rail system in accordance with an embodiment.
Figure 71:
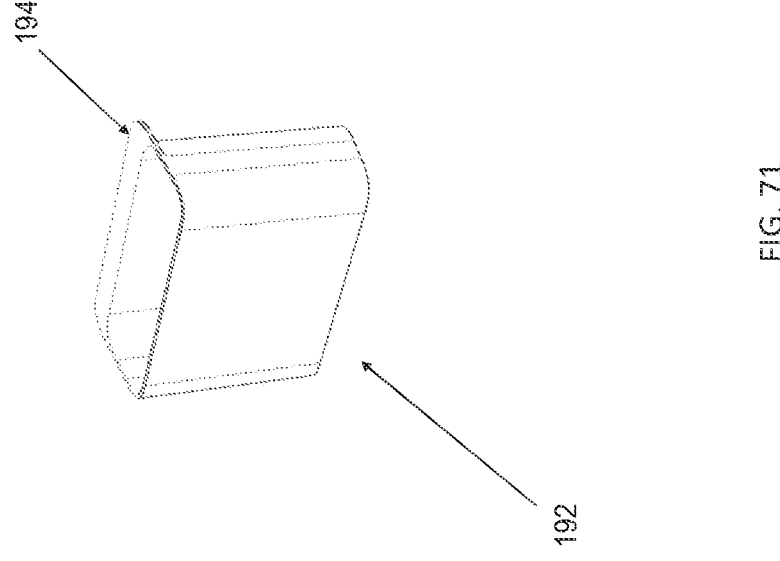
Figure 74:
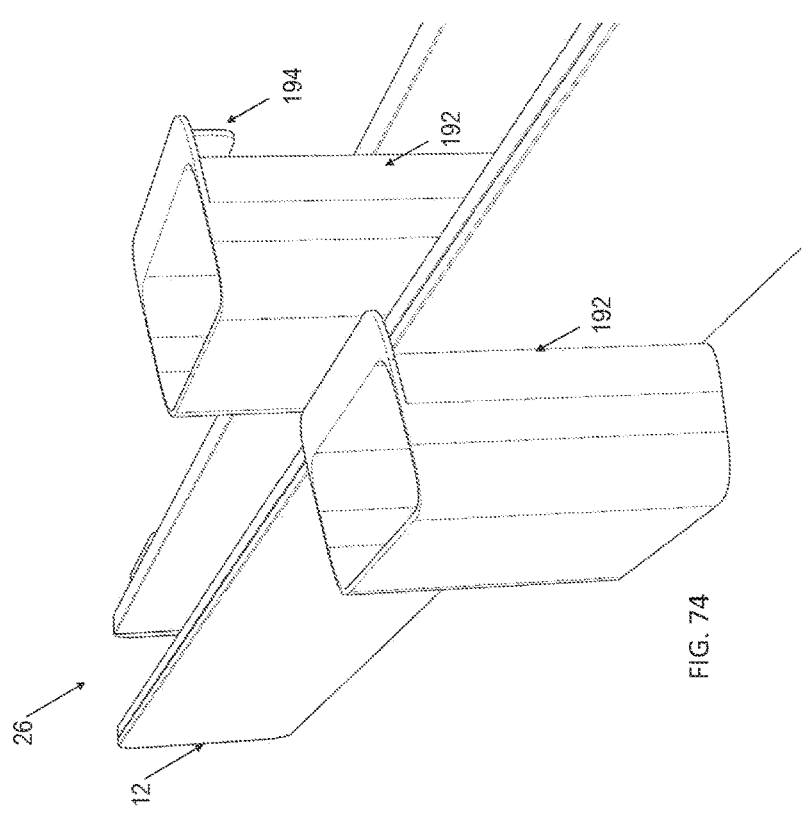
FIGS. 73-74 show side and perspective views of mounting options for the bin of FIGS. 71-72 with respect to the elongated rail of the rail system, according to embodiments herein.
Figure 73:
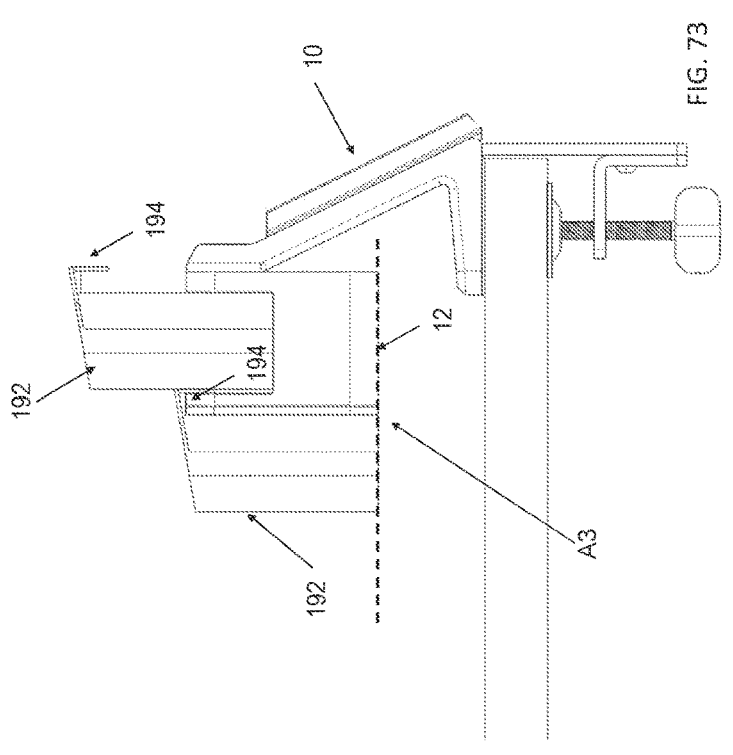

FIGS. 71-72 show an example of a bin 192 having a shelf 194 along a back of a top edge thereon, for use with the rail system 100, according to embodiments herein. Such a bin 192 may be designed to hold pens, pencils, and other small items, for example. One or more bins 192 may be used with rail system 100. Further, FIG. 72 shows an example for placement of optional magnets 196 on a back side and an underside of a bin 192. Accordingly, in an embodiment, the bin 192 may be mounted (e.g., snapped) within a channel 26 of the elongated rail 12, as shown in FIGS. 73-74, and/or to a front edge of the elongated rail 12 via shelf 194 (e.g., using an optional snap fit connection). In an embodiment, the bin 192 may be sized such that a bottom thereof aligns with a bottom of the elongated rail 12 when hanging off of the front thereof, as represented by arrow A3 in FIG. 73, so as to allow access to the area below the rail 12. Further, the shelf 194 is designed such that it does not hinder use of the channel 26 when mounted on a front edge of the rail. Accordingly, another bin 192 or accessory may be positioned within the channel 26 directly in line with a bin 192 (as shown in FIG. 74) secured to the front edge. In some cases, when a bin 192 is mounted in the channel 26, the shelf 194 may be fit/secured to a back edge of the elongated rail 12. Further, the addition of magnets 196 on the bottom and the back of bin 192 allows the bin to register with the front writable magnetic surface 28 of the rail profile, as well as magnetic strip(s) on tray 170 (when used therewith) when the bin 192 is removed from the elongated rail 12 and onto the tray 170 on surface 18. In a non-limiting embodiment herein, the bin 192 and its shelf 194 is formed of ABS plastic, with magnets 196 attached thereto (e.g., via adhesive).

Figure 76:
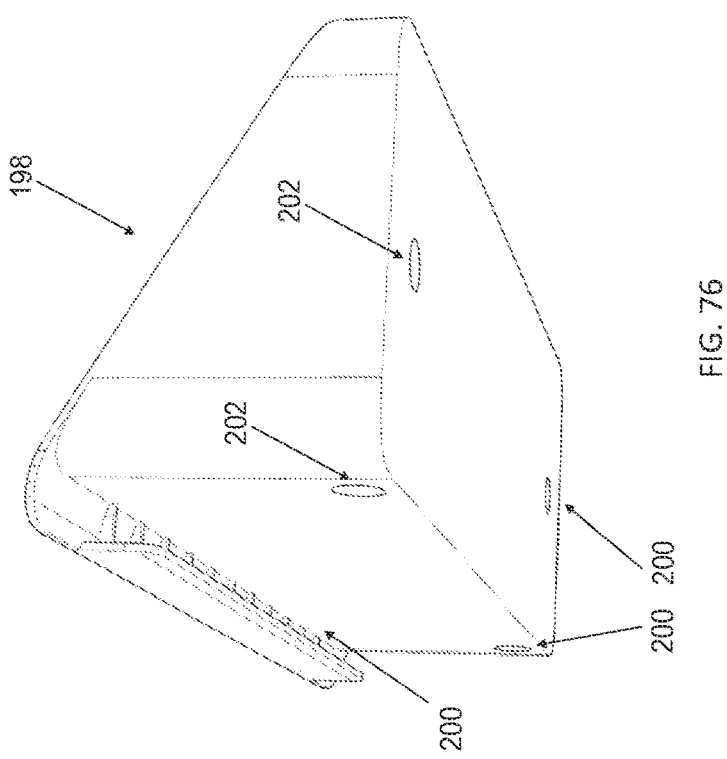
FIGS. 75-76 show front and back perspective views of an alternative bin with shelf for use with the rail system in accordance with an embodiment.
Figure 75:
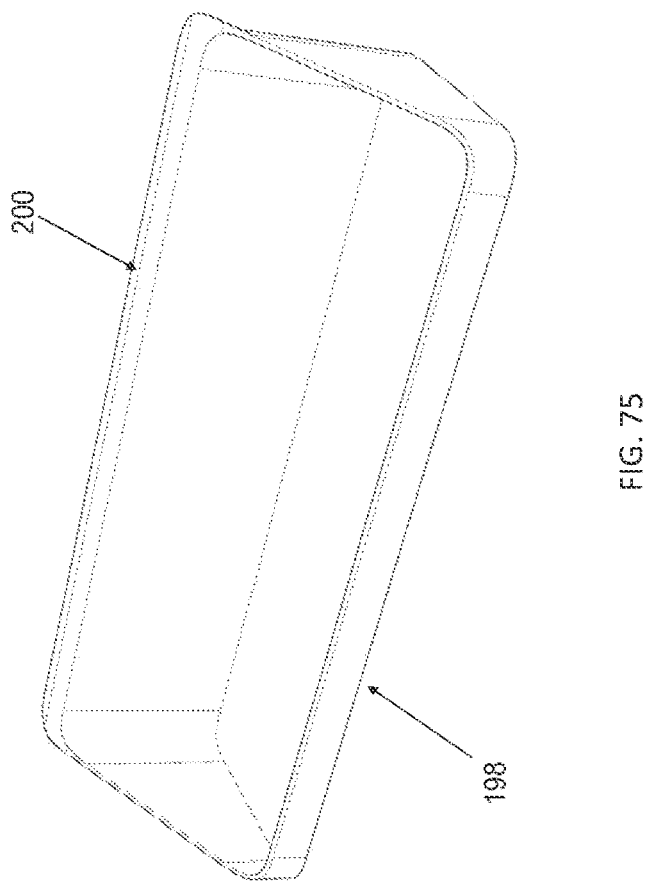
Figure 78:
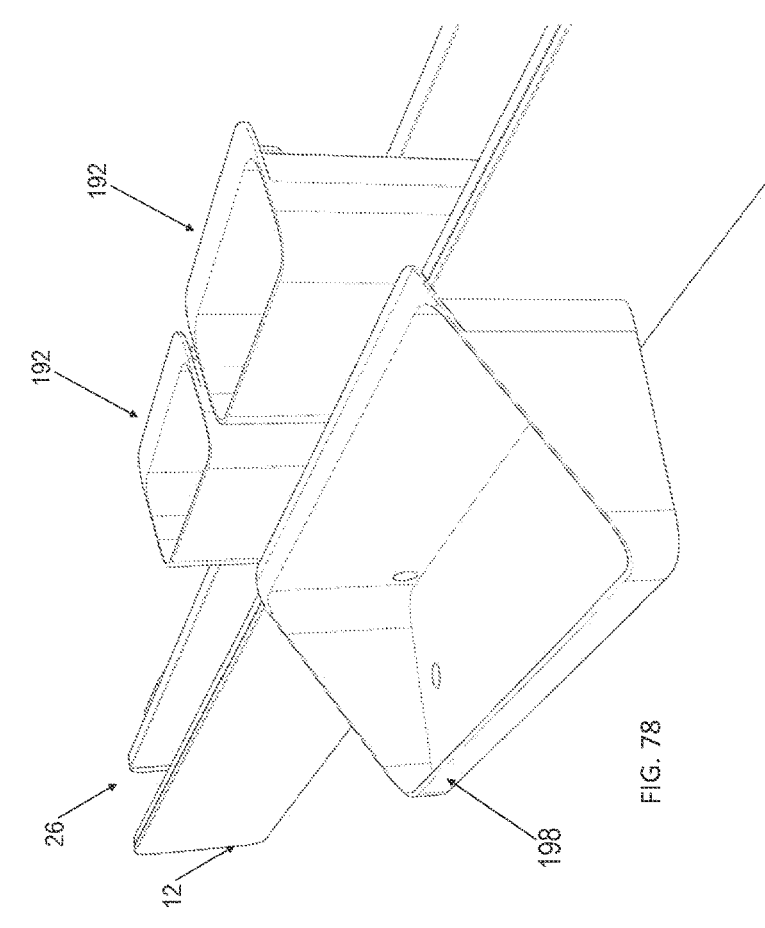
FIGS. 77-78 show side and perspective views of mounting options for the bin of FIGS. 75-76 with respect to the elongated rail of the rail system, according to embodiments herein.
Figure 77:
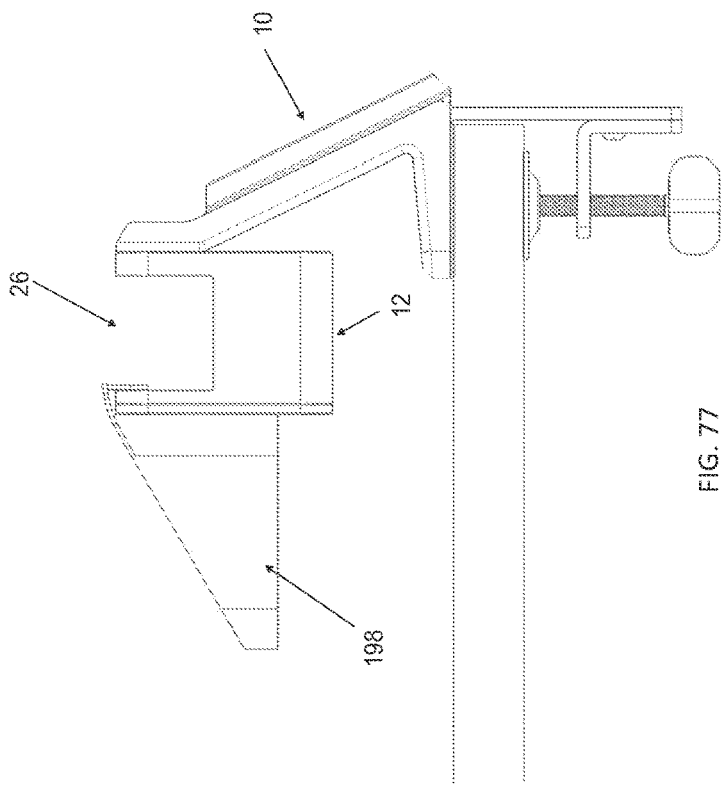

FIGS. 75-76 show another example of an alternative bin 198 having a shelf 200 along a back of a top edge thereon, for use with the rail system 100, according to embodiments herein. Such a bin 198 may be designed for placing larger items like pictures or keepsakes up off of a desktop, for example. One or more bins 198 may be used with one or more bins 192 (see FIG. 78) and/or with the rail system 100, for example. Further, FIG. 76 shows an example for placement of optional magnets 202 on a back side and an underside of the bin 198. Accordingly, in an embodiment, the bin 198 may be mounted to a front edge of the elongated rail 12 via shelf 200 (e.g., using an optional snap fit connection), as shown in FIG. 77, or, in some cases, sized to fit within channel 26. In an embodiment, the bin 198 may be sized such that a bottom thereof aligns with or is positioned relatively above a bottom of the elongated rail 12 when hanging off of the front thereof, so as to allow access to the area below the rail 12. Further, the shelf 200 is designed such that it does not hinder use of the channel 26 when mounted on a front edge of the rail. Accordingly, another bin, like bin 192 (shown in FIG. 78) or accessory may be positioned within the channel 26 directly in line with a bin 198 secured to the front edge. Further, the addition of magnets 202 on the bottom and the back of bin 198 allows the bin to register with the front writable magnetic surface 28 of the rail profile, as well as magnetic strip(s) on tray 170 (when used therewith) when the bin 198 is removed from the elongated rail 12 and onto the tray 170 on surface 18. In a non-limiting embodiment herein, the bin 198 and its shelf 200 is formed of ABS plastic, with magnets 202 attached thereto (e.g., via adhesive).

According to embodiments herein, in addition to mounting rails to the back surface 24, the rail system 100 further provides the ability to mount other accessories to its back surface. Any of the aforementioned items (like bins 192 and 198) may be mounted to the back surface 24 thereof and are not necessarily limited to the illustrated embodiments showing mounting to a front edge and/or within the channel 26 of the elongated rail 12.

Figures 79, 80:
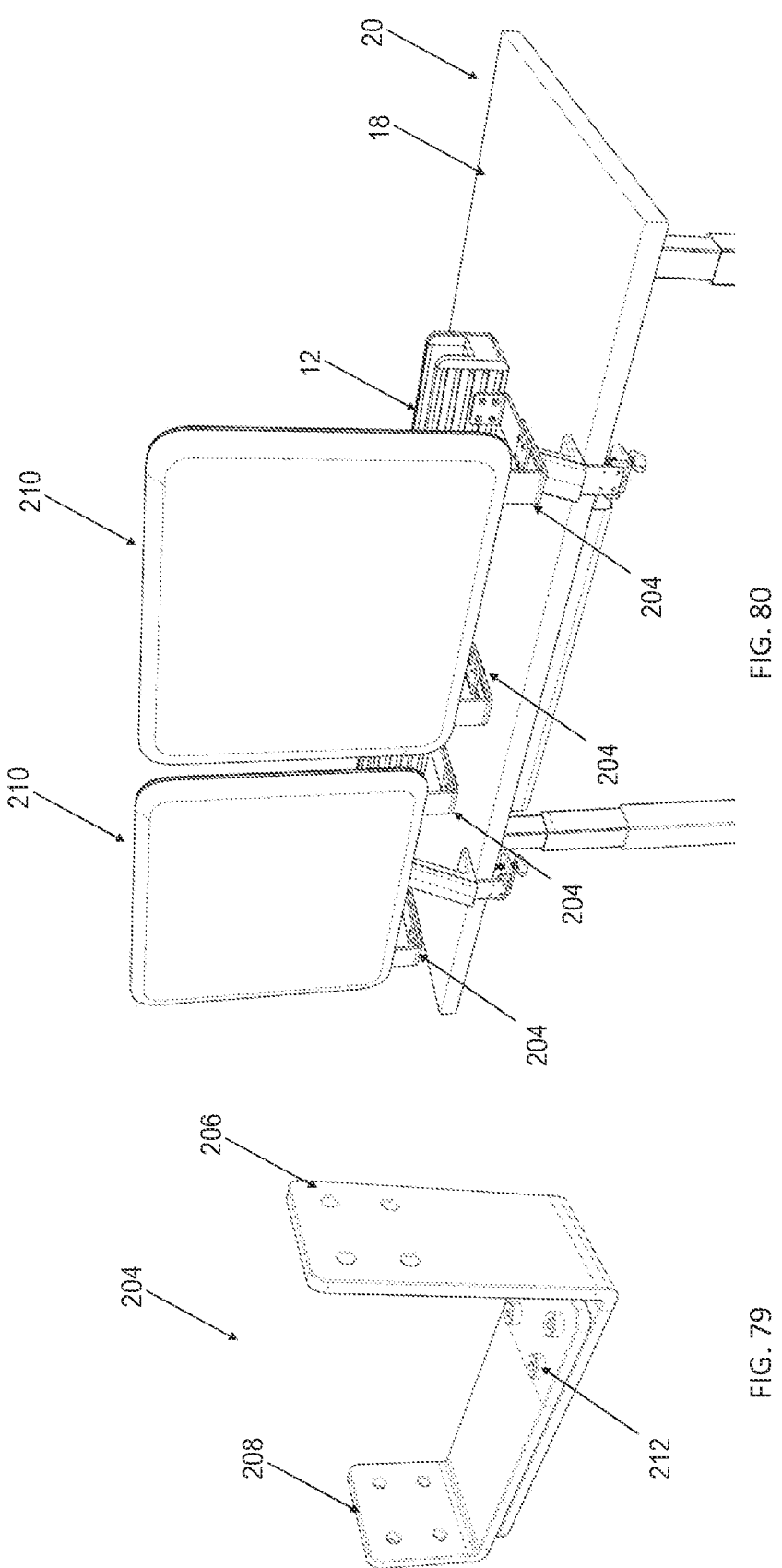
FIG. 79 shows a perspective view of a bracket for mounting accessories according to embodiments herein.
FIGS. 80-81 show a back perspective view and side view, respectively, of privacy dividers mounted to the rail system via the bracket of FIG. 79, in accordance with embodiments herein.
Figure 81:
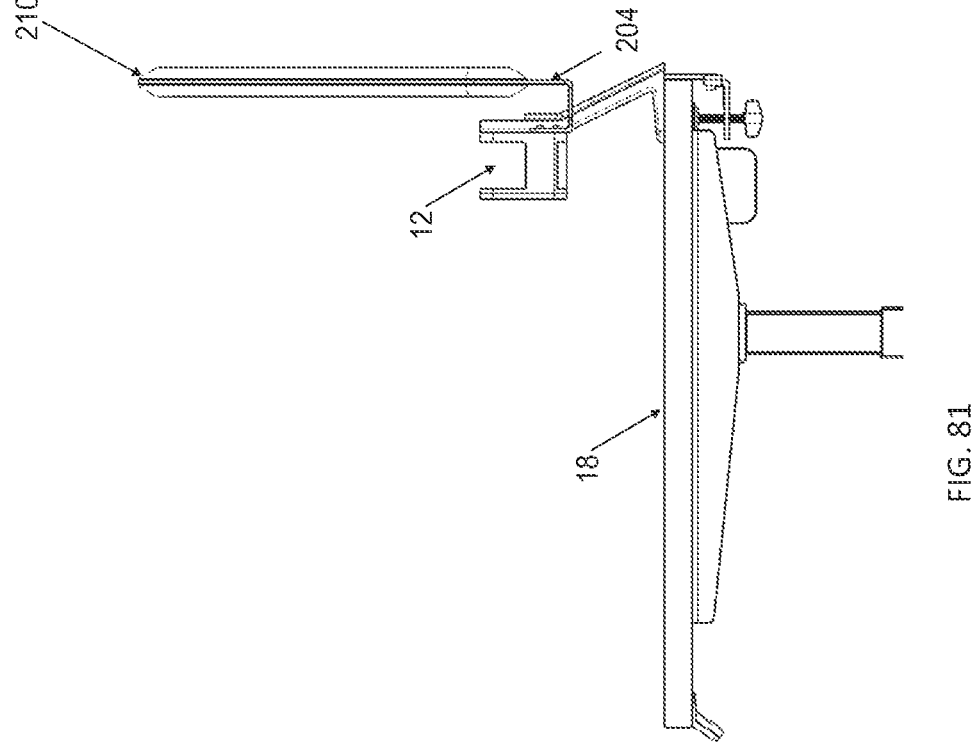
Figure 82:
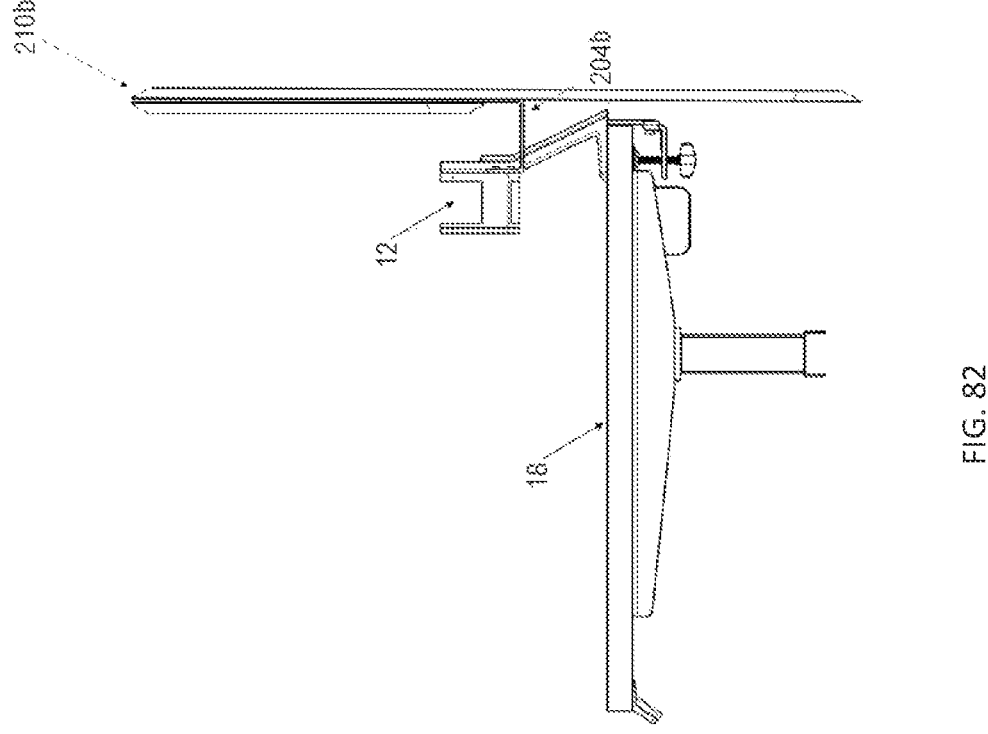
FIG. 82 shows a side view of a privacy divider with a modesty panel feature mounted to the rail system via the bracket of FIG. 79, in accordance with an embodiment herein.

Further, the rail system 100 may also accommodate privacy dividers for mounting thereon. One or more bracket configurations 204 like that shown in FIG. 79 may be provided for attaching and spacing items such as privacy dividers with respect to the rail 12, wherein a first L-bracket 206 is secured to the back of the rail (e.g., using fasteners inserted through holes therein and secured within mounting slots 35 along the back surface 24 of rail 12), and the second L-bracket 208 is secured to a divider 210 or privacy panel (e.g., using fasteners inserted through holes therein and into the divider), as shown in FIG. 80-81. Each of the brackets 206, 208 may be secured together via fasteners 212 as well. In an embodiment, such as shown in FIG. 81, the bracket configuration(s) 204 may be designed to position the divider 210 such that it does not extend beyond a mounting mechanism 10, thereby maintaining any space behind the desk or table. In an embodiment, the bracket configuration may be provided as bracket configuration 204b that is configured to provide divider/privacy panel 210 with a modesty panel feature 210b, which may be provided on a back side or exterior side of the desk or table, as shown in FIG. 82, extending below the surface 18.

FIGS. 83-91 show a rail and mounting mechanisms that are part of the disclosed rail system 100, in accordance with an alternate embodiment herein. As described herein, the rail 12 and rail system 100 is configured to provide cable management, organizational elements, and power for devices and computers, for example. For purposes of clarity and brevity, like elements and components throughout the Figures are labeled with same designations and numbering as discussed with reference to FIGS. 3-82. Thus, although not discussed entirely in detail herein, one of ordinary skill in the art should understand that various features associated with the rail system 10 of FIGS. 83-91 are similar to those features previously discussed. Additionally, it should be understood that the features shown in each of the individual figures is not meant to be limited solely to the illustrated embodiments. That is, the features described throughout this disclosure may be interchanged and/or used with other embodiments than those they are shown and/or described with reference to.

FIGS. 83-86 show a rail system 100 for a workspace including at least one mounting mechanism 10 and an elongated rail 12. Each mounting mechanism 10, as previously described in detail in the prior embodiment, is configured for attachment to the elongated rail 12 and configured for attachment to a table or desk (see, e.g., FIGS. 83 and 90), so that the at least one mounting mechanism 10 supports the elongated rail 12 relative to a surface 18 of said table or desk. The elongated rail 12 is configured to extend horizontally relative to and above the surface 18 of the table or desk at a height or distance thereabove when mounted thereto via said at least one mounting mechanism 10. The elongated rail 12 extends between a first end and a second end and having at least a front surface 20, a bottom edge 22 (see FIG. 87), and a back surface 24. As shown in detail in FIG. 87, the back surface 24 includes a number of horizontally extending mounting slots 35 formed therein for placement of accessories relative to the elongated rail 12. The modular slat profile with mounting slots 35 allows brackets of various types and/or accessories to attach thereto, in order to mount accessories to the back of the elongated rail 12. In order to provide a rail system 100 that is aesthetically pleasing, clean, organized, and modular, according to an embodiment, the slat profile may be provided on the back of the rail system 100 in order to retain modularity of a slat profile, while ensuring the forward face or front surface 20 of the rail 12 is clean and visually impactful (rather than creating an undesirable aesthetic on the front or surface facing the user).

Figure 87:
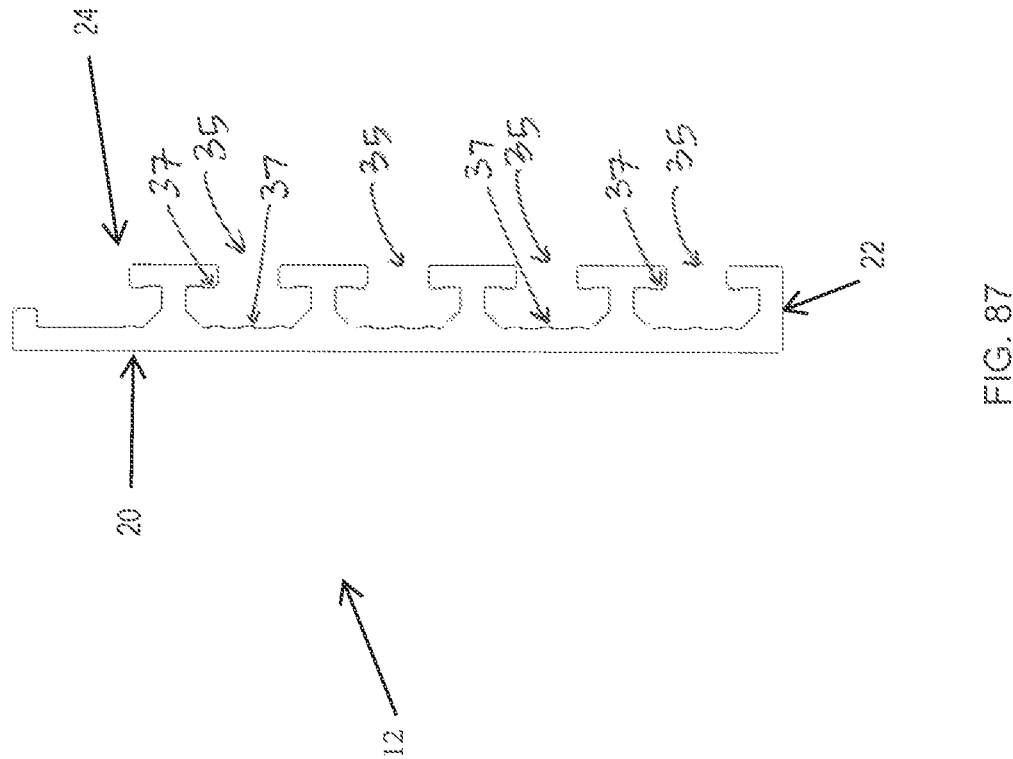
FIG. 87 shows a side view of the rail, without end caps, in accordance with an embodiment herein.

In embodiments, one or more mounting slots 35 may be provided in at least the back surface 24 of the rail 12 (see, e.g., FIG. 87). According to embodiments, two or more horizontally extending mounting slots 35 may be provided in back surface 24 of the elongated rail 12. In a non-limiting embodiment, two to six horizontally extending mounting slots 35 may be provided in the back surface 24. In one exemplary embodiment, four or five horizontally extending mounting slots 35 are provided in the back surface 24 of the elongated rail 12.

In an embodiment, the elongated rail 12 may be an extruded rail, formed of a material such as aluminum (e.g., 6063 aluminum extrusion (anodized)). A length of the rail may vary, and is not limited with regards to the size or length of the surface it may be attached to. In embodiments, the length of the rail may be between approximately 24 inches to 60 inches. In embodiments, the length of the rail may be between approximately 36 inches to 48 inches. In embodiments, the length of the rail may be approximately 48 inches. A height and/or a width of the rail may also vary. In an embodiment, the elongated rail and/or rail system may have an overall height between approximately 3 inches to approximately 6 inches. In an embodiment, the elongated rail and/or rail system may have an overall width of approximately 2 inches to approximately 6 inches. In an embodiment, the elongated rail and/or rail system may have an overall height of approximately 4 inches and an overall width of approximately 3 inches. In a non-limiting embodiment, the thickness t (see FIG. 13) of the wall of the elongated rail 12 [not including the mounting slots] is approximately 0.125 in.

Figure 86:
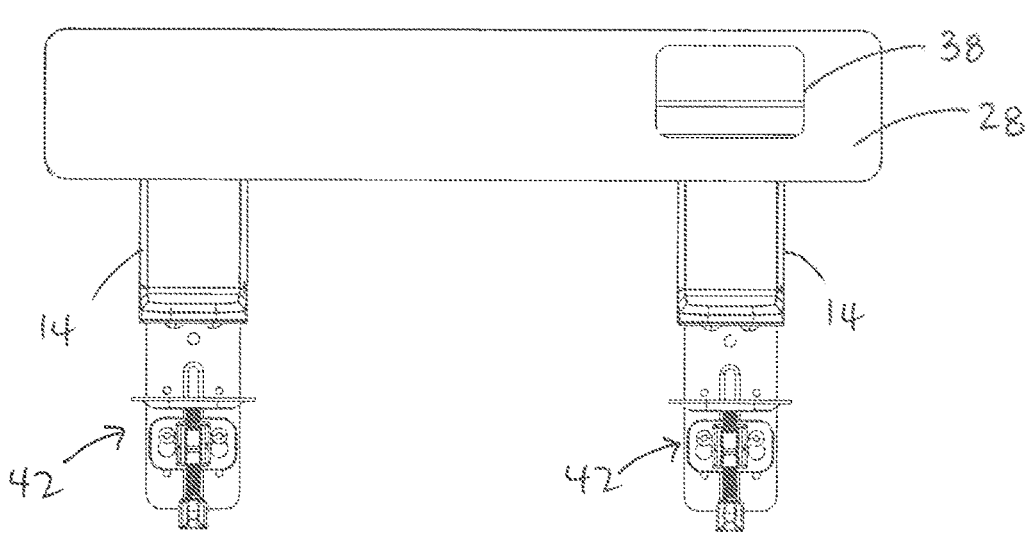

According to embodiments, a front writing and erasable surface 28, which may be magnetic, and/or interchangeable with the front surface 20 of the rail, may be provided. Further options for magnetic actuation, including organizational units that magnetically and/or mechanically connect to the system, including a keyboard tray (described with regards to FIGS. 65-68 and 71-78, for example), may also be provided in embodiments. As previously noted with regards to FIG. 5, front surface 20 (or 28) may be designed to provide an aesthetically pleasing appearance in addition to function(s). In an embodiment, the front surface 20 of the elongated rail may have writing and (dry) erasable surface 28 attached thereto, such as shown in FIG. 86 and FIG. 86. In an embodiment, the surface 28 may be a tempered glass surface and/or other materials such as plastic, designed as a forward-facing surface that is similar to a white board surface and therefore may be written upon by dry markers. An optional backing surface (e.g., galvanized steel backing surface or other sheet metal layer, or a painted metal layer) may be placed between the front surface 20 of the elongated rail 12 and a back surface of the writing and erasable surface 28 to provide magnetism, i.e., the ability for the writing and dry erase surface to connect (snap) over the front surface of the rail (see FIG. 87) and/or to secure magnets thereto for holding items thereon. That is, the added backing surface allows, for example, magnetic retention of notes and other elements by way of the metal layer immediately behind the surface 28. Further, the magnetic surface may be used in addition to the front surface 20 and/or edge of the channel of the elongated rail 12 to retain heavier items, such a shelves or bins, like those described with reference to FIGS. 71-78 and shown in FIGS. 88-91. The surface 28 may be a snap on surface that snaps over the front surface 20 of the elongated rail, held on by an edge or projection, for example. In an embodiment, as shown in FIG. 87, a top edge or surface of the elongated rail 12 is shaped, e.g., with a projection, to allow the surface to snap thereover. In a similar context, a projection may also or alternatively be provided a bottom edge of the elongated rail 12. According to an embodiment, a thickness and/or a shape of the backing surface may change whereas the front surfaces are of similar thicknesses for positive engagement and securement.

Figures 83, 84:
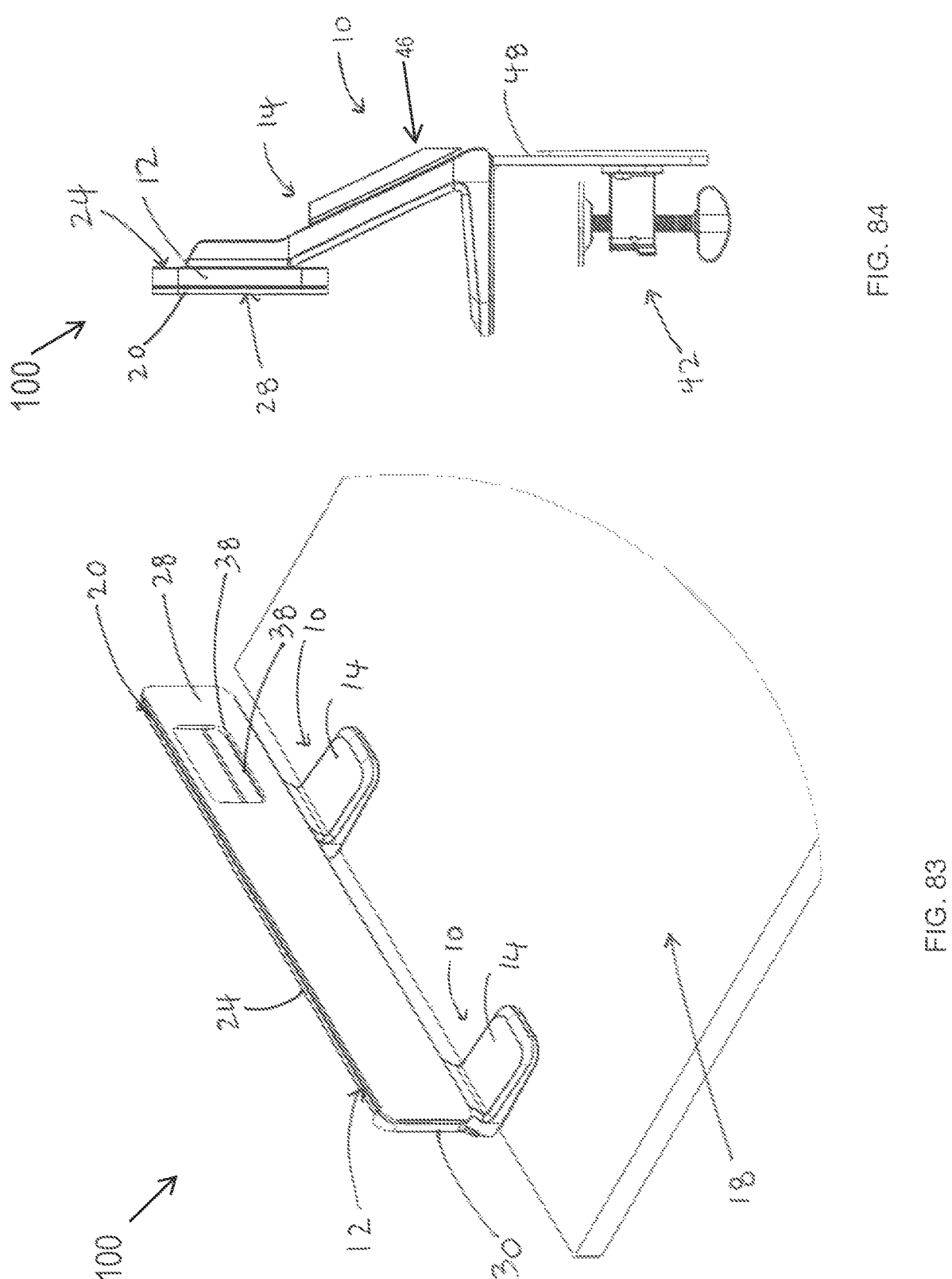
FIGS. 83 and 84 show front perspective and side views, respectively, of a rail and clamps that are part of the disclosed rail system, in accordance with another embodiment herein.
Figure 85:
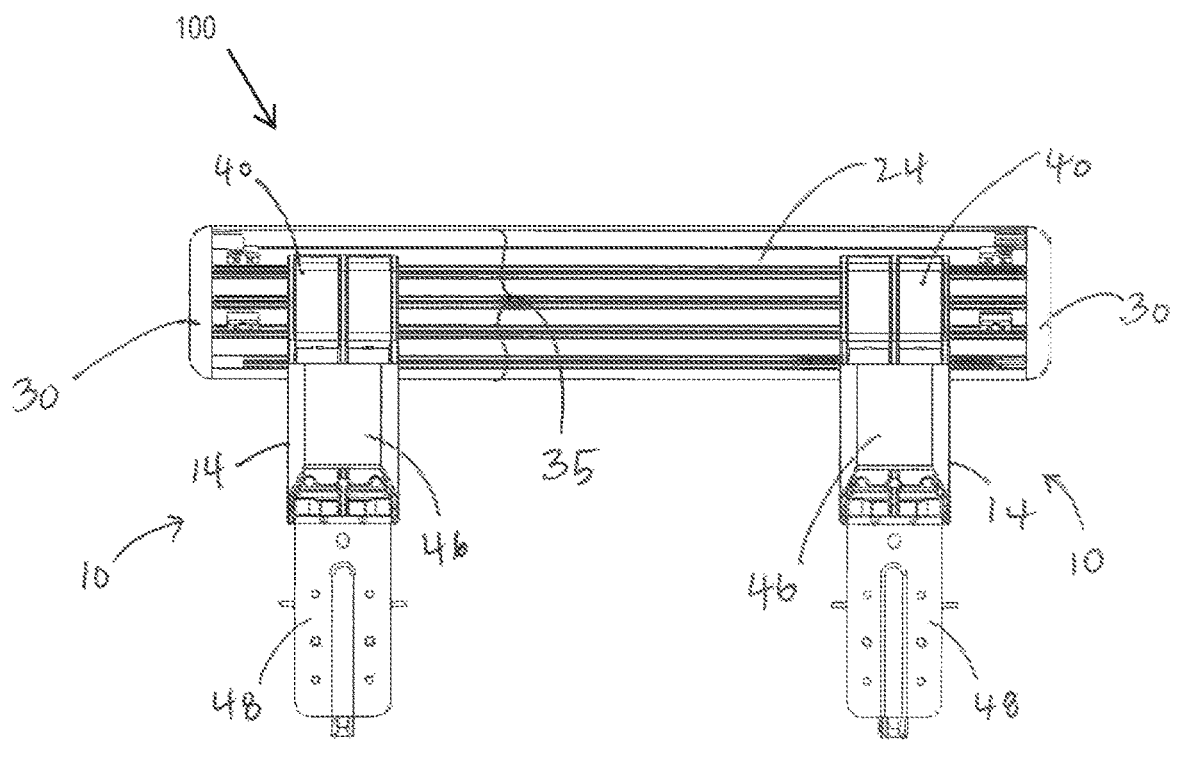
FIGS. 85 and 86 show back and front views, respectively, of the rail and clamps of FIGS. 83-84, in accordance with embodiments herein.

The first end and the second end of the elongated rail 12 may include end caps 30 thereon, an example of which are shown in FIGS. 83-85. In an embodiment, each end cap 30 is formed of a single part that is press fit onto the first and second ends of the elongated rail 12. For example, in an embodiment, the end caps are inserted into slots provided on the ends. In another embodiment, the end caps may be snapped over or around the edges of the rail. Aesthetically, the end caps provide rounded ends for the elongated rail, e.g., to match the front face. In an embodiment, the end cap part(s) may be formed of plastic, such as ABS plastic.

Figures 88, 89:
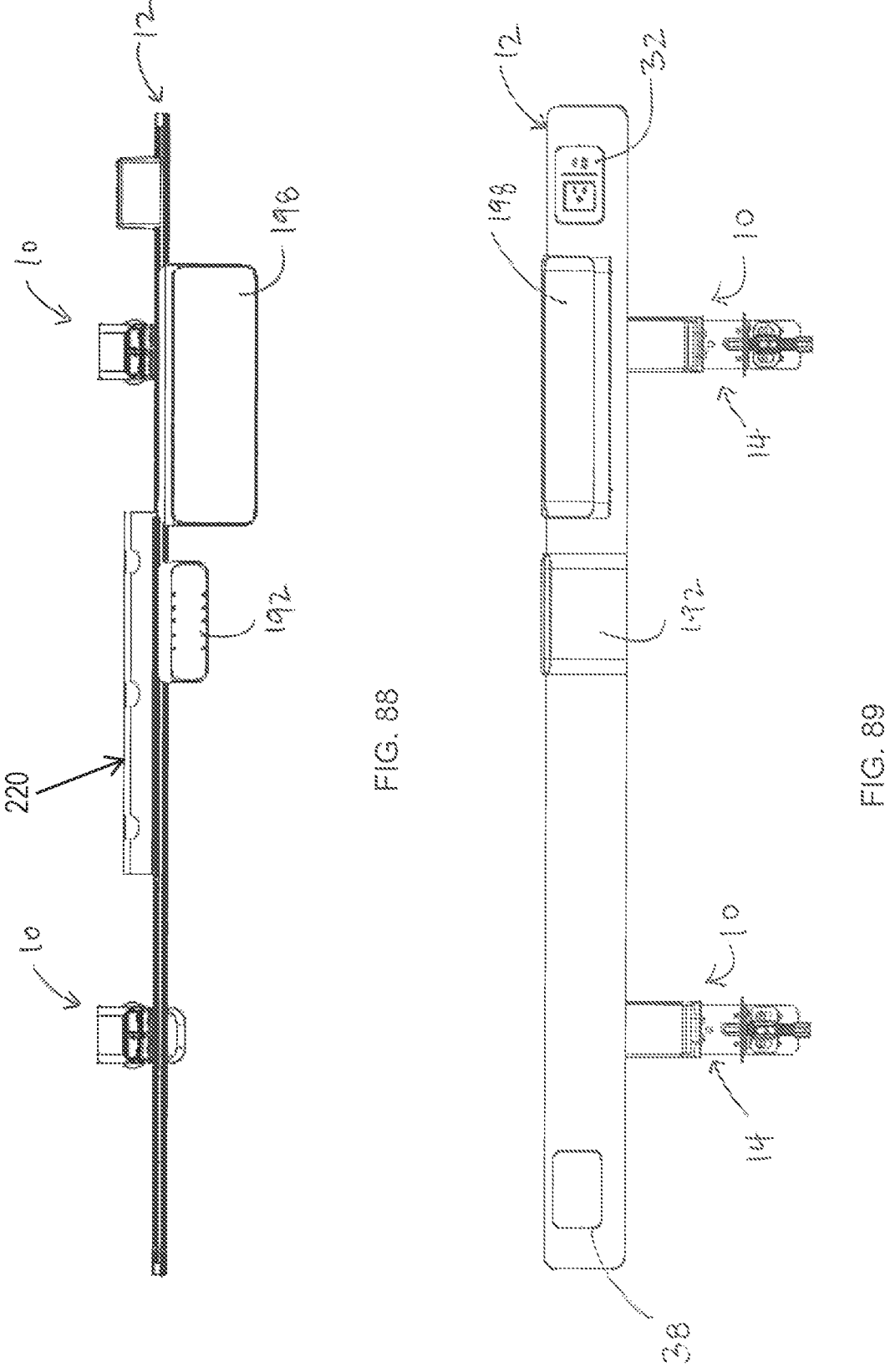
FIGS. 88 and 89 show top and front views, respectively, of exemplary accessories mounted to the front and back of the disclosed rail system of FIGS. 83-84, in accordance with embodiments herein.

According to embodiments herein, the front surface 20 of the elongated rail 12 is shown with an optional one or more hole(s) 38 therein for receipt of a power connector from a power source 32, i.e., an electrical outlet on a wall or floor. A housing of the power connector may inserted in the hole 38 (e.g., such that it snaps into the hole and front) and a back portion of the housing may be positioned to extend from the back surface 24, such as shown in FIGS. 88 and 90. In embodiments, the hole(s) 38 and thus the housing of the power connector may be centered vertically with the same space to the side as well and will snap into the front. After the component/power connector is snapped into the rail, its power cord is designed to fit under the cable cover 46 (described later below) when connected to a power source. The power connector may include AC and/or USB ports (USB C and/or USB A ports), for example. According to an embodiment, the power connector is configured to meet or exceed these specs: 1 AC outlet: 15 A, 125V, 60 hz; 1 quick-charge USB-A port: 3 A, 5V; and 1 quick-charge USB-C port: 3.1 A, 5V. The housing of the power connector may be provided in the form of plastic, e.g., ABS plastic housing that surrounds the electronics, in an embodiment herein. In an embodiment, the surface 28 and the backing surface (e.g., magnet or metal) include corresponding holes therein that are cut out and align with hole(s) 38 in the front surface 20 of the elongated rail 12 (see FIG. 83, for example). For example, both surface and backing surface may include a hole for the integrated power component and/or a multitude of corresponding holes therein if more than one power component is utilized as to be forward facing to the user.

For explanatory purposes only, a majority of the Figures illustrate mounting of the elongated rail 12 using clamp mechanisms 14 for support the elongated rail 12 statically relative to said surface 18; however, as previously noted, the mounting mechanism(s) 10 may be altered and/or the elongated rail 12 need not be statically mounted relative to the top of the table or desk 20. As shown, in embodiments, the rail system 100 includes at least two clamp mechanisms 14 for the elongated rail 12 (other embodiments may utilize a mounting mechanism 10 when movement of the rail 12 itself is desirous, such as shown in FIG. 7A and FIGS. 68-70). The bottom edge 22 of the rail 12 may be positioned at a height above the surface 18 of the desktop or table top such that objects may be positioned or provided on the surface and underneath the rail. In an embodiment, in addition to securing the clamps thereto, the back surface 24 may be utilized as an area for connecting with connection points (e.g., clamps for securement of the rail; clamps for added accessories including, but not limited to, monitor clamps; etc.). As noted, one or more mounting slots 35 may be provided in at least the back surface 24 of the rail. In an embodiment, the mounting slots/slats 35 may include raised areas 37 therein (see FIG. 87) or added thereto in order to reduce friction for any sliding elements and/or to create a corresponding shape for attaching accessories thereto. Further, the mounting slots 35 are designed to maximize strength and T-slot functionality.

Each clamp mechanism 14 may include a first mounting portion 40, or attachment bracket, configured for attachment to the elongated rail 12, and a second mounting portion 42, or base clamp combined with a table clamp, configured for attachment to an edge 16 of, or a surface 18 of, a table or desk. The first mounting portion 40 is designed to handle the force(s) and/or torque from the elongated rail and weight(s) of components secured thereto. The first mounting portion may be provided in the form of an angular part or attachment bracket that is attached via fasteners (e.g., bolted or screwed) to the rail, for example, via stainless steel hardware (see, e.g., FIG. 18). In an embodiment, one or more rib reinforcements may be added to the clamp body to provide further structural support and rigidity to the first mounting portion; these support ribs may be spaced in such a way as to function as cable routing channels as well. The second mounting portion 42 may include a base clamp 48, e.g., in the form of an L-bracket, that is configured to connect to the attachment bracket/first mounting portion 40 at a bottom portion or back portion thereof. The second mounting portion 42 may further include a desk pad 50 (see FIG. 18) to limit markings thereon and a table clamp (not shown in FIGS. 83-91) that is configured to include a tightening mechanism for engagement with a bottom surface of the desktop or table top. In alternative configurations, the base clamp 48 may be replaced with a surface mounting plate which is directly mounted to the surface of the desk or table allowing the first mounting portion to attach directly and securely to the surface mounting plate.

As described earlier, because the back surface 24 of the elongated rail 12 includes, in embodiments, a number of (multiple) horizontally extending mounting slots 35, these slots 35 act as and provide several attachment locations for mounting mechanism(s) 10 (e.g., clamp mechanism(s) 14) as well as other items and accessories. Accordingly, in embodiments, first mounting portion(s) 40—or the employed mounting mechanism(s) 10—may be attached to a particular [one] mounting slot of the multiple mounting slots 35 on the back surface 24 of the elongated rail 12 to determine the distance or height the rail/system is provided above the surface 18. Moreover, the multiple mounting slots 35 allow for adjustment of the height of the rail 12 relative to the surface 18 by allowing changes in the location (slot) in which such portions/mechanisms are attached. Based on the attachment and placement of the first mounting portion 40 to the elongated rail 12, according to a non-limiting embodiment, a distance or height of the space between the top surface 18 of the desktop (or table top) and a bottom edge 22 of the elongated rail 12 and/or rail system 100 may be between approximately 2 inches to approximately 6 inches. In embodiments, a distance or height of the space between the top surface of the desktop (or table top) and a bottom edge of the elongated rail may be between approximately 2 inches to approximately 4 inches. In one embodiment, a distance or height of the space between the top surface of the desktop (or table top) and a bottom edge of the elongated rail may be between approximately 2.22 inches to approximately 3.56 inches. In one embodiment, a distance or height of the space between the top surface of the desktop (or table top) and a bottom edge of the elongated rail may be between approximately 2.2 inches to approximately 3.5 inches.

In embodiments, a corresponding angular cover, referred to as a mount cover 46, may be connected to (e.g., snapped onto) each first mounting portion on an outer or back surface thereof to cover at least a portion of said back surface (or outer surface) of the mounting portion and provide an aesthetically pleasing look. In an embodiment, a bottom of the mount cover may be angled or cut off to limit projection of its edge (see, e.g., FIGS. 84-85). Moreover, at least one feed channel may be formed between the back/outer surface of the first mounting portion and inside surface of the mount cover. As such, this feed channel may be used for placement of cable and/or electrical cords to/from a power source, allowing for cable or cord management by feeding and/or hiding cables and/or cords therein (such as depicted in FIGS. 16 and 17). Accordingly, cables and/or cords may be fed such that they are positioned to go down the back of the mounting mechanism and covered by the mount cover. In an embodiment, as previously noted, the back surface of the first mounting clamp portion may have cable management ribs and at least one channel, with a cover thereon, allowing for main power cable/s to be routed up through the clamps/mounting mechanism(s) from the nearest wall or floor outlet.

Although not illustrated in FIGS. 83-91, it should be understood that any of the prior mechanisms, including the quick release pin 62, joint 60, mounting bracket 68, adapter 66, monitor arm arrangement 54, etc. are configured for use with the rail system 100 illustrated in FIGS. 83-91. Also, the mechanisms/adapters 56, 66, 128 and brackets 68, 129 may be formed and assembled such that they are integrated to behave as a singular component that is mounted as a unit onto the elongated rail 12 of FIGS. 83-91. Further, any of the aforementioned accessories—such as, but not limited to, laptop riser or holder 120, privacy dividers, etc.—may also be utilized with the rail system 100 of FIGS. 83-91.

As an example, FIGS. 88-91 show a rail system 100 with a power source 32 therein (e.g., through a hole 38), as well as bin 192 and bin 198 attached or mounted to the elongated rail 12. As described previously in detail with regards to FIGS. 71-74 and FIGS. 75-78 (and thus not fully described here for brevity), shelf 194 of bin 192 may be placed along a top edge of the elongated rail 12, for holding pens, pencils, and other small items, for example. In an embodiment, an edge of the shelf 194 of the bin 192 may be mounted (e.g., snapped) within a mounting slot 35 on the back surface 24 of the elongated rail 12. Similarly, bin 198 and its shelf 200 may be utilized on the elongated rail 12, for placing larger items like pictures or keepsakes up off of a desktop, for example. In an embodiment, an edge of the shelf 200 of the bin 198 may be mounted (e.g., snapped) within a mounting slot 35 on the back surface 24 of the elongated rail 12. Further, according to embodiments, the addition of magnets on the bins 192, 198 allows the bins to register with the front magnetic surface 28 of the rail profile. In a non-limiting embodiment herein, the bins 192, 198 and shelves 194, 200 are formed of ABS plastic, with magnets attached thereto (e.g., via adhesive).

Moreover, according to embodiments, a cable management accessory 220 may also be provided for attachment to the elongated rail 12, such as shown in FIGS. 88, 90, and 91. Such cable management accessory 220 may be utilized for feeding cables or cords therein to assist in cable management with regards devices that supply power to devices, laptops, and computers, et al. In embodiments, cable management accessory may include a structure such as a trough, an open U shaped container, a tray, a bin (like bins 192, 198), and/or a rack, any of which may optionally have hole(s) or opening(s) for feeding cables and cords therein, and/or include structure(s) for wrapping cables and cords therearound. In an embodiment, the cable management accessory 220 may be a snap-in plastic retainer loop, such one that is C shaped, allowing a user to release a top of the C to place cables/cords within the retainer and snap the top back into place.

Further, as generally noted previously and shown in FIG. 45, other accessories may be provided for use with the rail system 100. In embodiments, further power sources and/or power outlets may be provided to effectively power (e.g., low voltage DC) the rail system so accessories—like lights, rechargeable products air purification, sound, camera(s)—may be connected and/or snapped into the rail 12 for power thereof and/or charging.

As such, this disclosure provides at least an organization rail which mounts to desktop and above the desk top surface, getting commonly used items off the desk while facilitating rapid re-organization of the most utilized desk space allowing use and access to needed items for a given tasks which change throughout the day. In addition to open desk space, users utilize surfaces for conference calls, writing/sketching, eating lunch, and tidying up throughout the day; thus, a transformable surface is desirable. The disclosed rail and rail system meets such needs by moving everyday items between non-working zones and primary and secondary working zones. Accordingly, items such as keyboards, storage accessories, etc. may be moved into a user's reach zone as well as in front of and/or below monitors (mounted via mounting arm arrangements to the rail) so that they are not obstructed. Further, because the rail and/or accessories mounted thereon are positioned off of the work surface at a distance that is far enough, items may be positioned and/or slid underneath attached accessories and/or the rail itself, providing a more ideal access area.

Accordingly, it should be understood that the disclosed rail system provides, among others, the following advantages: transformation of a workspace, including both near-field opportunities and far-field opportunities for increased usability, so that workers may use their workspaces for different activities throughout the day. Accordingly, efficiency and productivity may be increased by helping workers transform their workspaces to better match each activity, e.g., such as: conference calls, writing, sketching, eating lunch, tidying, open desk space. The rail system provides greater flexibility with regards to helping move everyday items from the non-work zone into the primary and secondary zones. The rail system facilitates one's efficiency by easing the transition of one task to the next throughout the day. The interaction of the rail items to the desk and in front of/away from the monitor enables a user to make their "primary" workspace as useful as possible.

Further, with the front facing surface 28 and the slat profile (mounting slot(s) 35) on the back wall 24, the rail system 100 allows for functional use of the rail 12, including cable management and retainment to reside above the surface of the desk to ensure ease of access and use to facilitate a clean and organized appearance without having to go under the desk each time a powered accessory is added or subtracted. Indeed, it should also be understood that the slots 35 in the back surface 24 of the disclosed rails 12 in the Figures may also be utilized for further cable or cord management by feeding and/or hiding cables and/or cords therein (or, at least a portion of such cables/cords). Moreover, the rail system allows for the addition power strips therein or therebelow, including the integrated power strip with the exposed plug interface shown protruding through the front wall of the unit.

Any measurements and/or dimensions noted herein in the description and/or Figures are exemplary and not intended to be limiting.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments. Further, it is intended that embodiments of the disclosed subject matter cover modifications and variations thereof.

While the principles of the disclosure have been made clear in the illustrative embodiments set forth above, it will be apparent to those skilled in the art that various modifications may be made to the structure, arrangement, proportion, elements, materials, and components used in the practice of the disclosure.

It will thus be seen that the features of this disclosure have been fully and effectively accomplished. It will be realized, however, that the foregoing preferred specific embodiments have been shown and described for the purpose of illustrating the functional and structural principles of this disclosure and are subject to change without departure from such principles.

What is claimed is:

1. A rail system for a workspace, the rail system comprising:

at least one mounting mechanism; and an elongated rail, each mounting mechanism being configured for attachment to the elongated rail and configured for attachment to a table or desk, so that the at least one mounting mechanism supports the elongated rail relative to a surface of said table or desk;

the elongated rail being configured to extend horizontally relative to and above the surface of the table or desk at a height or distance thereabove when mounted thereto via said at least one mounting mechanism, each mounting mechanism comprising (a) at least one mounting portion configured for attachment to the elongated rail for securing the elongated rail at said height or distance and relative to an edge and/or surface of the table or desk, (b) a mount cover connected to the at least one mounting portion on an outer surface thereof to cover at least a portion of said outer surface, and (c) a feed channel, for routing cable or cord, formed between the at least one mounting portion and an inside surface of the mount cover, the elongated rail having at least a front surface, a bottom surface, and a back surface defined by front, bottom, and back walls, respectively, said front, bottom, and back walls defining a channel within the elongated rail, the channel extending horizontally between a first end and a second end of the elongated rail and being accessible between the front and back walls for placement of accessories inside the channel and relative to the elongated rail, wherein the back surface of the elongated rail comprises a modular slat profile comprising a number of horizontally extending mounting slots formed therein, each of the number of horizontally extending mounting slots having attachment locations for securement of accessories therein.

2. The rail system according to claim 1, wherein the at least one mounting portion of each mounting mechanism comprises a first mounting portion and a second mounting portion, the first mounting portion comprising an attachment bracket having a vertical extension piece and configured for the attachment to the elongated rail for securing the elongated rail at said height or distance and relative to the edge and/or surface of the table or desk, and the second mounting portion in the form of a clamping portion configured for attachment the edge and/or surface of said table or desk.

3. The rail system according to claim 2, wherein each mounting mechanism comprises the mount cover connected to each first mounting portion on the outer surface thereof to cover at least a portion of said outer surface, and wherein the feed channel for routing cable or cord is formed between the first mounting portion and the inside surface of the mount cover.

4. The rail system according to claim 3, wherein the first mounting portion includes one or more rib reinforcements to provide further structural support and rigidity to the first mounting portion and also to create the feed channel for routing the cable or cord.

5. The rail system according to claim 1, wherein the bottom surface of the elongated rail comprises a number of horizontally extending mounting slots formed therein.

6. The rail system according to claim 4, further comprising at least one mounting bracket including an L-shaped portion and configured to for securement to the elongated rail via the horizontally extending mounting slots formed therein.

7. The rail system according to claim 1, wherein the first end and the second end of the elongated rail comprise end caps thereon, each end cap being press fit onto the first and second ends of the elongated rail.

8. The rail system according to claim 1, wherein the elongated rail comprises an elongated cover, said elongated cover received within the channel in order to divide the channel into a top portion and a bottom portion, said bottom portion of the channel being covered and accessible for receipt of accessories therein.

9. The rail system according to claim 8, wherein the elongated cover includes cut-out portions and/or segments.

10. The rail system according to claim 1, wherein one or more of the front surface, the bottom surface, and back surface of the elongated rail include one or more openings for receipt of a power connector from a power source and/or AC ports and/or USB ports.

11. The rail system according to claim 1, wherein the front surface includes a surface attached thereto that is an erasable and/or magnetized surface.

12. The rail system according to claim 1, further comprising one or more wheeled or sliding mounting brackets that include load bearing sliders for moving along the bottom surface of the elongated rail.

13. The rail system according to claim 1, further comprising one or more arm arrangements that comprise at least one arm configured for attachment to an accessory at one end, and, at the other end, a mechanism for connection to the elongated rail.

14. The rail system according to claim 13, wherein the one or more arm arrangements include at least one quick release mechanism comprising a universal attachment system that includes a quick release pin, a 180 degree rotation limiter, and a quick release adapter, the at least one quick release mechanism allowing for pivoting and rotation of the one or more arm arrangements and a quick-release of said one or more arm arrangements from the elongated rail.

15. The rail system according to claim 14, wherein the mechanism for connection to the elongated rail comprises a mounting bracket including an L-shaped portion configured to connect to the elongated rail, and wherein said at least one quick release mechanism is connected to and/or integrated with the mounting bracket.

16. A method of using the rail system of claim 1, the method comprising:

attaching the elongated rail to each mounting mechanism; and attaching the at least one mounting mechanism to the surface of the table or desk, such that the elongated rail extends horizontally relative to and above the surface of the table or desk at the height or distance thereabove.

17. A rail system for a workspace, the rail system comprising:

at least one mounting mechanism; and an elongated rail, each mounting mechanism being configured for attachment to the elongated rail and configured for attachment to a table or desk, so that the at least one mounting mechanism supports the elongated rail relative to a surface of said table or desk, the elongated rail being configured to extend horizontally relative to and above the surface of the table or desk at a height or distance thereabove when mounted thereto via said at least one mounting mechanism, each mounting mechanism comprising (a) at least one mounting portion configured for attachment to the elongated rail for securing the elongated rail at said height or distance and relative to an edge and/or surface of the table or desk, (b) a mount cover connected to the at least one mounting portion on an outer surface thereof to cover at least a portion of said outer surface, and (c) a feed channel, for routing cable or cord, formed between the at least one mounting portion and an inside surface of the mount cover, the elongated rail extending between a first end and a second end and having at least a front surface, a bottom edge, and a back surface, the back surface comprising a modular slat profile comprising a number of horizontally extending mounting slots formed therein, each of the number of horizontally extending mounting slots having attachment locations for placement and securement of accessories relative to the elongated rail.

18. The rail system according to claim 17, wherein the at least one mounting portion of each mounting mechanism comprises a first mounting portion and a second mounting portion, the first mounting portion comprising an attachment bracket having a vertical extension piece and configured for the attachment to the elongated rail for securing the elongated rail at said height or distance and relative to the edge and/or surface of the table or desk, and the second mounting portion in the form of a clamping portion configured for attachment the edge and/or surface of said table or desk.

19. The rail system according to claim 18, wherein each mounting mechanism comprises the mount cover connected to each first mounting portion on the outer surface thereof to cover at least a portion of said outer surface, and wherein the feed channel for routing cable or cord is formed between the first mounting portion and the inside surface of the mount cover.

20. The rail system according to claim 19, wherein the first mounting portion includes one or more rib reinforcements to provide further structural support and rigidity to the first mounting portion and also to create the feed channel for routing the cable or cord.

21. The rail system according to claim 17, wherein one or more of the front surface and back surface of the elongated rail include one or more openings for receipt of a power connector from a power source and/or AC ports and/or USB ports.

22. The rail system according to claim 17, wherein the front surface includes a surface attached thereto that is an erasable and/or magnetized surface.

23. The rail system according to claim 17, further comprising one or more arm arrangements that comprise at least one arm configured for attachment to an accessory at one end, and, at the other end, a mechanism for connection to the elongated rail.

24. The rail system according to claim 23, wherein the one or more arm arrangements include at least one quick release mechanism comprising a universal attachment system that includes a quick release pin, a 180 degree rotation limiter, and a quick release adapter, the at least one quick release mechanism allowing for pivoting and rotation of the one or more arm arrangements and a quick-release of said one or more arm arrangements from the elongated rail.

25. The rail system according to claim 24, wherein the mechanism for connection to the elongated rail comprises a mounting bracket including an L-shaped portion configured to connect to the elongated rail, and wherein said at least one quick release mechanism is connected to and/or integrated with the mounting bracket.

26. The rail system according to claim 17, further comprising at least one mounting bracket including an L-shaped portion and configured to for securement to the elongated rail via the horizontally extending mounting slots formed therein.

27. A method of using the rail system of claim 17, the method comprising:

attaching the elongated rail to each mounting mechanism; and attaching the at least one mounting mechanism to the surface of the table or desk,-such that the elongated rail extends horizontally relative to and above the surface of the table or desk at the height or distance thereabove.

28. A rail system for a workspace, the rail system comprising:

at least one mounting mechanism; and an elongated rail, each mounting mechanism being configured for attachment to the elongated rail and configured for attachment to a table or desk, so that the at least one mounting mechanism supports the elongated rail relative to a surface of said table or desk;

the elongated rail being configured to extend horizontally relative to and above the surface of the table or desk at a height or distance thereabove when mounted thereto via said at least one mounting mechanism, the elongated rail having at least a front surface, a bottom surface, and a back surface, the elongated rail defining a channel therein, the channel extending horizontally between a first end and a second end of the elongated rail and being accessible between the front and back walls and configured for placement of accessories inside the channel and relative to the elongated rail, the elongated rail comprising front and rear walls having the front and back surfaces, respectively, the channel being between the front and rear walls, wherein the rail system further comprises:

a quick release adapter for receiving a quick release pin on an accessory to be mounted to thereto;

a mounting bracket with a front extension on which the quick release adapter is mounted, wherein the mounting bracket is configured to mount to the rear wall of the elongated rail with the front extension and quick release adapter positioned within the channel of the elongated rail.

29. The rail system of claim 28, wherein the mounting bracket includes a U-shape configured to be mounted over the rear wall of the rail system to position the front extension and the quick release adapter within the channel.

30. The rail system according to claim 29, wherein the back surface of the elongated rail comprises a number of horizontally extending mounting slots formed therein for placement of accessories relative to the elongated rail, and wherein the mounting bracket includes a plurality of fasteners for connection to the horizontally extending mounting slots.

31. The rail system of claim 28, wherein the quick release adapter includes a button for enabling release of the quick release pin when received therein.

32. The rail system of claim 28, wherein the rail system further comprises the accessory with the quick release pin.

33. The rail system according to claim 32, wherein the accessory with the quick release pin is selected from the group consisting of a monitor arm, laptop holder and a keyboard tray.

34. The rail system according to claim 33, wherein the accessory includes a rotation limiter with the quick release pin connected thereto and positioned to engage the quick release adapter.

35. The rail system according to claim 32, wherein the accessory is a cap with the quick release pin.

36. A quick release adapter mechanism for use with a rail system for a workspace, the rail system comprising: at least one mounting mechanism; and an elongated rail, each mounting mechanism being configured for attachment to the elongated rail and configured for attachment to a table or desk, so that the at least one mounting mechanism supports the elongated rail relative to a surface of said table or desk; the elongated rail being configured to extend horizontally relative to and above the surface of the table or desk at a height or distance thereabove when mounted thereto via said at least one mounting mechanism, the elongated rail having at least a front surface, a bottom surface, and a back surface, the elongated rail defining a channel therein, the channel extending horizontally between a first end and a second end of the elongated rail and being accessible between the front and back walls and configured for placement of accessories inside the channel and relative to the elongated rail; said adapter mechanism comprising:

a quick release adapter for receiving a quick release pin on an accessory to be mounted to thereto, and a mounting bracket with a front extension on which the quick release adapter is mounted, wherein the mounting bracket is configured to mount to the back surface of the elongated rail with the front extension and quick release adapter positioned within the channel of the elongated rail.

37. The quick release adapter of claim 36, wherein the mounting bracket includes a U-shape configured to be mounted over the back surface of the rail system to position the front extension and the quick release adapter within the channel.

\* \* \* \* \*